US009811507B2

(12) United States Patent
Cranfill et al.

(10) Patent No.: US 9,811,507 B2
(45) Date of Patent: Nov. 7, 2017

(54) PRESENTING ELECTRONIC PUBLICATIONS ON A GRAPHICAL USER INTERFACE OF AN ELECTRONIC DEVICE

(75) Inventors: Elizabeth Caroline Furches Cranfill, San Francisco, CA (US); David Heller, Los Altos, CA (US); Jeffrey Robbin, Cupertino, CA (US); Alan C. Cannistraro, San Francisco, CA (US); William Martin Bachman, San Jose, CA (US); Timothy B. Martin, Sunnyvale, CA (US); Matt Evans, San Francisco, CA (US); Joe R. Howard, San Jose, CA (US)

(73) Assignee: Apple Inc., Cupertino, CA (US)

( * ) Notice: Subject to any disclaimer, the term of this patent is extended or adjusted under 35 U.S.C. 154(b) by 872 days.

(21) Appl. No.: 13/521,414

(22) PCT Filed: Jan. 11, 2011

(86) PCT No.: PCT/US2011/020874
§ 371 (c)(1),
(2), (4) Date: Aug. 14, 2012

(87) PCT Pub. No.: WO2011/085386
PCT Pub. Date: Jul. 14, 2011

(65) Prior Publication Data
US 2012/0311438 A1    Dec. 6, 2012

Related U.S. Application Data

(60) Provisional application No. 61/294,106, filed on Jan. 11, 2010, provisional application No. 61/298,539, (Continued)

(51) Int. Cl.
G06F 17/00 (2006.01)
G06F 17/21 (2006.01)
(Continued)

(52) U.S. Cl.
CPC .......... *G06F 17/214* (2013.01); *G06F 3/0483* (2013.01); *G06F 3/0488* (2013.01);
(Continued)

(58) Field of Classification Search
CPC .................................................. G06F 3/04817
See application file for complete search history.

(56) References Cited

U.S. PATENT DOCUMENTS 5,053,762 A    10/1991 Sarra
5,463,725 A    10/1995 Henckel et al.
(Continued)

FOREIGN PATENT DOCUMENTS

CN    1501307 A    6/2004
CN    1545043 A    11/2004
(Continued)

OTHER PUBLICATIONS

Sinix; "Sprite Animation Weekly #4—Dust Off" http://www.conceptart.org/forums/showthread.php/133736-Sprite-Animation-Weekly-4-Dust-Off; Aug. 11, 2008; 13 pages.*
(Continued)

*Primary Examiner* — Scott Baderman
*Assistant Examiner* — Benjamin J Smith
(74) *Attorney, Agent, or Firm* — Fish & Richardson P.C.

(57) ABSTRACT

Information is presented to a user by accessing a library of electronic publications that includes a first publication, generating a representation of the first publication in an electronic bookshelf, determining a state for the first publication and modifying the representation of the first publication to reflect the state of the first publication.

20 Claims, 35 Drawing Sheets

Related U.S. Application Data filed on Jan. 26, 2010, provisional application No. 61/298,889, filed on Jan. 27, 2010, provisional application No. 61/320,678, filed on Apr. 2, 2010.

(51) Int. Cl.
  *G06F 17/30* (2006.01)
  *G06Q 20/12* (2012.01)
  *G06F 17/24* (2006.01)
  *G06F 3/0483* (2013.01)
  *G06F 3/0488* (2013.01)

(52) U.S. Cl.
  CPC ........ *G06F 17/24* (2013.01); *G06F 17/30011* (2013.01); *G06Q 20/123* (2013.01)

(56) References Cited

U.S. PATENT DOCUMENTS

| | | | |
|---|---|---|---|
| 5,675,788 A * | 10/1997 | Husick | G06F 17/30017 |
| 5,714,973 A | 2/1998 | Takahashi et al. | |
| 5,761,485 A * | 6/1998 | Munyan | G06F 15/0283 |
| | | | 326/8 |
| 5,778,381 A * | 7/1998 | Sandifer | G06Q 10/06 |
| | | | 701/29.1 |
| 5,847,709 A * | 12/1998 | Card | G06F 3/04815 |
| | | | 715/775 |
| 5,956,034 A * | 9/1999 | Sachs | G06F 15/0283 |
| | | | 715/776 |
| 5,960,411 A | 9/1999 | Hartman | |
| 6,278,465 B1 | 8/2001 | Nielsen | |
| 6,320,591 B1 | 11/2001 | Griencewic | |
| 6,323,846 B1 | 11/2001 | Westerman et al. | |
| 6,331,867 B1 | 12/2001 | Eberhard et al. | |
| 6,570,557 B1 | 5/2003 | Westerman et al. | |
| 6,677,932 B1 | 1/2004 | Westerman | |
| 6,744,891 B1 | 6/2004 | Allen | |
| 7,260,781 B2 | 8/2007 | Demello et al. | |
| 7,509,270 B1 * | 3/2009 | Hendricks | G06Q 30/02 |
| | | | 705/26.9 |
| 7,574,649 B1 | 8/2009 | Safars et al. | |
| 7,778,890 B1 | 8/2010 | Bezos et al. | |
| 7,883,221 B2 | 2/2011 | Nozaki et al. | |
| 8,073,695 B1 | 12/2011 | Hendricks et al. | |
| 8,166,412 B2 * | 4/2012 | Jain | G06F 3/0482 |
| | | | 715/700 |
| 8,260,881 B1 | 9/2012 | Paleja et al. | |
| 8,364,595 B1 * | 1/2013 | Ringewald | G06Q 30/0601 |
| | | | 705/1.1 |
| 8,371,855 B1 * | 2/2013 | Gayles | G06F 21/10 |
| | | | 434/51 |
| 8,407,577 B1 | 3/2013 | Franklin et al. | |
| 8,438,084 B1 * | 5/2013 | Tesler | G06Q 10/087 |
| | | | 705/29 |
| 8,464,175 B2 * | 6/2013 | Turcan | G06F 3/0485 |
| | | | 715/776 |
| 8,473,350 B1 * | 6/2013 | Bouret | G06Q 30/00 |
| | | | 705/14.66 |
| 8,694,479 B1 * | 4/2014 | Heyworth | H04L 67/06 |
| | | | 705/310 |
| 8,725,565 B1 * | 5/2014 | Ryan | G06Q 30/0269 |
| | | | 705/14.4 |
| 8,793,575 B1 | 7/2014 | Lattyak et al. | |
| 8,826,036 B1 * | 9/2014 | Snodgrass | G06F 21/10 |
| | | | 370/235 |
| 8,826,191 B1 | 9/2014 | Shuma | |
| 9,055,115 B2 * | 6/2015 | Bell | H04L 67/22 |
| 9,223,475 B1 | 12/2015 | Kim | |
| 2001/0007980 A1 * | 7/2001 | Ishibashi | G06F 1/1626 |
| | | | 705/14.4 |
| 2002/0015024 A1 | 2/2002 | Westerman et al. | |
| 2002/0035697 A1 * | 3/2002 | McCurdy | G06F 17/30011 |
| | | | 726/3 |
| 2002/0046214 A1 * | 4/2002 | Sandifer | G06F 17/30011 |
| 2002/0184107 A1 * | 12/2002 | Tsuda | G06Q 30/06 |
| | | | 705/26.81 |
| 2002/0184189 A1 | 12/2002 | Hay et al. | |
| 2002/0191775 A1 * | 12/2002 | Boies | H04M 3/487 |
| | | | 379/266.01 |
| 2003/0018543 A1 | 1/2003 | Alger et al. | |
| 2003/0020687 A1 | 1/2003 | Sowden et al. | |
| 2003/0046578 A1 * | 3/2003 | Brown | G06F 21/10 |
| | | | 726/6 |
| 2003/0052900 A1 | 3/2003 | Card et al. | |
| 2003/0069812 A1 * | 4/2003 | Yuen | G06Q 30/06 |
| | | | 705/27.1 |
| 2003/0084306 A1 | 5/2003 | Abburi et al. | |
| 2003/0150298 A1 | 8/2003 | Kusama | |
| 2003/0189586 A1 * | 10/2003 | Vronay | G06F 3/0481 |
| | | | 715/700 |
| 2003/0216824 A1 * | 11/2003 | Chu | G11B 20/00086 |
| | | | 700/94 |
| 2004/0054627 A1 | 3/2004 | Rutledge | |
| 2004/0139440 A1 | 7/2004 | Browning et al. | |
| 2004/0140975 A1 * | 7/2004 | Saito | G07F 17/0014 |
| | | | 345/418 |
| 2004/0148274 A1 | 7/2004 | Warnock et al. | |
| 2005/0004949 A1 | 1/2005 | Trepess et al. | |
| 2005/0190059 A1 | 9/2005 | Wehrenberg | |
| 2005/0261044 A1 * | 11/2005 | Persidsky | A63F 3/04 |
| | | | 463/9 |
| 2006/0017692 A1 | 1/2006 | Wehrenberg et al. | |
| 2006/0031785 A1 | 2/2006 | Raciborski | |
| 2006/0095201 A1 | 5/2006 | Chao | |
| 2006/0176307 A1 | 8/2006 | Lagercrantz | |
| 2006/0194181 A1 * | 8/2006 | Rosenberg | G09B 5/06 |
| | | | 434/317 |
| 2006/0220983 A1 * | 10/2006 | Isomura | G06F 17/3028 |
| | | | 345/1.1 |
| 2006/0236260 A1 * | 10/2006 | Turcan | G06F 3/0485 |
| | | | 715/776 |
| 2006/0281058 A1 | 12/2006 | Mangoaela | |
| 2007/0026371 A1 * | 2/2007 | Wood | G09B 5/062 |
| | | | 434/317 |
| 2007/0030291 A1 * | 2/2007 | Lenger | G07F 17/32 |
| | | | 345/640 |
| 2007/0055926 A1 | 3/2007 | Christiansen et al. | |
| 2007/0100963 A1 | 5/2007 | Ban et al. | |
| 2007/0146347 A1 | 6/2007 | Rosenberg | |
| 2007/0188450 A1 | 8/2007 | Hernandez et al. | |
| 2007/0201702 A1 * | 8/2007 | Hendricks | G06F 21/10 |
| | | | 380/282 |
| 2007/0219949 A1 | 9/2007 | Mekikian | |
| 2007/0255580 A1 * | 11/2007 | Cole | G06F 21/10 |
| | | | 705/1.1 |
| 2007/0271293 A1 | 11/2007 | Peng | |
| 2008/0027868 A1 * | 1/2008 | Ljung | G06F 21/10 |
| | | | 705/51 |
| 2008/0034314 A1 * | 2/2008 | Louch | G06F 3/0481 |
| | | | 715/778 |
| 2008/0046374 A1 * | 2/2008 | Rempe | G06Q 30/06 |
| | | | 705/51 |
| 2008/0060500 A1 | 3/2008 | La et al. | |
| 2008/0065685 A1 * | 3/2008 | Frank | G06F 17/30241 |
| 2008/0086307 A1 | 4/2008 | Okayama et al. | |
| 2008/0114729 A1 * | 5/2008 | Raman | G06F 17/30997 |
| 2008/0120180 A1 | 5/2008 | Tseng | |
| 2008/0126476 A1 * | 5/2008 | Nicholas | G06Q 10/10 |
| | | | 709/203 |
| 2008/0147556 A1 | 6/2008 | Smith et al. | |
| 2008/0148362 A1 * | 6/2008 | Gilder | G06F 21/10 |
| | | | 726/4 |
| 2008/0163258 A1 | 7/2008 | Balasubramanian | G05B 23/0267 |
| | | | 719/318 |
| 2008/0168073 A1 | 7/2008 | Siegel et al. | |
| 2008/0168387 A1 * | 7/2008 | Brownrigg | G06F 3/0483 |
| | | | 715/799 |
| 2008/0195864 A1 | 8/2008 | Kim et al. | |
| 2008/0222552 A1 | 9/2008 | Batarseh et al. | |
| 2008/0229182 A1 * | 9/2008 | Hendricks | G06F 17/2235 |
| | | | 715/205 |

(56) References Cited

U.S. PATENT DOCUMENTS

| | | |
|---|---|---|
| 2008/0294674 A1 | 11/2008 | Reztlaff, II et al. |
| 2008/0307360 A1* | 12/2008 | Chaudhri ............ G06F 3/0481 |
| | | 715/835 |
| 2008/0307364 A1* | 12/2008 | Chaudhri ............ G06F 3/0483 |
| | | 715/836 |
| 2008/0320543 A1 | 12/2008 | Wang et al. |
| 2009/0012846 A1* | 1/2009 | Ertell ................ G06Q 30/0601 |
| | | 705/27.2 |
| 2009/0024621 A1* | 1/2009 | Burgess ............ G06F 17/30867 |
| 2009/0066701 A1 | 3/2009 | Kao et al. |
| 2009/0076897 A1* | 3/2009 | Ennals ............ G06F 17/30867 |
| | | 705/14.26 |
| 2009/0106110 A1 | 4/2009 | Stannard et al. |
| 2009/0216623 A1* | 8/2009 | Hendricks ............ G06Q 30/02 |
| | | 705/14.4 |
| 2009/0265470 A1 | 10/2009 | Shen et al. |
| 2009/0289958 A1 | 11/2009 | Kim et al. |
| 2010/0011315 A1 | 1/2010 | Araki |
| 2010/0023883 A1 | 1/2010 | Khazaka et al. |
| 2010/0066763 A1 | 3/2010 | MacDougall et al. |
| 2010/0073303 A1 | 3/2010 | Wu et al. |
| 2010/0077347 A1* | 3/2010 | Kirtane ................ G06F 9/4443 |
| | | 715/803 |
| 2010/0107150 A1 | 4/2010 | Kamada et al. |
| 2010/0162139 A1* | 6/2010 | Beebe ............ G06F 17/30861 |
| | | 715/760 |
| 2010/0169153 A1* | 7/2010 | Hwacinski ............ G06Q 30/02 |
| | | 705/7.31 |
| 2010/0175018 A1 | 7/2010 | Petschnigg et al. |
| 2010/0182265 A1 | 7/2010 | Kim et al. |
| 2010/0205169 A1* | 8/2010 | Narayan ............ G06F 17/3089 |
| | | 707/711 |
| 2010/0207871 A1* | 8/2010 | Reponen ............ G06F 1/1626 |
| | | 345/156 |
| 2010/0216108 A1* | 8/2010 | Cooperman ........... G09B 5/062 |
| | | 434/317 |
| 2010/0248699 A1 | 9/2010 | Dumais |
| 2010/0295773 A1 | 11/2010 | Alameh et al. |
| 2010/0315359 A1* | 12/2010 | Seong ................ G06F 15/025 |
| | | 345/173 |
| 2011/0043458 A1 | 2/2011 | Kumor |
| 2011/0050593 A1 | 3/2011 | Kim et al. |
| 2011/0050594 A1 | 3/2011 | Kim et al. |
| 2011/0072470 A1 | 3/2011 | Morris et al. |
| 2011/0072494 A1* | 3/2011 | Sato ................ G06F 3/0481 |
| | | 726/4 |
| 2011/0081923 A1 | 4/2011 | Forutanpour et al. |
| 2011/0102314 A1 | 5/2011 | Roux |
| 2011/0131664 A1* | 6/2011 | Jonsson ................ G06F 21/10 |
| | | 726/28 |
| 2011/0202832 A1 | 8/2011 | Lum |
| 2011/0227822 A1 | 9/2011 | Shai |
| 2011/0261030 A1 | 10/2011 | Bullock |
| 2011/0302009 A1* | 12/2011 | Freed ................ G06Q 30/0601 |
| | | 705/14.16 |
| 2011/0313938 A1* | 12/2011 | Dicke ................ G06Q 50/184 |
| | | 705/310 |
| 2012/0016774 A1* | 1/2012 | Dicke .................... G06Q 30/06 |
| | | 705/27.1 |
| 2012/0050004 A1* | 3/2012 | Curtis ................ G06Q 30/0214 |
| | | 340/5.2 |
| 2012/0147055 A1* | 6/2012 | Pallakoff ............... G06F 3/0483 |
| | | 345/672 |
| 2012/0179753 A1* | 7/2012 | Welingkar ......... G06Q 30/0645 |
| | | 709/204 |
| 2012/0179764 A1 | 7/2012 | Erdal |
| 2012/0197998 A1 | 8/2012 | Kessel et al. |
| 2012/0221936 A1 | 8/2012 | Patterson et al. |
| 2012/0239758 A1* | 9/2012 | Dzmitrenka ............ G06F 21/10 |
| | | 709/206 |
| 2012/0240036 A1 | 9/2012 | Howard et al. |
| 2012/0311438 A1* | 12/2012 | Cranfill ............ G06F 17/30011 |
| | | 715/256 |
| 2013/0007603 A1 | 1/2013 | Dougherty et al. |
| 2013/0021281 A1 | 1/2013 | Tse et al. |
| 2013/0095857 A1* | 4/2013 | Garcia .................... H04W 4/02 |
| | | 455/456.3 |
| 2013/0104017 A1* | 4/2013 | Ko ........................ G06F 3/0483 |
| | | 715/205 |
| 2013/0124988 A1 | 5/2013 | Lettau |
| 2013/0191740 A1* | 7/2013 | Bell ........................ H04L 67/22 |
| | | 715/273 |
| 2013/0218729 A1* | 8/2013 | Cranfill ............ G06F 17/30011 |
| | | 705/27.1 |
| 2013/0219269 A1* | 8/2013 | Cranfill ............ G06F 17/30011 |
| | | 715/256 |
| 2013/0219270 A1* | 8/2013 | Cranfill ............ G06F 17/30011 |
| | | 715/269 |
| 2013/0219321 A1* | 8/2013 | Cranfill ............ G06F 17/30011 |
| | | 715/776 |
| 2013/0219322 A1* | 8/2013 | Cranfill ............ G06F 17/30011 |
| | | 715/776 |
| 2013/0232409 A1* | 9/2013 | Cranfill ............ G06F 17/30011 |
| | | 715/256 |
| 2013/0262476 A1* | 10/2013 | Barak ............... G06F 17/30905 |
| | | 707/748 |

FOREIGN PATENT DOCUMENTS

| | | |
|---|---|---|
| JP | H07262219 A | 10/1995 |
| JP | 2002358279 A | 12/2002 |
| JP | 2003/150298 | 5/2003 |
| JP | 2003150298 A | 5/2003 |
| JP | 2004/139440 | 5/2004 |
| JP | 2004139440 A | 5/2004 |
| JP | 2004/264108 | 9/2004 |
| JP | 2006107260 A | 4/2006 |
| JP | 2007279848 A | 10/2007 |
| JP | 2007293460 A | 11/2007 |
| JP | 2008205623 A | 9/2008 |
| KR | 10-2006-0023323 | 3/2006 |
| KR | 10-2007-0031153 | 3/2007 |
| WO | 2008114491 | 9/2008 |

OTHER PUBLICATIONS

Mexican Office Action in MX Application No. MX/a/2012/008069, dated Jun. 16, 2014, 6 pages.
Korean Notice of Last Preliminary Rejection in KR 10-2012-7021261 w/ English Translation, dated Dec. 5, 2014, 11 pages.
European Communication pursuant to Article 94(3) EPC in EP 11 700 777.3, dated Jan. 23, 2015, 4 pages.
Chinese Office Action in Application No. 201180013437.3, dated Mar. 12, 2015, 14 pages.
Japanese Office Action in JP Application No. 2012-548233, dated Nov. 25, 2013, 4 pages.
Anonymous (Shelfari): "Welcome to Shelfari!", Internet , Oct. 27, 2009 (Oct. 27, 2009), pp. 1-1, XP002636063, Retrieved from the Internet: URL:http://classic-web.archive.org/web/20091027221323/http://www.shelfari.com/ [retrieved on Oct. 27, 2009], 1 page.
Invitation to pay additional fees and, where applicable, protest fee for PCT/US2011/020874, mailed May 23, 2011, 8 pages.
International Search Report for PCT/US2011/020874, mailed Jul. 28, 2011, 6 pages.
International Preliminary Report on Patentability for PCT/US2011/020874, issued Jul. 17, 2012, 11 pages.
Australian Patent Examination Report for AU Patent Application No. 2011203833 dated Jul. 3, 2013, 2 pages.
Japanese Office Action in JP Application No. 2012-548233, dated Aug. 4, 2014, 6 pages.
Australian Patent Examination Report for AU Patent Application No. 2014233611 dated Aug. 7, 2015, 2 pages.
Chinese Office Action in Chinese Application No. CN201180013437.3, dated Jul. 3, 2014, 15 pages (English translation).

(56) References Cited

OTHER PUBLICATIONS

Amazon Kindle Users Guide, Amazon.com, 4th edition, published 2009, 145 pages.
Chinese Office Action in Application No. 201180013437.3, dated Mar. 28, 2016, 15 pages.
Korean Office Action in Application No. 10-2015-7011006, dated Mar. 25, 2016, 13 pages.
Korean Office Action for Application No. 10-2015-7011006, dated Oct. 31, 2016, 14 pages.
Korean Office Action in KR Application No. 10-2012-7021261, dated Mar. 20, 2014, 16 pages.
Chinese Office Action for Application No. 201180013437.3, dated Mar. 14, 2017, 17 pages.
Korean Office Action for Application No. Oct. 2015-7011006, dated Mar. 20, 2017, 12 pages.
Australian Office Action for Application No. 2016202713, dated May 12, 2017, 5 pages.

* cited by examiner

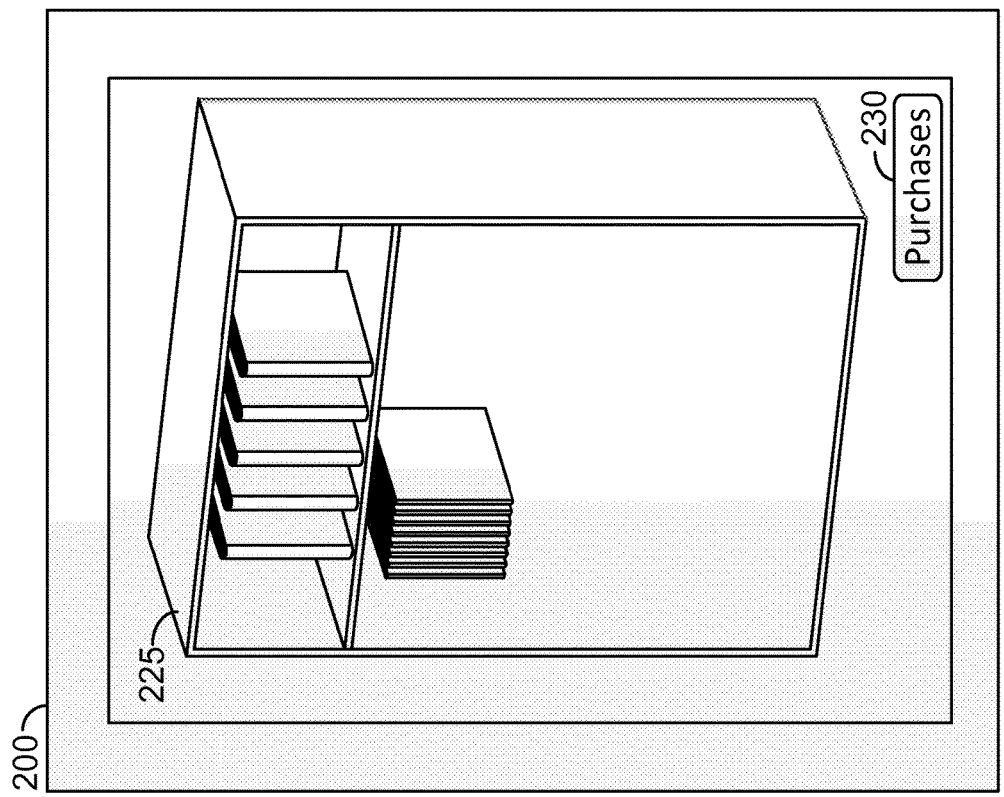
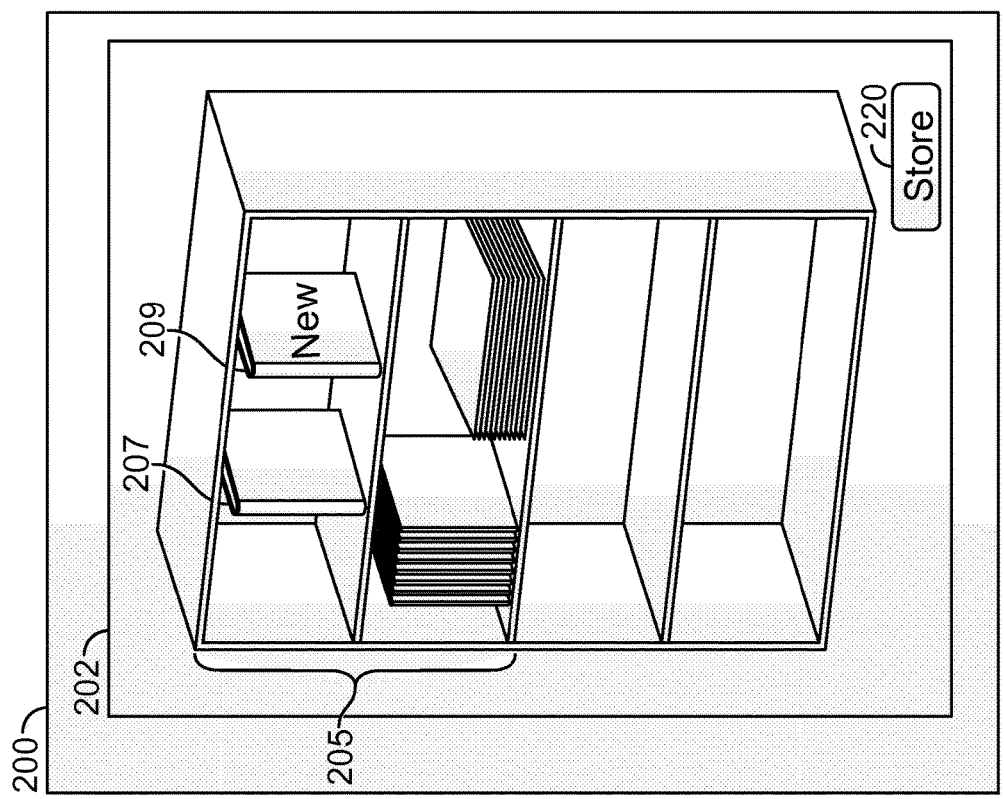
FIG. 7A
FIG. 7B

2000

Present, within an electronic book reader application on an electronic device, a representation of an electronic book with an indication of left side pages and an indication of right side pages (2010)

Enable the user to navigate through the electronic publication with a relative indicator identifying a portion of the electronic publication being accessed by the user (2020)

Modify, using the relative indicator, the indication of the left side pages and the indication of right side pages to reflect a relative height of left side pages and right side pages (2030)

FIG. 20

PRESENTING ELECTRONIC PUBLICATIONS ON A GRAPHICAL USER INTERFACE OF AN ELECTRONIC DEVICE

CROSS-REFERENCE TO RELATED APPLICATIONS

This application is a National Stage application under 35 U.S.C. §371 of International Application No. PCT/US2011/020874, having an International Filing Date of Jan. 11, 2011, which claims priority to U.S. Provisional Application No. 61/294,106, filed Jan. 11, 2010, U.S. Provisional Application No. 61/298,539, filed Jan. 26, 2010, U.S. Provisional Application No. 61/298,889, filed Jan. 27, 2010, and U.S. Application No. 61/320,678, filed Apr. 2, 2010. These applications are all entitled, "Electronic Text Manipulation and Display," and are incorporated by reference.

BACKGROUND

This disclosure relates to displaying and facilitating the manipulation of electronic text, for example, the text of an electronic book ("eBook") being read on an electronic device. Much like an ordinary printed book, electronic books ("eBooks") can be used to present text and pictures to readers. Instead of ink and paper, however, an electronic book is a collection of digital data that software, known as an electronic book reader application, can interpret and present on a display. A variety of devices run electronic book reader software such as desktop and notebook computers, eBook readers, smart phones and/or other mobile devices. One available format for eBooks is defined by the "ePub" standard, which is maintained by The International Digital Publishing Forum (IDPF).

SUMMARY

In one general sense, information is presented to a user by accessing a library of electronic publications that includes a first publication, generating a representation of the first publication in an electronic bookshelf, determining a state for the first publication, and modifying the representation of the first publication to reflect the state of the first publication.

Implementations may include one or more of the following features. For example, generating the representation may include presenting a recently-purchased book using a front cover view or presenting a recently-accessed book using a front cover view. It may be determined that the first publication has not been recently accessed and the representation may be modified so that a binding view of the first publication is presented instead of a front cover view of the first publication. Modifying the representation of the first publication includes presenting a layer of dust over the first publication. Presenting the layer of dust may include presenting an animated dust cloud in response to receiving a user instruction to access the first publication.

In another general sense, information is presented to a user by accessing a library of electronic publications that includes a first publication, generating a representation of the first publication in an electronic bookshelf, determining a state for the first publication relative to other publications in the electronic bookshelf, determining an organization of the electronic bookshelf based on the state of the first publication relative to a state of other publications within the library, and presenting the first publication in the electronic bookshelf to reflect the organization of the electronic bookshelf.

Implementations may include one or more of the following features. For example, determining the state may include determining a date of purchase, a date of release or a date of access. Determining an organization may include generating an ordered list that sorts the library according to a purchase criterion. Determining an organization may include generating an ordered list that sorts the library according to a release date criteria. Determining an organization may include generating an ordered list that sorts the library according to access date criteria.

Presenting the first publication in the electronic bookshelf to reflect the organization of the electronic bookshelf may include presenting unread books in a prioritized shelf within the electronic bookshelf. Presenting the unread books in the prioritized shelf includes presenting the unread books in a top shelf. Presenting the unread books in the prioritized shelf may include presenting the unread books in a leftmost portion of a shelf. Presenting the first publication in the electronic bookshelf to reflect the organization of the electronic bookshelf may include presenting newly-purchased books in a prioritized shelf within the electronic bookshelf.

A user may be enabled to customize the placement the first publication after being presented with the organization of the electronic bookshelf. Presenting the first publication in the electronic bookshelf to reflect the organization of the electronic bookshelf may include presenting recently-accessed books in a prioritized shelf within the electronic bookshelf.

In yet another sense, information is presented to a user by accessing a library of electronic publications that includes a first publication, determining a state for the first publication, and generating a representation of the first publication in an electronic bookshelf that reflects the state of the first publication.

Implementations may include one or more of the following features. For example, generating the representation may include generating a magazine icon in response to determining that the first publication is a magazine. Generating the representation may include generating a newspaper icon in response to determining that the first publication is a newspaper. Generating the representation may include generating a label over the representation indicating the state of the first publication. Generating the label may include generating a label indicating that the first publication has not yet been accessed.

Generating the label may include generating a label indicating that the first publication is newly purchased. Generating the label may include generating a label indicating that the first publication is being downloaded. Determining the state for the first publication may include determining a location for a first device, determining that content appearing in the electronic bookshelf is associated with the location, and presenting the content to the user indicating that the content is relevant to the location.

Presenting the content may include a presenting a ribbon to indicate a relevance of the content. Presenting the content may include placing the content using a specified bookshelf location to indicate a relevance of the content.

In yet another sense, information is presented to a user by accessing a library of electronic publications, generating a representation of the first publication in an electronic bookshelf in a bookshelf view that indicates electronic publications that are owned by a user, enabling the user to switch between a bookstore view and the bookshelf view, receiving an instruction from the user to switch from the bookshelf view to the bookstore view, and generating, in response to receiving the instruction from the user to switch from the bookshelf view to the bookstore view, a display of an animated transition of a revolving bookshelf that originally presents the bookshelf view and concludes the animated transition by displaying the bookstore view.

Implementations may include one or more of the following features. For example, a user may be enabled to select a representation of an advertised electronic publication appearing within the bookstore view. The representation of the advertised electronic publication appearing within the bookstore view may be modified forward along a z-axis arising from an electronic reader and from the bookstore view to a user so as to present the advertised electronic publication as floating in front of the bookstore view. While preserving the advertised electronic publication as floating in front of the revolving bookshelf, an animated transition of the revolving bookshelf that originates with the bookstore view and concludes the animated transition by displaying the bookshelf view may be generated and the representation of the advertised electronic publication appearing within the bookstore view is modified forward from the bookstore view to the user so as to present the advertised electronic publication as transitioning from a floating view into the bookshelf view of the electronic bookshelf.

In still another sense, information is presented to a user by enabling a user to download an electronic publication in a promotional configuration, enabling the user to navigate through the electronic publication with a relative indicator identifying a portion of the electronic publication being accessed by the user, enabling the user to purchase a full version of the electronic publication, downloading, as a result of a purchase, the full version of the electronic publication, and preserving the relative indicator so that subsequent user access to the electronic publication enables the user to access the portion of the electronic publication associated with the relative indicator.

Implementations may include one or more of the following features. For example, a bookmark control may be presented within the electronic publication in the promotional configuration. Using the electronic bookmark control within the electronic publication, a user instruction to set an electronic bookmark may be received and, in response to receiving the user instruction, the electronic bookmark is set to return to a place associated with a relative indicator at a time of receiving the user instruction. During the purchase of the full version of the electronic publication, the electronic bookmark is preserved.

Presenting the electronic bookmark control may include presenting the electronic bookmark control in association with a reading history indicating which portion of the electronic publication has been accessed. Presenting the electronic bookmark control may include presenting the electronic bookmark control in association with a progress bar that indicates which portions of the electronic publication have been read relative to those portions of the electronic publication that have not been read.

In yet another sense, information is presented to a user by enabling a user to purchase an electronic publication using an electronic bookstore, enabling the user to download the electronic publication to a first device, recording a user purchase of the electronic publication, receiving an indication that the user has a second device, and enabling the user to transmit the electronic publication to the second device.

Implementations may include one or more of the following features. For example, enabling the user to purchase the electronic publication using the electronic bookstore may include enabling the user to purchase the electronic publication within an electronic bookstore application within the first device. Recording the user purchase of the electronic publication may include recording the user purchase for a user account on a history server. A history of purchases may be displayed to the user. Displaying the history of purchases may include presenting a menu for each entry in the history of purchases enabling the user to perform additional actions for an already-purchased publication. Enabling the user to perform additional actions may include enabling the user to transmit the electronic publication to the second device. Receiving the indication that the user has the second device may include receiving an instruction from a registration server that the user has registered a second device for a user account.

Enabling the user to transmit the electronic publication to the second device may include generating a representation of the second device within the electronic bookstore and configuring the representation of the second device to trigger transmission of the electronic publication to the second device in response to receiving user selection of the representation of the second device.

Enabling the user to transmit the electronic publication to the second device may include enabling the user to transmit the electronic publication without a requiring the user to purchase the electronic publication for the second device. Enabling the user to transmit the electronic publication to the second device may include enabling the user to transmit the electronic publication in response to receiving a user instruction to purchase a distribution fee to distribute an already purchased publication to the second device. Transmitting the electronic publication to the second device may include formatting the electronic publication from a first format for the first device to a second format for the second device.

In still another sense, information is presented to a user by presenting, within an electronic book reader application on an electronic device, a representation of an electronic book with an indication of left side pages and an indication of right side pages, enabling the user to navigate through the electronic publication with a relative indicator identifying a portion of the electronic publication being accessed by the user, and modifying, using the relative indicator, the indication of the left side pages and the indication of right side pages to reflect a relative height of left side pages and right side pages.

Implementations may include one or more of the following features. For example, a representation of a binding that displays the indication of the left side pages and the indication of right side pages may be presented. Modifying the indication of left side pages may include presenting the indication of left side pages on a granular basis where the relative height reflects a is based upon a mathematic proportion of pages that have been read relative to an overall number of pages in the electronic book. Modifying the indication of left side pages may include presenting the indication of left side pages in one of several discrete heights where the one discrete height is used for a range of pages.

In yet another sense, information is presented to a user by presenting, within an electronic book reader application on an electronic device, a representation of an electronic book that may include an electronic representation of a paper page, enabling a user to interact with the page through a touch screen control to navigate through the electronic book, recording, on the electronic device, physical characteristics of the user interaction with the touch screen control to navigate through the electronic book, identifying, based on the physical characteristics of the user interaction, a modeled impact on the electronic representation of a paper page, and generating an animated transition reflecting a page turning of the electronic representation of a paper page that reflects the modeled impact.

Implementations may include one or more of the following features. For example, identifying the modeled impact reflects a location within the electronic representation of the paper page where the user touched the electronic representation of a paper page. Identifying the modeled impact reflects a velocity at which the user swiped the electronic representation of the paper page to turn the page. Identifying the modeled impact reflects an acceleration at which the user swiped the electronic representation of the paper page to turn the page. Identifying the modeled impact reflects a direction at which the user swiped the electronic representation of the paper page to turn the page. Identifying the modeled impact reflects a user tilting the electronic device to turn the page. Identifying the modeled impact reflects an acceleration applied in tilting the electronic device to turn the page.

Identifying the modeled impact reflects an angle applied by a user to tilt the electronic device to turn the page. Identifying the modeled impact reflects differences in an orientation of the electronic device applied by a user to tilt the electronic device to turn the page. Identifying the modeled impact reflects whether the orientation of the electronic device has been changed by more than a threshold amount.

In still another sense, a user is enabled to access an electronic bookstore by presenting, within an electronic book reader application on an electronic device, a representation of an electronic book that may include an electronic representation of a paper page, presenting, within the electronic book reader application, a control to access an electronic bookstore, enabling the user to interact with the control to access the electronic bookstore, receiving, through user interaction with the control, a user instruction to access the electronic bookstore, determining that a wireless communications interface on the electronic device is not active, activating the wireless communications interface, and presenting, using the wireless communications interface, materials from the electronic bookstore.

Implementations may include one or more of the following features. For example, presenting, using the wireless communications interface, materials from the electronic bookstore may include presenting a network Uniform Resources Locator (URL) for the electronic bookstore. Presenting the control to access the electronic bookstore may include presenting a control embedded within the electronic representation of a paper page. Presenting the control embedded within the electronic representation of the paper page may include presenting the control within an end of book page. Presenting the control to access the electronic bookstore may include presenting a control peripheral to the electronic representation of a paper page.

In yet another sense, information is presented to a user by presenting, within an electronic book reader application on an electronic device, a representation of an electronic book that may include an electronic representation of a paper page, enabling a user to interact with the page through a touch screen control to navigate through the electronic book, detecting that a user has touched a portion of the electronic representation of the paper page, detecting that the user intended to hold the touched portion, and presenting, in response to detecting that the user intended to hold the touched portion, a menu of commands related to the touched portion of the electronic representation of a paper page.

Implementations may include one or more of the following features. For example, detecting that the user intended to hold the touched portion may include detecting that the user has touched the portion of the electronic representation of the page for more than a threshold period of time. Detecting that the user intended to hold the touched portion may include detecting that an area of the touched portion has expanded after a threshold period of time has elapsed indicated that a user has applied increased pressure. Detecting that the user intended to hold the touched portion may include detecting that the electronic device has been lowered.

Content related to the touched portion may be identified. The identified content is used to identify commands for incorporation within the menu of commands and the identified commands are presented within the menu of commands. Content related to the touched portion may be identified. The identified content to identify applications is used for incorporation within the menu of commands and the identified applications are presented within the menu of commands. Using the identified content to identify applications may include identifying additional electronic publications available in an electronic bookstore related to the content appearing in the touched portion. Using the identified content to identify applications may include identifying a dictionary or encyclopedia entry related to the content appearing in the touched portion. Using the identified content to identify applications may include identifying applications related to the content appearing in the touched portion.

In still another sense, information is presented to a user by presenting, within an electronic book reader application on an electronic device, a representation of an electronic book that may include an electronic representation of a paper page, enabling a user to interact with an accelerometer for the electronic device by controlling an orientation of the electronic device, capturing, using the accelerometer for the electronic device, user manipulation of the electronic device, identifying, based on the user manipulation of the electronic device, a command for the electronic book, and performing the command on the electronic book.

Implementations may include one or more of the following features. For example, capturing the user manipulation and identifying the command may include detecting that the electronic device has been tilted less than a threshold degree. In response to detecting that the electronic device has been tilted less than the threshold degree, an excerpt of a next page in the electronic book is presented. Capturing the user manipulation and identifying the command may include detecting that the electronic device has been shaken and presenting, in response to detecting that the electronic device has been shaken, that the electronic book has been returned to an electronic bookshelf. Capturing the user manipulation and identifying the command may include detecting that the electronic device has been manipulated in a first manner and presenting, in response to detecting that the electronic device has been manipulated in the first manner, that a cover of the electronic book has been closed.

Detecting that the electronic device has been manipulated in the first manner may include determining that the electronic device has been flipped towards the user. Capturing the user manipulation and identifying the command may include detecting that the electronic device has been manipulated in a second manner and presenting, in response to detecting that the electronic device has been manipulated in the second manner, a designated of a portion electronic book.

Detecting that the electronic device has been manipulated in the second manner may include determining that the electronic device has been tilted twice in a first direction to retrieve a table of contents. Detecting that the electronic device has been manipulated in the second manner may include determining that the electronic device has been tilted twice in a second direction to retrieve an index. Detecting that the electronic device has been manipulated in the second manner may include determining that a representation of a binding in the display has been pinched to close an electronic book. Capturing the user manipulation and identifying the command may include detecting that the electronic device has been set on a surface and presenting, in response to detecting that the electronic device has been has been set on a surface, a screen saver for the electronic book. Presenting, the screen saver for the electronic book may include presenting an electronic representation of the paper page flapping in a breeze.

In yet another sense, a user is enabled to interface with an electronic publication by presenting, within an electronic book reader application on an electronic device, a representation of an electronic book that may include an electronic representation of a paper page, enabling a first user to interact with a touch screen controller for the electronic device, capturing user manipulation of the touch screen controller, identifying, based on the user manipulation of the touch screen controller, a command for interfacing with a second user through the electronic book, and performing the command for the electronic book.

Implementations may include one or more of the following features. For example, identifying the command may include identifying a transmission command that transits the electronic page to the second user. Identifying the command may include identifying a transmission command that transits the electronic book to the second user. Identifying the command may include identifying a throwing gesture to establish a communications interface with the second user. Identifying the command for interfacing with the second user may include establishing a command to establish a communications interface with the second user through a wireless Local Area Network interface. Identifying the command for interfacing with the second user may include establishing a command to establish a communications interface with the second user through a wireless telecommunications interface. Identifying the command for interfacing with the second user may include establishing a command to establish a communications interface with the second user through a short range wireless interface.

In still another sense, a user is enabled to interface with an electronic publication by presenting, within an electronic book reader application on an electronic device, a representation of an electronic book that may include an electronic representation of a paper page, enabling a first user to interact with a touch screen controller for the electronic device, capturing, user manipulation of the touch screen controller, identifying, based on the user manipulation of the touch screen controller, a command to interface with an electronic bookshelf, and performing the command for the electronic book.

Implementations may include one or more of the following features. For example, identifying the command to interface with the electronic bookshelf may include receiving a command to advance to a next selection in the electronic bookshelf without displaying the electronic bookshelf. Receiving the command to advance to the next selection in the electronic bookshelf may include detecting that three fingers have touched the electronic device, and detecting that the three fingers have swiped the touch screen controller.

In yet another sense, information is presented to a user by presenting, within an electronic book reader application on an electronic device, a representation of an electronic book that may include an electronic representation of a paper page in a first orientation, presenting a first portion of the electronic book in the first orientation, enabling a user to manipulate an orientation of the electronic device from a first orientation to a second orientation, determining whether to preserve a font size, identifying, based on the first portion and in response to determining to preserve the font size, a second portion that will be displayed in the second orientation, and displaying, in the second orientation, the second portion.

Implementations may include one or more of the following features. For example, enabling the user to manipulate the orientation of the electronic device from the first orientation to the second orientation may include enabling the user to switch from a landscape orientation to a portrait orientation. Identifying the second portion may include identifying content for removal from the first portion in order to render the second portion. Enabling the user to manipulate the orientation of the electronic device from the first orientation to the second orientation may include enabling the user to switch from a portrait orientation to a landscape orientation that displays two pages. Identifying the second portion may include identifying additional content to supplement the first portion in order to render the second portion.

In still another sense, information may be presented to a user by presenting, within an electronic book reader application on an electronic device, a representation of an electronic book that may include an electronic representation of a paper page in a first orientation, presenting a first portion of the electronic book in the first orientation, enabling a user to manipulate an orientation of the electronic device from a first orientation to a second orientation, determining whether to preserve a font size, identifying, based on the first portion and in response to determining to not preserve the font size, a second portion that will be displayed in the second orientation, and displaying, in the second orientation, the second portion.

Implementations may include one or more of the following features. For example, enabling the user to manipulate the orientation of the electronic device from the first orientation to the second orientation may include enabling the user to switch from a landscape orientation to a portrait orientation. Identifying the second portion may include identifying a font size to be used to render the second portion. Enabling the user to manipulate the orientation of the electronic device from the first orientation to the second orientation may include enabling the user to switch from a portrait orientation to a landscape orientation that displays two pages. Identifying the second portion may include identifying a font size to be used to render the second portion.

DESCRIPTION OF DRAWINGS

FIGS. 7A and 7B illustrate an electronic client device that uses a bookshelf metaphor to indicate to a user of the device which eBooks (and/or other items of digital media) are available to the user.

FIGS. 14-28 include flow charts of various processes used to present information to a user.

OVERVIEW

This disclosure relates to displaying and facilitating the manipulation of electronic text, for example, the text of an electronic book ("eBook") being read on an electronic device. Much like an ordinary printed book, electronic books ("eBooks") can be used to present text and pictures to readers. Instead of ink and paper, however, an electronic book is a collection of digital data that software, known as an electronic book reader application, can interpret and present on a display. A variety of devices run electronic book reader software such as desktop and notebook computers, eBook readers, smart phones and/or other mobile devices. One available format for eBooks is defined by the "ePub" standard, which is maintained by The International Digital Publishing Forum (IDPF).

In addition, the growth of mobile platforms has created a rich and vibrant market for viewing various types of documents on mobile devices. For example, a variety of electronic books may be read on platforms that include mobile phones, dedicated eBook reader devices, and tablet-oriented computing devices. However, given the potential to spend countless time on these platforms, for example, to read an electronic book, various adjustments may be made to improving the user experience by configuring the eBook reader device to render content in a manner responsive to a user's needs.

Although the purchase, usage and popularity of eBooks is increasing, it is recognized that a certain segment of the book reading population might be hesitant to give up their paper & ink publications and adapt to the world of eBooks. Consequently, an eBook may be configured to provide a reading experience that is feature and/or content enriched, user-friendlier and/or otherwise enhanced. For example, some aspects of the subject matter described here are directed at making the eBook experience more closely resemble aspects of the paper & ink book-reading experience that readers enjoy and may be hesitant to give up. At the same time, the disclosed subject matter may enhance the eBook reading experience even for current users and enthusiasts of conventional eBook technology.

In general, an aspect of the subject matter described here is that an eBook environment may be implemented to emulate, at least in part, a bricks & mortar bookstore that sells conventional paper & ink hardcover books, potentially along with other types of publications (e.g., magazines and newspapers).

Figure 1:
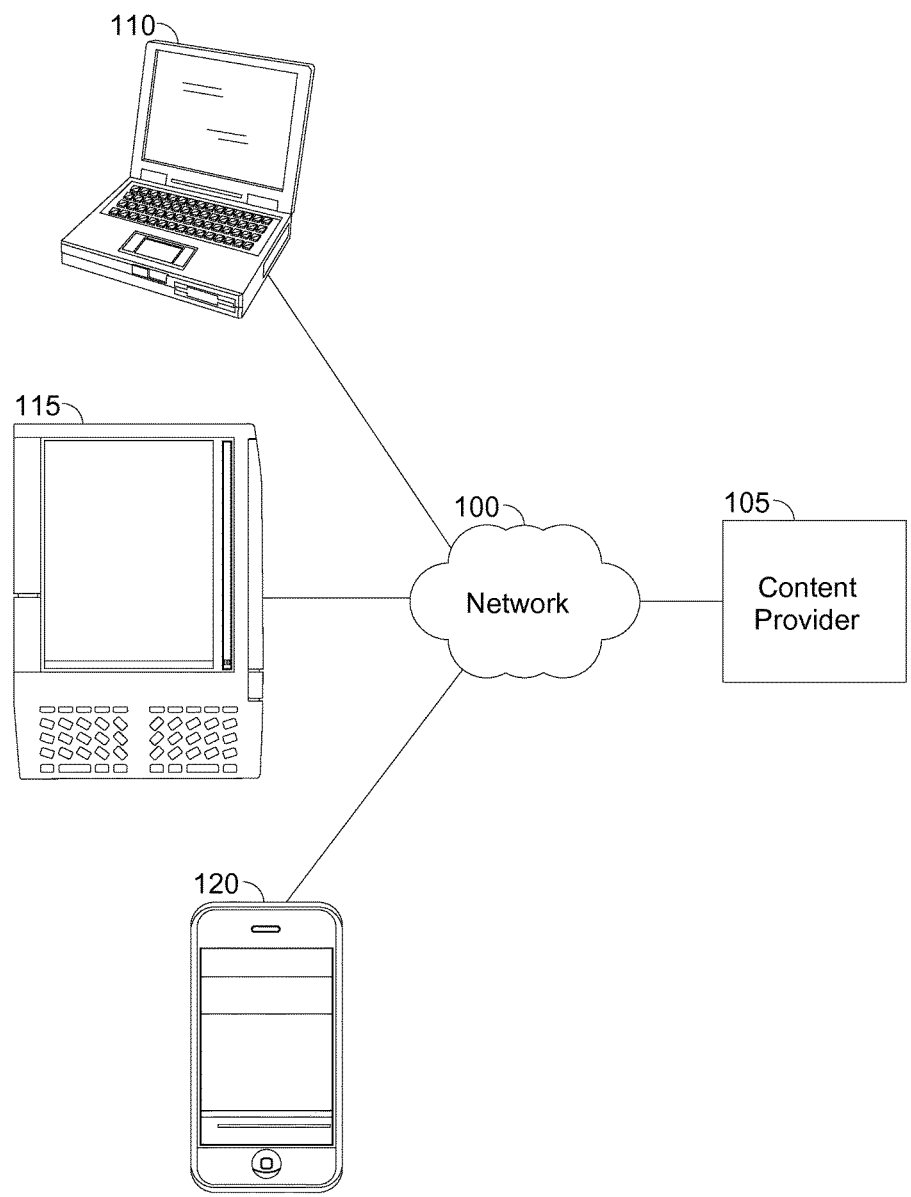
FIG. 1 illustrates different types of electronic devices that are configured to access, via a network, items of digital media residing on a computer system controlled by a content provider.

As shown in FIG. 1, any of several different types of electronic devices (e.g., notebook computer 105, a tablet computer or eBook reader device 115, smart phone 120) may be configured to access, via a network 100, items of digital media (e.g., eBooks, movies, songs or the like) residing on a computer system controlled by a content provider 105 (e.g., an online web site that sells eBooks and/or other types of digital media). A user of such an electronic device can view, purchase and download eBooks from the content provider 105 and then use eBook application software residing on the electronic device to read or otherwise peruse the purchased eBook.

Figure 2B:
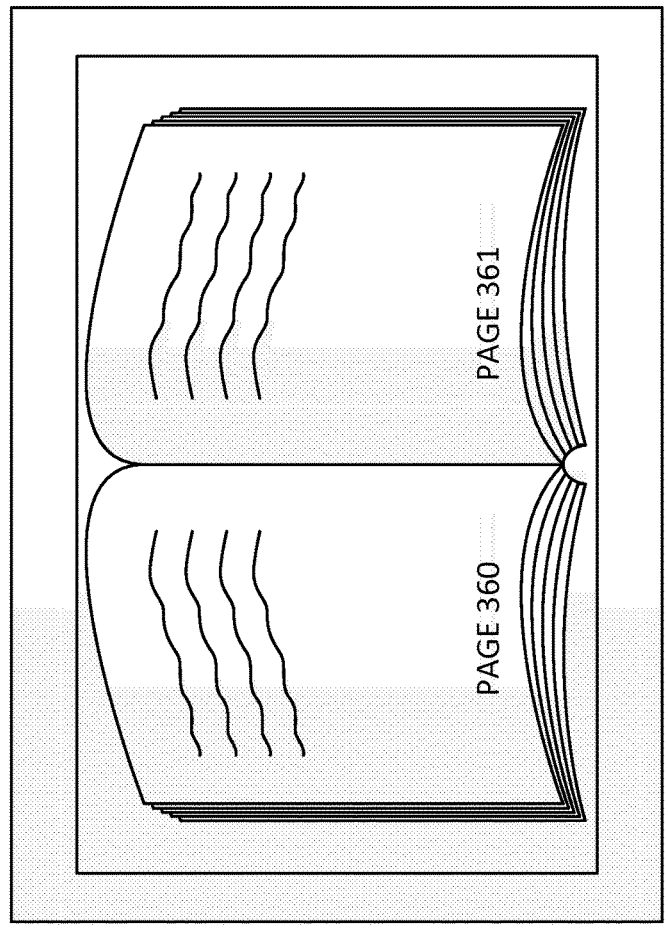
FIGS. 2A and 2B illustrate how eBook reader devices may be configured to present materials in more than one orientation.
Figure 2A:
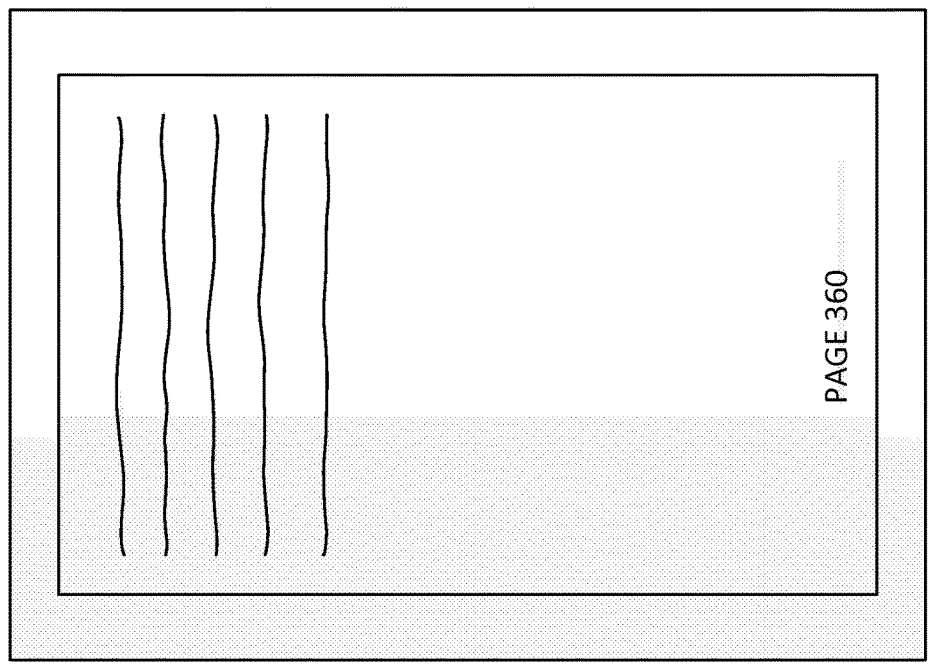

FIGS. 2A and 2B illustrate how eBook reader devices may be configured to present materials in more than one orientation. Optionally, the eBook reader device can include an accelerometer or equivalent to enable software executing on the device to determine the device's attitude—specifically, whether the device is being held in a portrait orientation as shown in FIG. 2A or in landscape orientation as shown and further to detect when transitions occur from one orientation to another, and to change the display accordingly. Specifically, FIGS. 2A and 2B illustrate how eBook reader devices may be configured to present materials in more than one orientation. For example, if a user is reading an eBook application in portrait orientation as shown in FIG. 2A, and assuming that only a single page of the eBook application is being displayed at the time, and then the user rotates the device to hold it in landscape orientation as shown in FIG. 2B, software running on the device can detect that transition (based on output from the accelerometer) and automatically cause the device's display to change so that the eBook's text is displayed in the proper direction for the user easily read it in the current orientation. At the same time, the display can be automatically be changed to cause two pages of the eBook to be displayed to the user (as shown in FIG. 2B) instead of just one page (as shown in FIG. 2B). The converse may be applied if the user subsequently returns the device's orientation to portrait as shown in FIG. 2A. The change in orientation may be used, in turn, to inspire a change in the available display area. Thus, positioning an eBook application in portrait mode may lead to a first orientation that results in a first allocation of display space while positioning the eBook application in a landscape mode may lead to a second orientation that results in a first allocation of display. Each of the orientations may in turn regulate how the different displayable objects within an eBook application are rendered. For example, the first orientation may result non-interactive thumbnail image of the displayable object being rendered while a second orientation may result in a second reduced-size representation with a user-interactive object corresponding to the displayable object being rendered.

In one configuration, if the user is reading page 360 of the eBook while in portrait orientation (FIG. 2A), then upon changing to the landscape orientation (FIG. 2B), the device would automatically respond by displaying an image of a folded-open hardcover book in which the entirety of page 360 is on the left side of the display and the entirety of the next page of the eBook (that is, page 361) is displayed on the right side of the display, thereby doubling the amount of visible eBook text, and further extending the appearance that he/she is reading a real paper & ink book. Alternatively, instead of displaying the current page (page 360) and the next page (page 361) in response to a rotation of the device from portrait to landscape orientation, the current page and the previous page could both be displayed. In terms of the example shown in FIGS. 2A-2B, in this alternative implementation (which optionally could be selected by the user of the device), a rotation of the device from the portrait orientation shown in FIG. 2A to the landscape orientation would result in the current page (page 360) being displayed on the right side of the display and the previous page (page 359) being displayed on the left side of the display.

The eBook reader device can display suggestions to the user (e.g., using a mechanism analogous to the Genius functionality available in iTunes from Apple Inc.) for additional reading or other content (e.g., movies, songs, etc.), for example, publications by the same author, same genre, background reading, audiobook versions of the eBook, movie versions of the eBook, songs in the soundtrack of a movie version of the eBook, and/or demographic and/or psychographic suggestions that be purchased (or sampled) in the online bookstore. Such suggestions may be displayed to the user at the end of the eBook under consideration. In addition, such suggestions can be downloaded in the background while the device is connected to the network, and cached on the user's device, thereby making them available for display to the user even if the user is not presently connected to a network (that is, is offline) when the end of an eBook is reached.

The online bookstore environment and user interaction may be implemented to provide the user with a seamless download experience. For example, as noted above, the use can download a (free) sample of an eBook in which he/she is potentially interested and then read that eBook sample on the user's device. If the user then decides to purchase a full copy of that, e.g., first chapter of a book, then aided by the tight integration between the eBook application software and the online bookstore website, the sample copy can be automatically deleted from the user's device and replace with a full copy of the eBook along with a bookmark indicating where the user left off reading in the sample copy.

The context of a user's location in an eBook may be used to determine whether to render a first reduced-size representation comprising a non-interactive thumbnail image of the displayable object or a second reduced-size representation comprising a user-interactive object corresponding to the displayable object. For example, if the user is at the beginning of a book and a table of contents is being rendered, a first reduced-sized representation may be rendered. On the other hand, if the user is viewing the end of an eBook where voluminous references and citations appear, the eBook may be configured to render a second reduced-size representation comprising a user-interactive object corresponding to the displayable object (in order to facilitate varying degrees of review of voluminous reference material that may be available). Identifying the user's current reading position may involve applying multiple different techniques in sequence, perhaps in an order of priority based on an associated level of confidence that the respective techniques will produce correct, helpful or acceptable results. For example, a current reading position determination based on current page number is relatively unlikely to produce a correct result, as the pagination of an eBook is dynamic and necessarily changes with factors such as font choice, font size, page size and margin size. Basing a current reading position determination on word or paragraph count (that is, as counted from the first word or paragraph of the document) of the currently displayed text may be more likely to produce a better result, but still may be unacceptably inaccurate if an updated or supplemented version of the eBook in question has been downloaded on the device since the user stopped reading. Another perhaps more accurate technique for determining current reading position may be to snag and remember a string of likely unique text on the currently displayed page and then subsequently attempt to find that same string of text in another copy of that same eBook, for example, that the user seeks to read on a different device (e.g., user leaves off reading an eBook on a notebook computer and seeks to pick up where he/she left off on in that same eBook but on a separate device such as an eBook application).

The size of the text string to be used in this technique can vary depending on application and implementation preferences. One option would be to use a relatively large string size (e.g., 1000 characters) to increase the likelihood that the chosen string is unique. But if no match for a text string of that greater length is found, then a second iteration of the search could use a smaller string length and look for a best or closest match. The scenario of not finding an exact match when looking for a current reading position based on a unique text string is most likely to occur when seeking to find current reading position in a version of the document that differs somewhat from the version of the document that was being read when the user stopped reading.

The present configuration for an eBook reader device may be used to determine whether to render a first reduced-sized representation may be rendered or a second reduced-size representation comprising a user-interactive object corresponding to the displayable object. For example, if a smaller font size is being used and/or the device determines that the user is navigating through the material at a rapid pace, the eBook application may determine that the user is merely perusing the material at a high level and present content in a manner commensurate with a user perusing material. Thus, a second reduced-size representation comprising a user-interactive object corresponding to the displayable object may be used if the eBook application determines that the user is not likely to be interested in any one piece of content that is being rendered. The second reduced-size representation comprising a user-interactive object may be used so that the user may selectively invoke the user-interactive object for those instances where the underlying content draws additional user interest while the user is perusing content. In contrast, if a user appears to be reviewing materials at a slower rate, then a presentation mode that facilitates detailed inspection of all content may be used.

Assuming an acceptable method of determining current reading position has been implemented, that feature can be used to facilitate dynamic (either in real time, periodical or based on discrete events) logging and updating of current reading positions for all of a user's eBooks. These current reading positions can be maintained an updated at a central location so that the user can quickly and easily change reading devices while automatically and effortlessly keeping track of his/her reading position in each of his/her eBooks or other electronic documents. A log then may be analyzed to develop a model for the user's reading habits so that a presentation mode can more accurately be predicted.

Optionally, some user behaviors should be taken into account when determining whether or not to update a current reading position. For example, if a user jumps to an entirely different location in an eBook (e.g., table of contents, index or the like) this may be flagged as non-reading behavior and thus not used to present content that can be readily read. Similarly, if a user skims quickly through an eBook at a rate typically too fast for a human to read the text displayed, then the currently reading position may not be changed.

Different graphical representations of bookmarks can be implemented to provide enhanced functionality and ease of use. For example, user specified bookmarks could appear in one manner and bookmarks from other sources (e.g., author, publisher, friends, colleagues, other third parties) could each have their own unique appearance to aid in distinguishing them from each other.

Bookmarks relating to the same digital content may be shared among different users, for example over local network such as an ad hoc network arising from a zero-network configuration protocol such as Bon Jour. In that case, useful examples arise, such as a teacher being able to automatically share bookmarks with students in the teacher's class so that the students can better follow along with the instruction.

An eBook reader device optionally can implement a scrubbing bar GUI mechanism with which a user can interact (e.g., by dragging his/her finger along) to quickly flip through pages in an eBook. A scrubbing bar can appear along the horizontal and/or vertical access of an eBook. Increments (tick marks) on the scrubbing bar may correspond to pages, chapters, sections or the like depending on the desired implementation and/or on a per eBook basis (and/or as customized/selected by user, author, retailer, publisher, etc.). The style (e.g., look & feel) of a scrubbing bar can be varied based on a characteristic of the eBook (e.g., vintage, genre, subject matter) such as classical, modern, ancient, and the like. Similarly, the appearance of any or all of the visual elements of the eBook can vary based on such characteristics.

FIGS. 3A-3D illustrate how an eBook reader device 300 may be configured to present either a first reduced-size representation or a second reduced-size representation based on determining whether the first reduced-size representation or the second reduced-size representation provides a better end-user experience.

Figure 3A:
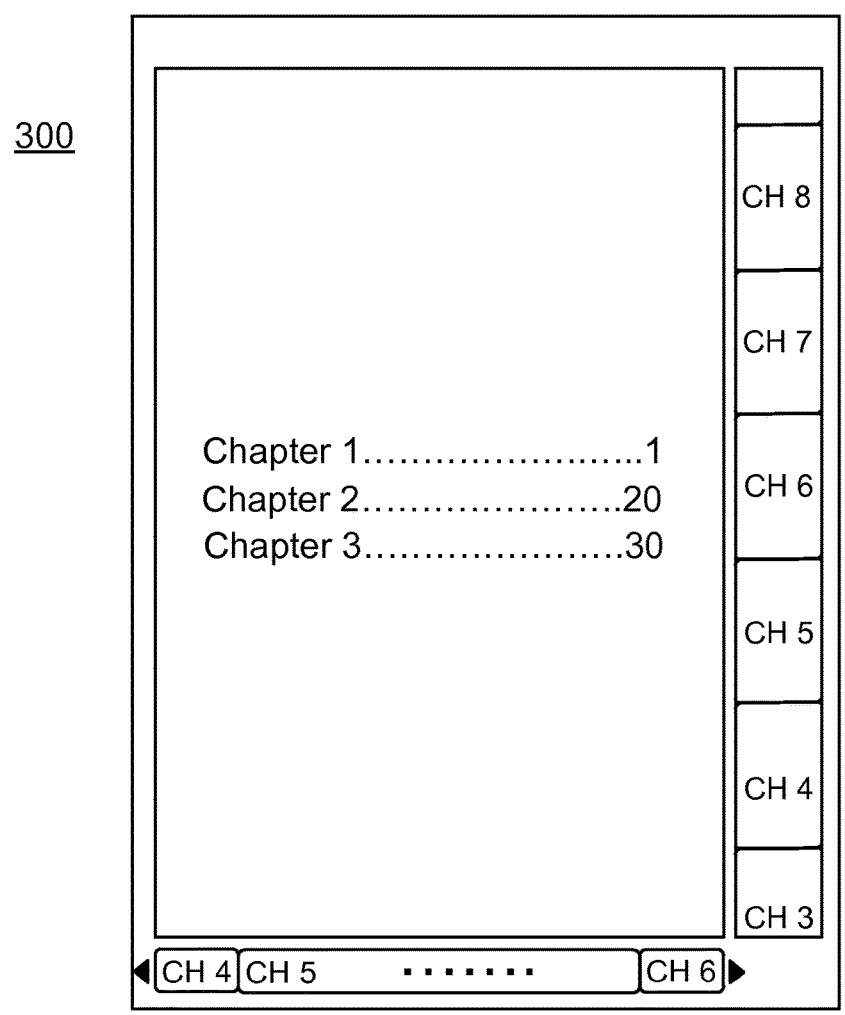
FIGS. 3A-3D illustrate how an eBook reader device may be configured to present either a first reduced-size representation or a second reduced-size representation based on determining whether the first reduced-size representation or the second reduced-size representation provides a better end-user experience.

As shown, FIG. 3A illustrates how a table of contents may be modified in order to display the table of contents using a first reduced-size representation as a non-interactive thumbnail image of the displayable object. As shown, FIG. 3A illustrates a table of contents as the table of contents would appear if dimensions of the eBook reader device were of sufficient dimensions to render the table of contents in their original format. The table of content lists three chapters shown in the middle of the page with a sequence of periods that provides a visual trailer that is associated with the page number appearing in a right most column.

However, eBook reader devices may not be configured to support the original dimensions of the displayable object. For instance, a user may be viewing content on a mobile phone with a limited display area that is much smaller than the dimensions of a hard cover book. In another instance, a user may be viewing the displayable object on a tablet device that is rendering eBook application content embedded within another application. The eBook application may only be allocated a few square inches within a larger display. As a result, the eBook application may be configured to modify the content that is displayed to a user. In order to accommodate these constraints, an image may be scaled and/or document formatting may be revised to better accommodate the available dimensions.

Figure 3B:
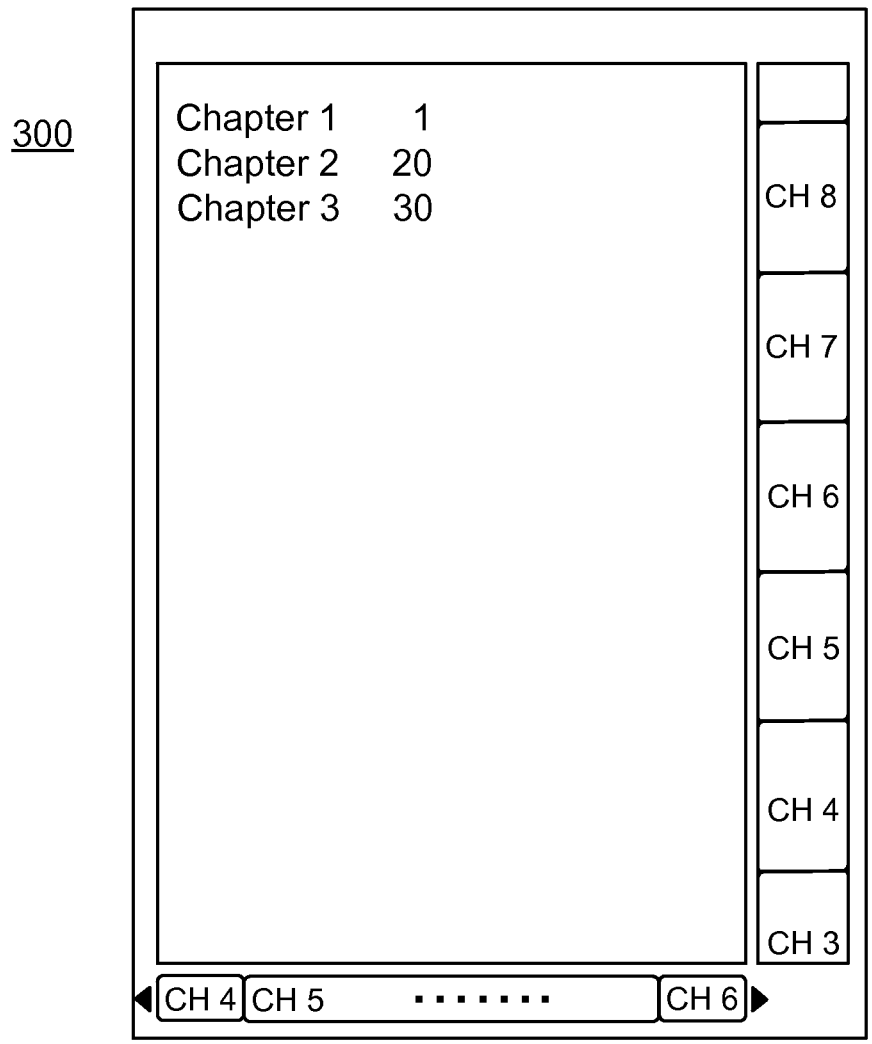

FIG. 3B provides on example of how a table of contents may be modified to render a first reduced-size representation as a non-interactive thumbnail image of the table of contents. The table of contents has been simplified so that the table of contents appears within the upper left hand corner. Also, the visual trailer has been eliminated in order to reduce the size of the constraints. Together, the modifications to the table of contents reduce the size of the displayable object so that the user can generally perceive the critical content within the table of contents without limiting the user to viewing only portions of the content.

In one configuration, the FIG. 3A represents formatted text that is published according to an eBook standard. In another configuration, FIG. 3A includes an image. The displayable object may be transformed from a first format to a second format in order to display the first reduced-size representation as a non-interactive thumbnail image of the displayable object. For example, FIG. 3A may be converted from an eBook publication standard to the image shown in FIG. 3B in order to render the object within an allocated portion of a display. The source for the displayable object may be analyzed so that critical and non-critical elements within the source are identified and selectively included. Each element without the source document may be analyzed in order to determine the impact that each element has on the required display size and also include an indication of whether the element is necessary and/or can be scaled. If the object is not necessary and the dimensional constraints indicate that display of even critical elements will be constrained, then the eBook application may be configured to remove those non-critical elements as the source is converted into an image for the converted display.

Figure 3C:
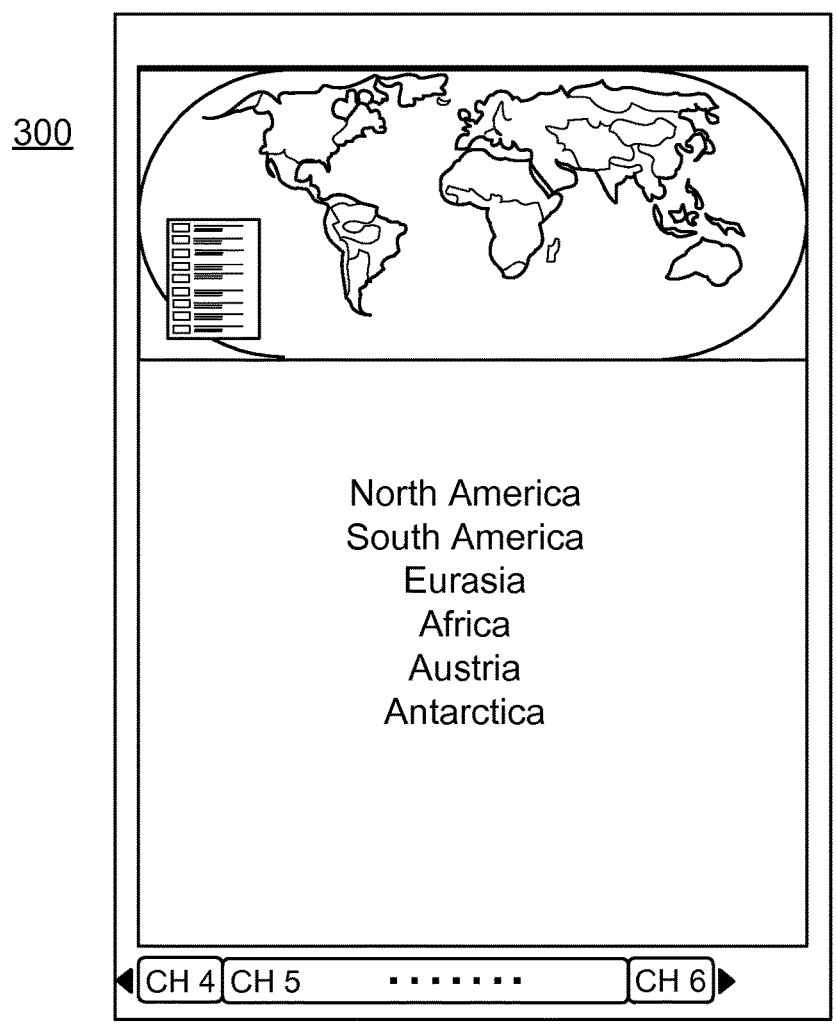

FIG. 3C illustrates an alternative approach for how a displayable object may be rendered within an eBook application. Specifically, FIG. 3C illustrates how a geographic map is rendered as a second reduced-size representation comprising a user-interactive object corresponding to the displayable object. The source document represents an image with a great deal of detailed information included therein. The dimension of the eBook reader device make it extraordinarily difficult to render the map at original dimensions and also to render a desired amount of information within the map. Instead, an image of the map has been compressed and scaled into the display shown in FIG. 3C. In addition, the display also includes a link to different portions of the map (e.g., includes a links to different continents within the world map).

The geographic map is rendered as a second reduced-size representation with a user-interactive object corresponding to the source map so that the user can select (e.g., click or touch) a portion of the map in order to display a map with greater detail.

Figure 3D:
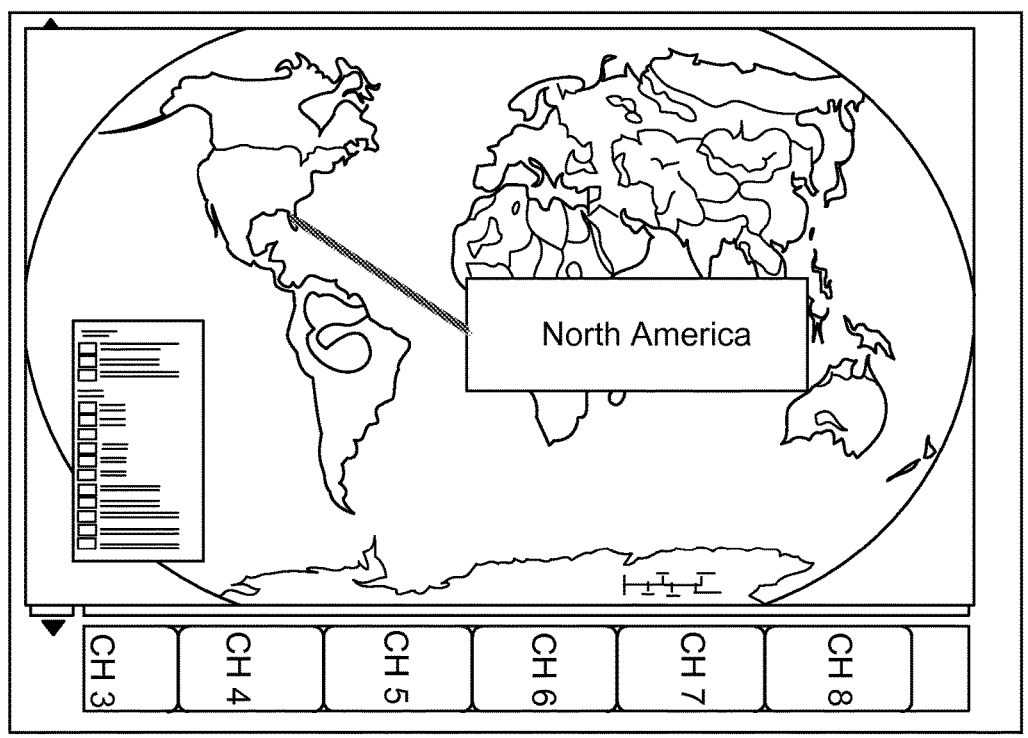

FIG. 3D illustrates how the selected interactive map may be invoked to retrieve additional information. As show, a larger map is shown that enables the user to perceive the map in greater detail. In addition, a bubble message is shown indicating that the user has selected a portion of the interactive map corresponding to North America. The user may select the bubble message to retrieve addition information related to North America, or the user may select another region of the map in order to retrieve additional information related to another area on map.

Figure 4:
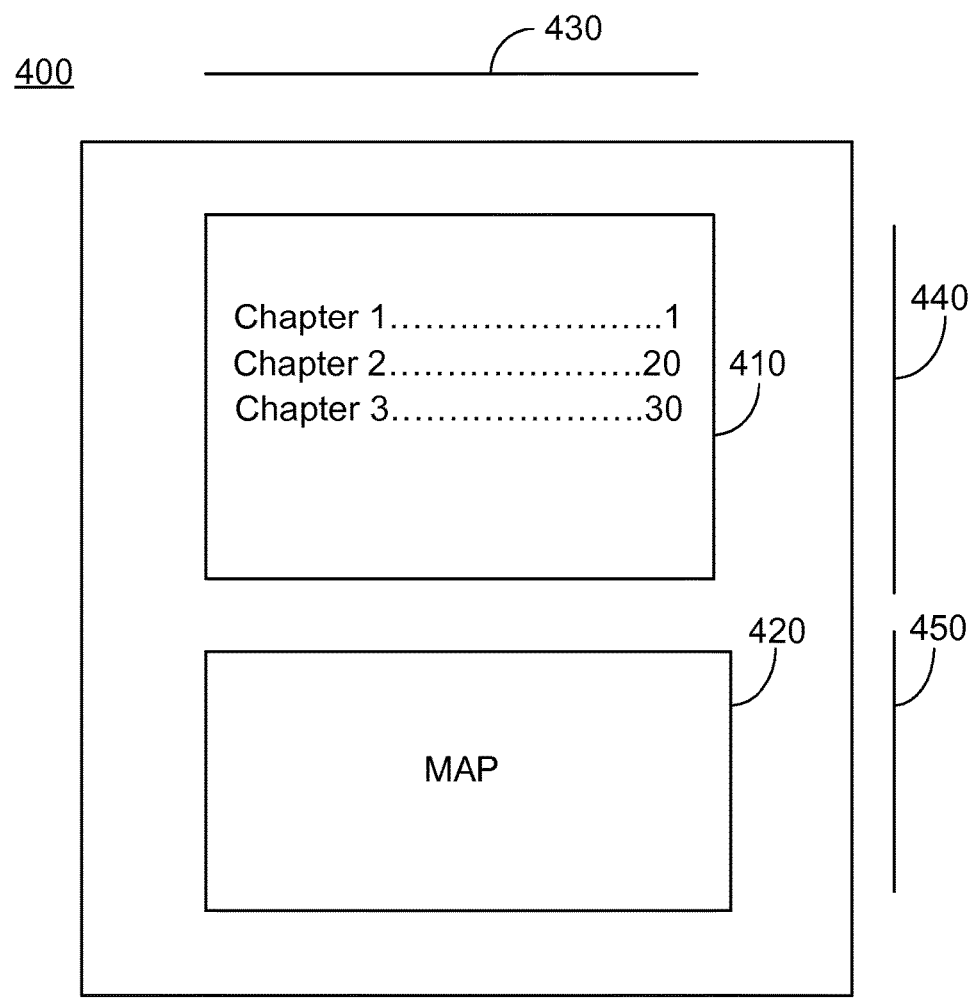
FIG. 4 illustrates how a first reduced-size representation or a second reduced-size representation is displayed based on available display space relative to a size of the underling object.

FIG. 4 illustrates how a first reduced-size representation or a second reduced-size representation is displayed based on available display space relative to a size of the underlying object. There two sets of dimension for each of the displayable objects. First, there is a set of original dimensions for the displayable object that originally exceeds the viewing area (not shown). Second, there is the set of dimensions that are available to a displayable object within the eBook application. As shown, eBook reader device 400 includes a display with a table of contents 410 and a map 420. Both the table of contents 410 and the map 420 have a width 430. Table of contents has a height 440 and map 420 has a height 450. The width 430 and the heights 440 and 450 are based on the available display area within the eBook application.

The original dimensions and the available display are may be used to determine whether to display the an end-user experience is better served by displaying a first reduced-size representation with a non-interactive thumbnail image of the displayable object or a second reduced-size representation with a user-interactive object corresponding to the displayable object. For example, if the differences are determined to be less than 20%, then a scaling algorithm may be used to render the displayable object as a first reduced-size representation with a non-interactive thumbnail image of the displayable object. If the differences are more than 20%, then the eBook application may be configured to modify the content so as to render a user-interactive object corresponding to the displayable object so that the user may better identify the requested content through user interaction.

The selection of a first reduced-size representation with a non-interactive thumbnail image of the displayable object or a second reduced-size representation with a user-interactive object corresponding to the displayable object also may be based on the underlying content. For example, a first threshold may be used in response to determining that the source includes text while a second threshold may be used in response to determining that the source includes imagery (e.g., a map). In still another configuration, the decision to use a first reduced-size representation with a non-interactive thumbnail image of the displayable object or a second reduced-size representation with a user-interactive object corresponding to the displayable object may be based on the degree of underlying detail in the source object. For example, a map with a high amount of granular detail may be transformed into an interactive displayable object while a map with less granular detail may be transformed into a non-interactive thumbnail image of the displayable object. The map (or image) may be analyzed to determine the lossiness and/or degree of compression available to ascertain whether a threshold degree of detail is present that leads to transformation to a first format or a second format.

Figure 5:
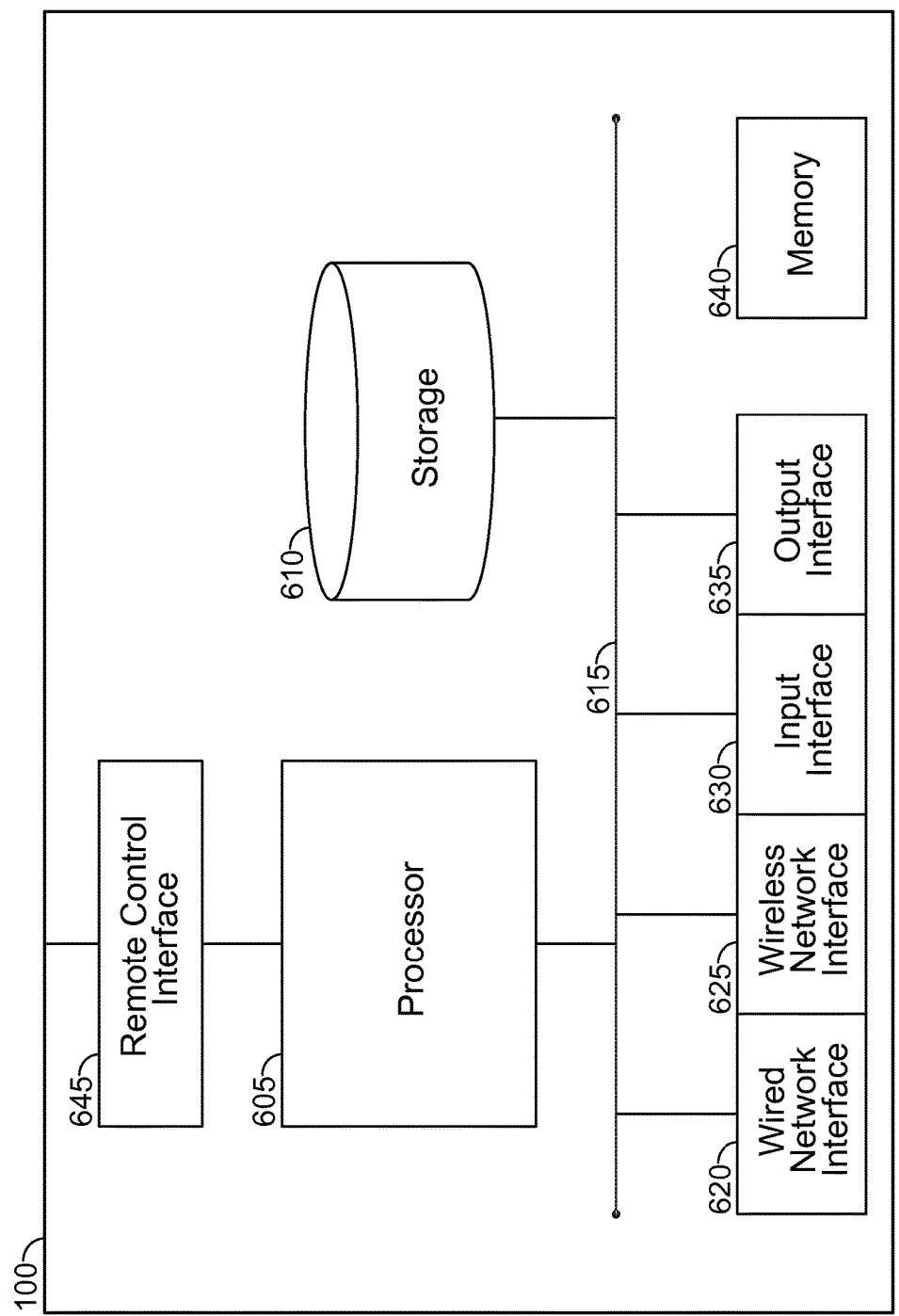
FIG. 5 depicts an electronic device that can be used to for eBook applications.

FIG. 5 depicts an exemplary architecture of an electronic client device 100 that can be used to for eBook applications. The client device 100 includes a processor 605 configured to control the operation of the client device 100. For example, the processor 605 can control communications with one or more media servers to receive eBooks or other media for presentation on the client device 100. A media server can be any general purpose server that provides access to media content. The media can be received through push and/or pull operations, including through downloading and streaming. The processor 605 also can be configured to generate output signals for presentation, such as one or more streams representing media content or an interface for interacting with a user.

The client device 100 also includes a storage device 610 that can be configured to store information including media, configuration data, user preferences, and operating instructions. The storage device may include non-transitory media. The storage device 610 can be any type of non-volatile storage, including a hard disk device or a solid-state drive. For example, media received from an external media server can be stored on the storage device 610. The received media thus can be locally accessed and processed. Further, configuration information, such as the resolution of a coupled display device or information identifying an associated media server, can be stored on the storage device 610. Additionally, the storage device 610 can include one or more sets of operating instructions that can be executed by the processor 605 to control operation of the client device 100. In an implementation, the storage device 610 further can be divided into a plurality of partitions, wherein each partition can be utilized to store one or more types of information. Additionally, each partition can have one or more access control provisions.

A communication bus 615 couples the processor 605 to the other components and interfaces included in the client device 100. The communication bus 615 can be configured to permit unidirectional and/or bidirectional communication between the components and interfaces. For example, the processor 605 can retrieve information from and transmit information to the storage device 610 over the communication bus 615. In an implementation, the communication bus 615 can be comprised of a plurality of busses, each of which couples at least one component or interface of the client device 100 with another component or interface.

The client device 100 also includes a plurality of input and output interfaces for communicating with other devices, including media servers and presentation devices. A wired network interface 620 and/or a wireless network interface 625 each can be configured to permit the client device 100 to transmit and receive information over a network, such as a local area network (LAN) or the Internet, thereby enabling either wired and/or wireless connectivity and data transfer. Additionally, an input interface 630 can be configured to receive input from another device through a direct connection, such as a USB, eSATA or an IEEE 1394 connection.

Further, an output interface 635 can be configured to couple the client device 100 to one or more external devices, including a television, a monitor, an audio receiver, and one or more speakers. For example, the output interface 635 can include one or more of an optical audio interface, an RCA connector interface, a component video interface, and a High-Definition Multimedia Interface (HDMI). The output interface 635 also can be configured to provide one signal, such as an audio stream, to a first device and another signal, such as a video stream, to a second device. Further, a non-volatile memory 640, such as a read-only memory (ROM) also can be included in the client device 100. The non-volatile memory 640 can be used to store configuration data, additional instructions, such as one or more operating instructions, and values, such as one or more flags and counters. In an implementation, a random access memory (RAM) also can be included in the client device 100. The RAM can be used to store media content received in the client device 100, such as during playback or while the user has paused playback. Further, media content can be stored in the RAM whether or not the media content is stored on the storage device 610.

Additionally, the client device 100 can include a remote control interface 645 that can be configured to receive commands from one or more remote control devices (not pictured). The remote control interface 645 can receive the commands through wireless signals, such as infrared and radio frequency signals. The received commands can be utilized, such as by the processor 605, to control media playback or to configure the client device 100. In an implementation, the client device 100 can be configured to receive commands from a user through a touch screen interface. The client device 100 also can be configured to receive commands through one or more other input devices, including a keyboard, a keypad, a touch pad, a voice command system, and a mouse.

Configurations of computing devices, user interfaces for such devices, and associated processes for using such devices are described. In some configurations, the computing device is a portable communications device such as a mobile telephone that also contains other functions, such as PDA and/or music player functions. Exemplary configurations of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some configurations, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard configurations. The soft keyboard configurations may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006. The keyboard configurations may include a reduced number of icons (or soft keys) relative to the number of keys in existing physical keyboards, such as that for a typewriter. This may make it easier for users to select one or more icons in the keyboard, and thus, one or more corresponding symbols. The keyboard configurations may be adaptive. For example, displayed icons may be modified in accordance with user actions, such as selecting one or more icons and/or one or more corresponding symbols. One or more applications on the device may utilize common and/or different keyboard configurations. Thus, the keyboard configuration used may be tailored to at least some of the applications. In some configurations, one or more keyboard configurations may be tailored to a respective user. For example, one or more keyboard configurations may be tailored to a respective user based on a word usage history (lexicography, slang, individual usage) of the respective user. Some of the keyboard configurations may be adjusted to reduce a probability of a user error when selecting one or more icons, and thus one or more symbols, when using the soft keyboard configurations.

Figure 6A:
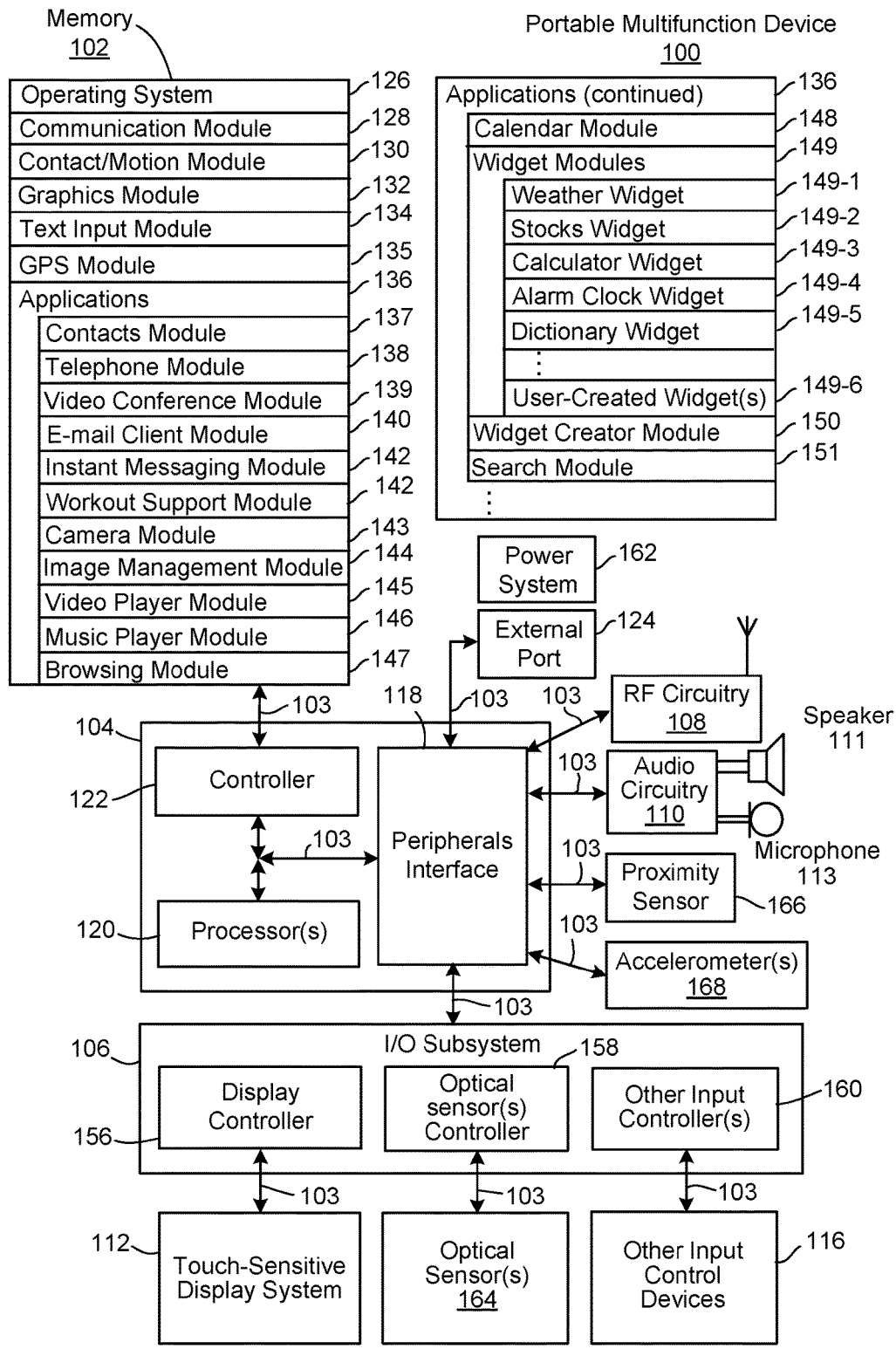
FIGS. 6A and 6B depict an exemplary architecture of an electronic client device that can be used to for eBook applications.
Figure 6B:
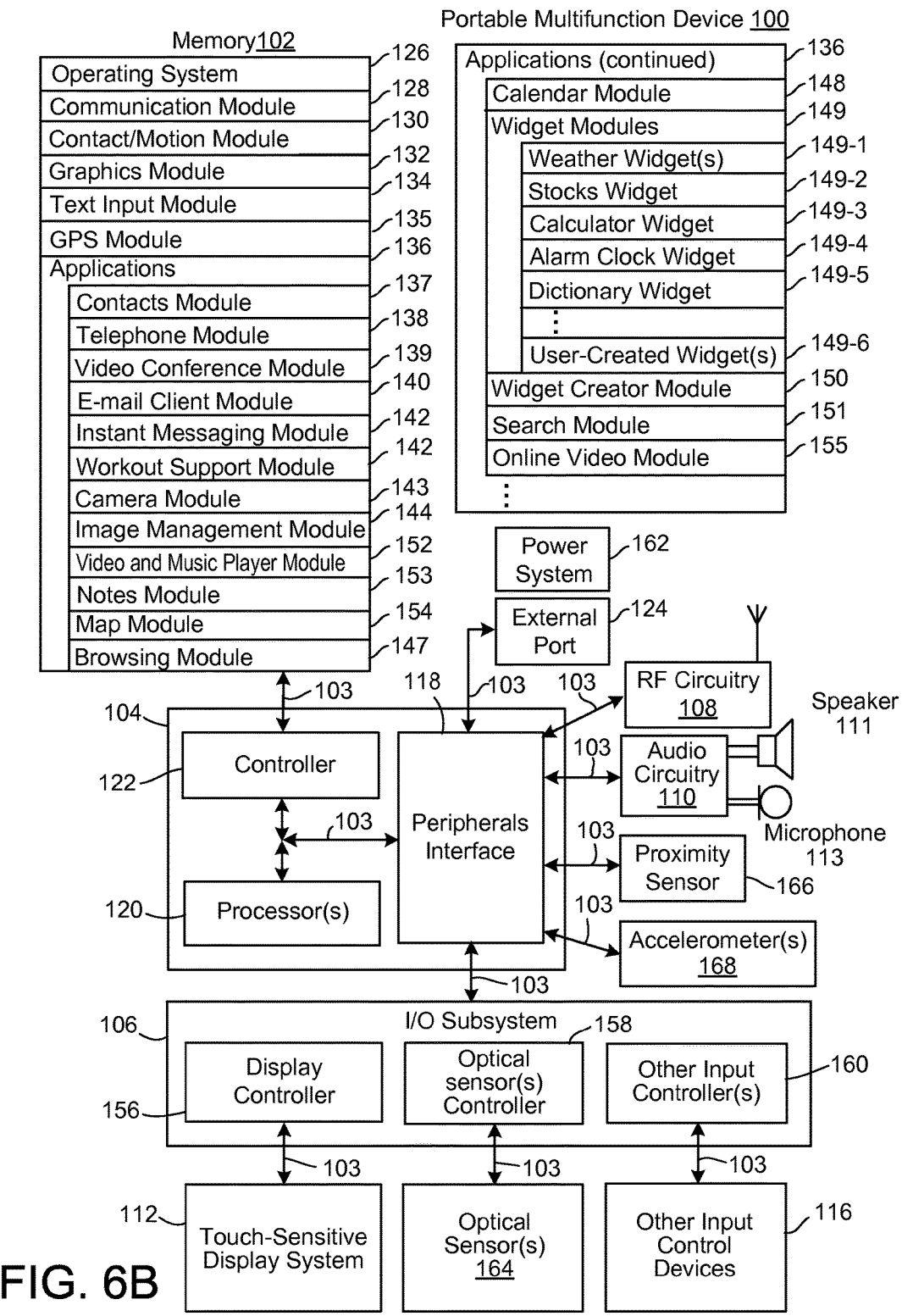

Attention is now directed towards configurations of portable devices with touch-sensitive displays. FIGS. 6A and 6B are block diagrams illustrating portable multifunction devices 100 with touch-sensitive displays 112 in accordance with some configurations. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 6A and 6B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some configurations, the peripherals interface 118, the CPU 120, and the memory controller 122 may be implemented on a single chip, such as a chip 104. In some other configurations, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some configurations, the audio circuitry 110 also includes a headset jack. The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate configurations, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some configurations, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary configuration, a point of contact between a touch screen 112 and the user corresponds to a finger of the user.

The touch screen 112 may use LCD (liquid crystal display) technology, or LPD (light emitting polymer display) technology, although other display technologies may be used in other configurations. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary configuration, projected mutual capacitance sensing technology is used, such as that found in the iPhone® and iPod Touch® from Apple, Inc. of Cupertino, Calif.

A touch-sensitive display in some configurations of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1. However, a touch screen 112 displays visual output from the portable device 100, whereas touch sensitive touchpads do not provide visual output.

A touch-sensitive display in some configurations of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006.

The touch screen 112 may have a resolution in excess of 100 dpi. In an exemplary configuration, the touch screen has a resolution of approximately 160 dpi. The user may make contact with the touch screen 112 using any suitable object or appendage, such as a stylus, a finger, and so forth. In some configurations, the user interface is designed to work primarily with finger-based contacts and gestures, which are much less precise than stylus-based input due to the larger area of contact of a finger on the touch screen. In some configurations, the device translates the rough finger-based input into a precise pointer/cursor position or command for performing the actions desired by the user.

In some configurations, in addition to the touch screen, the device 100 may include a touchpad (not shown) for activating or deactivating particular functions. In some configurations, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some configurations, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some configurations, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 6A and 6B show an optical sensor coupled to an optical sensor controller 158 in I/O subsystem 106. The optical sensor 164 may include a charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some configurations, an optical sensor is located on the back of the device 100, opposite the touch screen display 112 on the front of the device, so that the touch screen display may be used as a viewfinder for still and/or video image acquisition. In some configurations, an optical sensor is located on the front of the device so that the user's image may be obtained for videoconferencing while the user views the other video conference participants on the touch screen display. In some configurations, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 6A and 6B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some configurations, the proximity sensor turns off and disables the touch screen 112 when the multifunction device is placed near the user's ear (e.g., when the user is making a phone call).

The device 100 may also include one or more accelerometers 168. FIGS. 6A and 6B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are which are incorporated by reference herein in their entirety. In some configurations, information is displayed on the touch screen display in a portrait view or a landscape view based on an analysis of data received from the one or more accelerometers.

In some configurations, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some configurations, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some configurations, the contact/motion module 130 and the display controller 156 detects contact on a touchpad. In some configurations, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some configurations, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a workout support module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some configurations, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some configurations, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some configurations, a widget includes an HTML (Hypertext Markup Language) file, a CSS (Cascading Style Sheets) file, and a JavaScript file. In some configurations, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some configurations, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various configurations. For example, video player module 145 may be combined with music player module 146 into a single module (e.g., video and music player module 152, FIG. 6B). In some configurations, memory 102 may store a subset of the modules and data structures identified above. Furthermore, memory 102 may store additional modules and data structures not described above.

In some configurations, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some configurations, the touchpad, when touched by the user, navigates the device 100 to a main, home, or root menu from any user interface that may be displayed on the device 100. In such configurations, the touchpad may be referred to as a "menu button." In some other configurations, the menu button may be a physical push button or other physical input/control device instead of a touchpad.

As shown in FIG. 7A, an electronic client device such as an eBook Reader 200 can be figured to present a graphical user interface (GUI) that uses a bookshelf metaphor to indicate to a user of the device which eBooks (and/or other items of digital media) are available to the user. The eBook Reader can be equipped with a touchscreen interface (e.g., multi-touch capable) so that the user can interact with the Reader 200, and thus eBooks, using hands and fingers much in the same manner as real paper & ink books. In the example of FIG. 7A, this user has four eBooks available (or more generally, four separate ePubs indicated generally at 205) that are displayed as resting on the top two shelves of the user's personal bookcase 202 (also referred to as the user's Library). The eBooks may be depicted as hardcover editions of the paper & ink books to which they correspond, with appropriate graphics, including coloring and text, to make the eBooks appear the same as (or similar to) the paper & ink books as they would appear on the shelves of a bricks & mortar book store. Alternatively, an ePub may be depicted to appear similar to other types of publications such as journals, periodicals, newspapers, newsletters, binders, parchment, scrolls, or the like.

The user's personal bookcase 202 may be implemented to be scrollable (vertically and/or horizontally) by the user so that it can be as large as needed to hold all of the eBooks in question. The eBooks may be arranged automatically based on certain characteristics, for example, newness, most recently purchased, most recently accessed, most frequently accessed, and the like, so that some eBooks are placed in positions of more prominence and/or conspicuousness than others. The arrangement of the available eBooks also may be altered—either automatically and/or based on user input—to sort and display them according to title, author, genre, date obtained, copyright date, genre, language, or the like.

Display of the user's personal bookcase 202 can be updated and altered automatically to reflect the availability of new content, e.g., such as newly purchased eBooks or new or updated versions of previously purchased eBooks. The appearance of an eBook can be altered to indicate status information associated with the book. For example, a newly purchased eBook that has not yet completed downloading can have a first appearance that automatically changes to a second appearance once downloading has completed.

In addition, the eBooks may be labeled, for example, such as with banners 207 or 209 draped across the eBook's cover along with a textual indication of a characteristic of the eBook (e.g., NEW, SAMPLE, PARTIALLY READ, LAST READ, UPDATED, NEW VERSION, EXPIRED). The GUI may include a Button 220 or other GUI mechanism that, when selected by the user, causes the display to redirect to an online bookstore at which the user can shop for, sample, browse and/or purchase eBooks. Optionally, pressing Button 220 can cause a cellular, WiFi or Bluetooth radio in device 200 to turn on (if off) to provide connectivity to the network 100, and thus to the Content Provider 105, for example, via the Internet or other packet-switched network.

As shown in FIG. 7B, the online bookstore also may use a bookshelf metaphor to display a bookcase 225 that holds eBooks and other digital content items that are available for previewing, sampling and/or purchasing. These may include featured eBooks, top-sellers lists, and recommendations based on the user's past purchases (and/or using demographic and/or psychographic information).

While connected to the online bookstore, the user can preview eBooks (e.g., read a chapter online without purchasing the eBook) or request that a sample (e.g., a chapter or two) of a particular eBook be downloaded to the client 200 so that the user can take his/her time reading the sample offline. The user can also purchase an eBook, which causes a copy of the eBook to start downloading to the user's client device 200.

The GUI for the online bookstore also may include a "Purchases" button 230, the selection of which takes the user to a network location that provides the user with access to a complete history of all previously purchased items, and provides the user with the ability to re-download items to reading platform of choice (e.g., any of the user's suitable electronic devices) at any time.

Once purchased, an eBook appears on user's personal bookshelf 202 and may have a graphical indication that it is in process of downloading and the status of same (e.g., % of eBook downloaded). An animation may accompany the transition of a user's moving from his/her personal bookshelf area to the online bookstore and/or back again. For example, when the user clicks the Store Button 220, the device could depict an animation of a "secret rotating bookcase" that spins around to reveal the user's bookcase on one side and the online store's bookcase on the other side.

The act of purchasing (or sampling) an eBook from the online store may trigger an animation to appear on the device to present a visual indication of the transition that is occurring from the online store's bookshelf 225 to the user's from personal bookshelf (aka library). For example, when a user purchases (or samples) an eBook while in the online bookstore, the eBook in question could be displayed as enlarging and floating toward the user (i.e., to the forefront) while in the background, the bookcase spins back around to user's personal bookcase and the enlarged, floating, purchase eBook reduces back to normal size and floats to an appropriate place on user's bookshelf.

When a user desires to read an eBook on his/her shelf, it can be selected by touching a finger to the device's multi-touch screen at a location corresponding to the eBook's icon. In response, the eBook typically will be displayed as if a hardcover book was being opened by the user, for example, at the eBook's first page (or Table of Contents or Foreword or Dedication) when the eBook is being opened for the first time since downloading. The user may then read the eBook by interacting with the multi-touch screen much in the same way that the user would interact with a paper & ink book. That is, pages of the eBook can be flipped by placing a finger at an appropriate position on the page and moving it along the screen as if seeking to flip a page in a paper & ink book. In response, the display changes to giving the appearance of a paper page curling over in the desired direction to reveal the next page in the eBook (which may be on the backside of the page just read).

Other visual indications and animations can be used to emulate the experience of reading a paper & ink book. For example, the pages can be colored and/or shaded to appear as different types or grades of paper, and/or to appear three dimensional. For example, in a view where two pages of the eBook are visible in the GUI at the same time (i.e., a dual page view), the binding and/or edges of the eBook can be shaded to make the eBook appear three dimensional and thus similar to a paper & ink book folded open to a particular page.

The page curl animation used to depict page flipping of eBook pages may be implemented to follow the position and/or speed of the user's finger. For example, the position and extent of the page curl displayed follows the user's exact finger position, velocity, and/or acceleration in a manner that simulates the actual physical behavior of paper page being manipulated by human finger.

The page flipping animation optionally may employ a thresholding feature that is based on the position of the page curl, the speed or acceleration of the user's finger or the like, such that even if the user lifts his/her finger from the screen, the page nevertheless continues to complete the flip if the current position of the page curl (optionally adjusted for velocity and/or acceleration of the user's finger) has met or exceeded a predetermined threshold.

The visual indications and animations used for publication types other than rigid books (e.g., newspapers, magazines) may similar be suited to emulate their real life counterparts—e.g., an e-Newspapers may be animated as unfolding from its folded state to a full length state, just as a real newspaper typically is unfolded prior to reading.

The device's GUI and operation can be implemented to accommodate any or all of the various different reading navigation models corresponding to different languages or media types. For example, for publications in the English language, the device would be configured to adopt a left-to-right, top-to-bottom, front-to-back reading and navigation model, consistent with the standard convention for the English language. Alternatively, or in addition, the device could be configured to adopt a different reading/navigation direction or model such as one or more of right-to-left, bottom-to-top and/or back-to-front to accommodate publications in other languages such as Arabic or Hebrew. Similarly, the device could be configured to adopt reading/navigation models that are optimized for the format of the content being viewed—for example, a newspaper formatted into side-by-side columns or a comic book or graphic novel having discrete panels or cells that are to be viewed in a certain order and direction. In the case of a comic book or graphic novel, each cell could be automatically re-sized and/or arranged to occupy a specified portion and/or region of the device's screen—for example, two cells at a time, either side-by-side or one on top of the other. Any or all of these features and capabilities could be selected or customizable by the user of the device.

While reading an eBook, the GUI optionally may provide supplemental or context information using pop-up user interface ("UI") bubbles that appear, for example, when the user has selected a word or phrase by touching and holding his/her finger on the screen for a predetermined period of time (e.g., one second or longer). For example, if a user presses and holds his/her finger on any word in the page, a pop-up UI bubble could appear that provides the user to options to copy that word to a virtual clipboard (e.g. for pasting into another UI field), looking up the selected word in a dictionary or other source (e.g., Wikipedia, Google), or designating that word as a target word on which to perform a find operation. In general, implementation of such pop-up UI bubbles could be extended to accommodate essentially any type of plug-ins or data detectors for use with other applications.

In implementing a find (or search) function, the GUI could enable the user selectively to search for a selected word or phrase either anywhere within the same eBook (with an optional "find forward" and/or "find backward" feature), within any item of content on the user's device, on a network content repository associated with that user, and/or in any arbitrarily designated universe of content, for example, all of the publications available at a content provider's online bookstore.

Figure 8A:
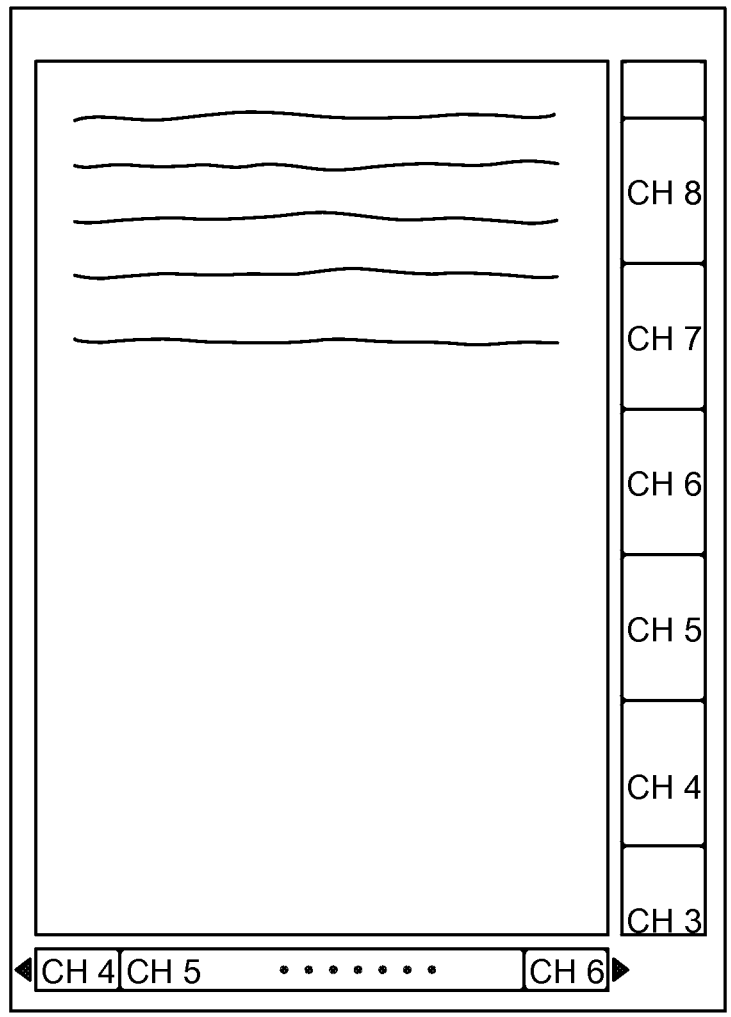
FIGS. 8A-8C illustrate exemplary configurations for scrubbing bars.
Figure 8C:
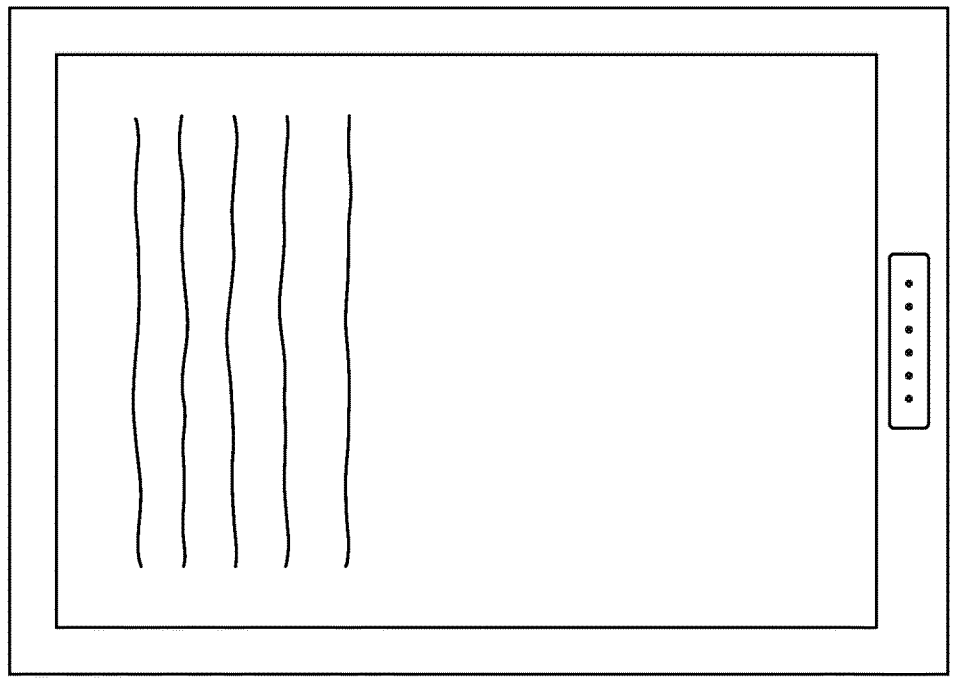
Figure 8B:
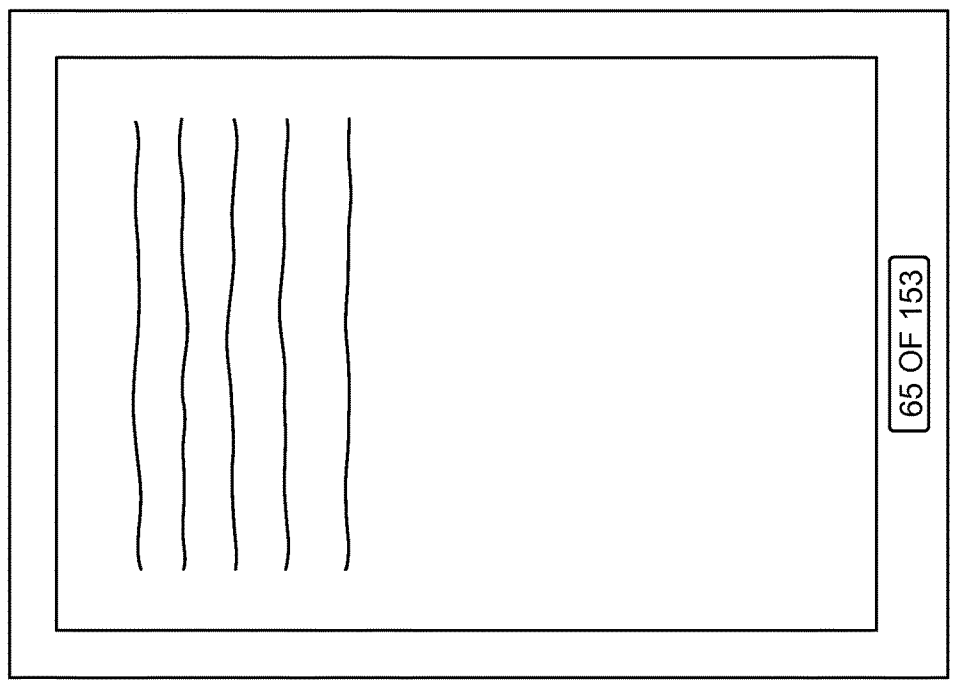

FIGS. 8A-8C illustrate exemplary configurations for scrubbing bars. The example of FIG. 8A uses a horizontal scrubbing bar that includes BACK and FORWARD arrows to move between chapters. The current chapter (here, chapter 5) is expanded to give the user increased granularity for enhancing scrubbing precision. FIGS. 8B and 8C represent an example of an implementation in which a page indicator display ("65 of 153") changes to a series of horizontal dots when the user presses and holds his/her finger on that page indicator display. The user can then quickly jump to another page in the eBook by dragging his/her finger along that row of dots in the desired direction.

Alternatively, or in addition, the scrubbing bar could, for example, when touched by a user's finger, pop-up an informational window that partially overlies the current and displays additional information such as chapter number, chapter title or the like.

The resulting behavior of a scrubbing operation either can cause page flipping animations to be displayed while the user is dragging his/her finger along the scrubbing bar, or the animations can be suspended or otherwise not used, thereby helping to reduce confusion that might be caused by excessive display changes. Alternatively, or in addition, the page display can remain static until the user has stopped dragging his/her finger on the scrubbing bar, at which point the display would respond with a single jump to the newly selected page (rather than showing images or suggestions of the intervening page flip transitions).

As shown in FIG. 2B, an eBook being read can be depicted as having the read pages displayed on the left side and unread pages displayed on the right side. These read/ unread pages can be displayed as a static graphic (i.e., unchanging in thickness) or can be altered (potentially with each page flip) to give the user a visual indication of how many pages have been read/unread, similar to reading a paper & ink book. For example, the displayed read/unread pages can be a true and proportionate depiction depending on book length and current reading position or can be limited to two or more standard representations that give a feel of the relative length and/or reading position of the eBook (e.g., thin, medium, thick).

The visual and graphical choices specified in an eBook's ePub file can be overridden, for example, by the retailer (e.g., content provider 105), the eBook reader software and/or device manufacturer, and/or customized by the user. For example, unpleasant color combinations of text and background colors resulting from the ePub's specified values can be changed. Similarly, any or all of the graphical or color choices can be changed based on user preferences, automatically based on genre, author, title or the like can be changed to enhance the reading experience. In that regards, themes (e.g., modern, classical, romance, textbook, scientific treatise) of color combinations, electronic paper types, font choice and size and the like all may be controlled at various different levels in the distribution and/or usage process depending on design and implementation preferences.

Any combination or all of the following features optionally could be implemented.

Using a built-in accelerometer (or other attitude sensor), in response to a detection that the user has tilted the device in a predetermined manner, the device could cause the display to at least partially flip over and reveal contents of one or more pages in an eBook being read on the device, similar to how a reader might peek ahead of the current page, for example, to see how many pages are left in a chapter. Similarly, detection of other predetermined movements of the device could trigger other responses—for example, shaking of a device while reading an eBook could cause the current eBook to close and replace itself on the bookshelf or perhaps return to the beginning of the eBook. If a user "pinches" the device's touchscreen (e.g., by placing a thumb and an index finger slightly apart on the touchscreen and then drawing them together while remaining in contact with the touchscreen), the device could respond by closing the eBook or by shrinking the current page and/or text size.

Other potential touchscreen-based features may include enabling a predetermined gesture (e.g., swiping three fingers across the touchscreen) to jump to the user's next eBook (according to a predefined ordering such as newness, alphabetical or the like) for display and reading, without having to return to the library or bookshelf interface.

Other touchscreen facilitated gestures could provide other optional functionality. For example, a predetermined unique gesture on the touchscreen could cause an eBook to be shared with another user, e.g., by performing a throwing like gesture that results in the eBook in question effectively jump from one user's device to another user's device via a wireless connection between the two devices (or via one or more intermediate devices residing in a network cloud). A possible extension of that feature would be to allow a user to make a predetermined gesture on the touchscreen that causes a specified location (e.g., page, line and/or paragraph number) in an eBook to be thrown to (that is, transmitted to and shared with) another device associated with another user.

The device also could be fitted with an appropriate sensor that senses when the user turns the device around (that is, rotate the device substantially 180 degrees around a vertical axis so that the back of the device is facing the user and the screen is facing away from the user) to show the device's screen to another person. When that event is detected, the device could be configured, for example, to automatically change the display from the currently displayed page in the eBook to the front cover of the eBook so that the other person can view the eBook's cover and read the eBook's title and/or author for him/herself.

Another possible implementation includes providing one or more appropriate sensors in the device to be able to detect when the user has set the device down on a table or other surface, or that the device has otherwise entered a state of stillness. Upon detecting such an event, the device could be configured to display an animation simulating the fluttering of an eBook's pages in a breeze, somewhat similarly to what sometimes happens when a paper & ink book is set down on its back in an open position. Optionally, the device simultaneously could play an audio snippet that sounds like paper pages fluttering in a breeze.

The bookshelf interface can also be implemented to provide different or additional functionality. For example, the display of eBooks on a user's bookshelf that haven't been opened or otherwise manipulated for a predetermined period of time could automatically be changed from a full front cover view to a view only of the eBooks' spines, thereby conserving display screen real estate and enabling a greater number of eBooks and/or other publications to be visible at the same time. Similarly, the display of available periodicals such as newspapers and magazines could be changed from a full frontal view to a pile or stack view in which only the topmost (e.g., newest) periodical is fully visible whereas older editions appear only as edges in a stack underneath the topmost item, thereby reducing clutter on the bookshelf and conserving screen real estate. In addition, any periodical under the topmost item could be archived (either in local storage or remote storage or both) thereby conserving device memory. Optionally, the displayed height of the periodical stack could vary to reflect or otherwise be related to the quantity of available periodical items in the stack.

The text or other content of a publication could have and display selectable links that provide access to webpages, inline videos or essentially any other type of complementary content, stored either locally on the device or available via the network. More generally, the content of a publication could include embedded dynamic content that is updated periodically or in response to a trigger (e.g., publisher flags that updated or supplementary content is available) via the network.

A publication (or the GUI of the device itself) also could implement a user interface mechanism that enables different users, each having their own device, to chat (e.g., send text messages and/or recorded voice or audio clips back and forth in real time) amongst themselves. For example, students in a study group could use this chat functionality to discuss particular passages of or concepts set forth in an assigned eBook that they were reading for a school course. Optionally, the chat mechanism could be tied to or otherwise associated with (e.g., by visual proximity) a specific portion of or location within the eBook's content. This chat functionality could be expanded and implemented to provide access to online forums, e.g., through which book club members could conduct virtual book club meetings to discuss the book under consideration, either by exchanging text and/or interactively through voice/video connections. As an alternative to chat functionality, various user interface mechanisms could be implemented to associate an eBook and/or specific locations or concepts therein with email or web plugin functionality.

Another potential feature is that the device could play a real (e.g., pre-recorded) or synthesized voice that reads the words of the eBook as the user follows along. The current reading position (i.e., the words as they were being spoken) could be visually highlighted to enhance the user's experience in following along and reading the words as they were being spoken.

Figure 9:
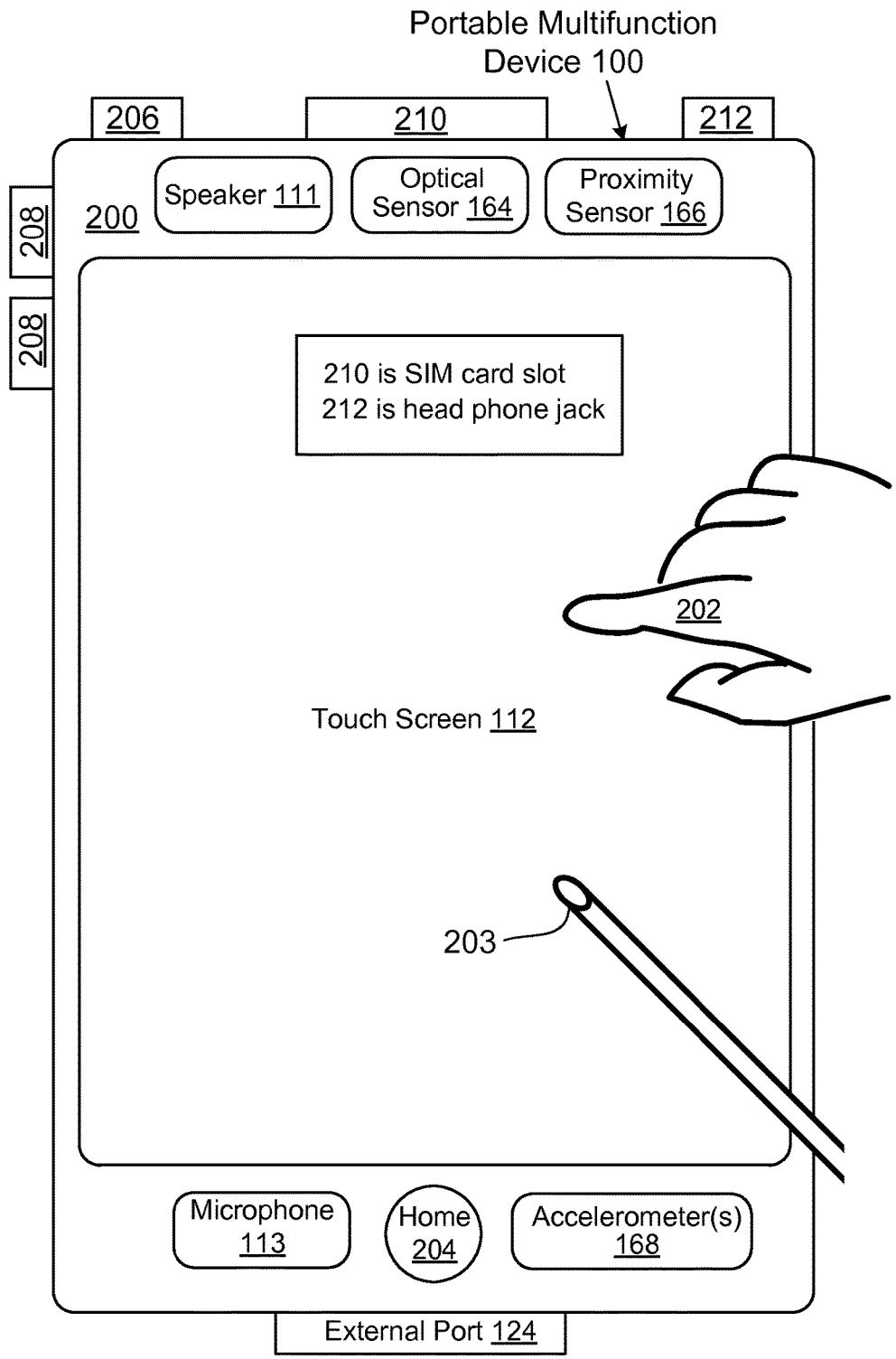
FIG. 9 illustrates a portable multifunction device having a touch screen in accordance with some embodiments.

FIG. 9 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 10A:
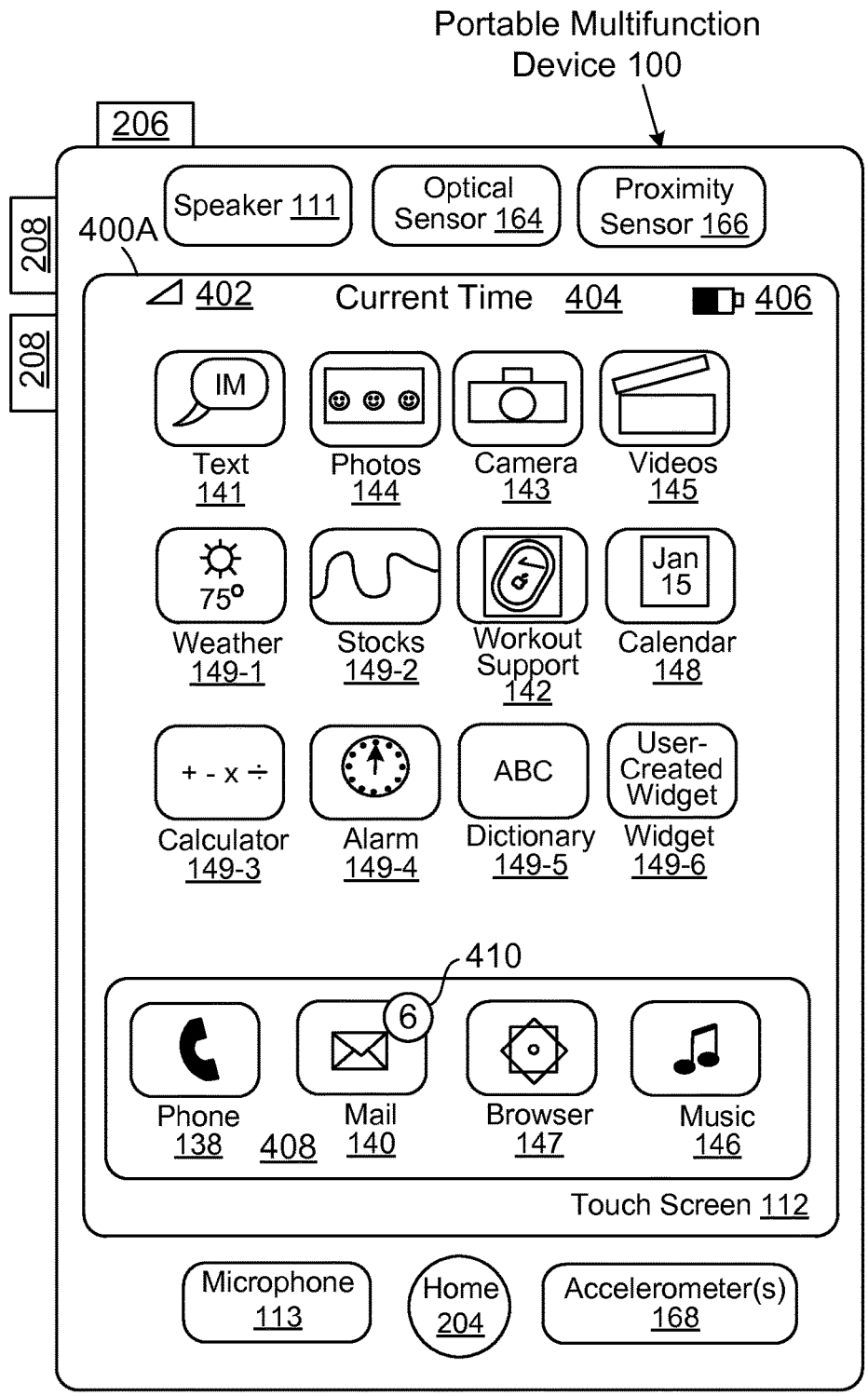
FIGS. 10A-10C illustrate exemplary user interfaces for a menu of applications on a portable multifunction device in accordance with some embodiments.
Figure 10B:
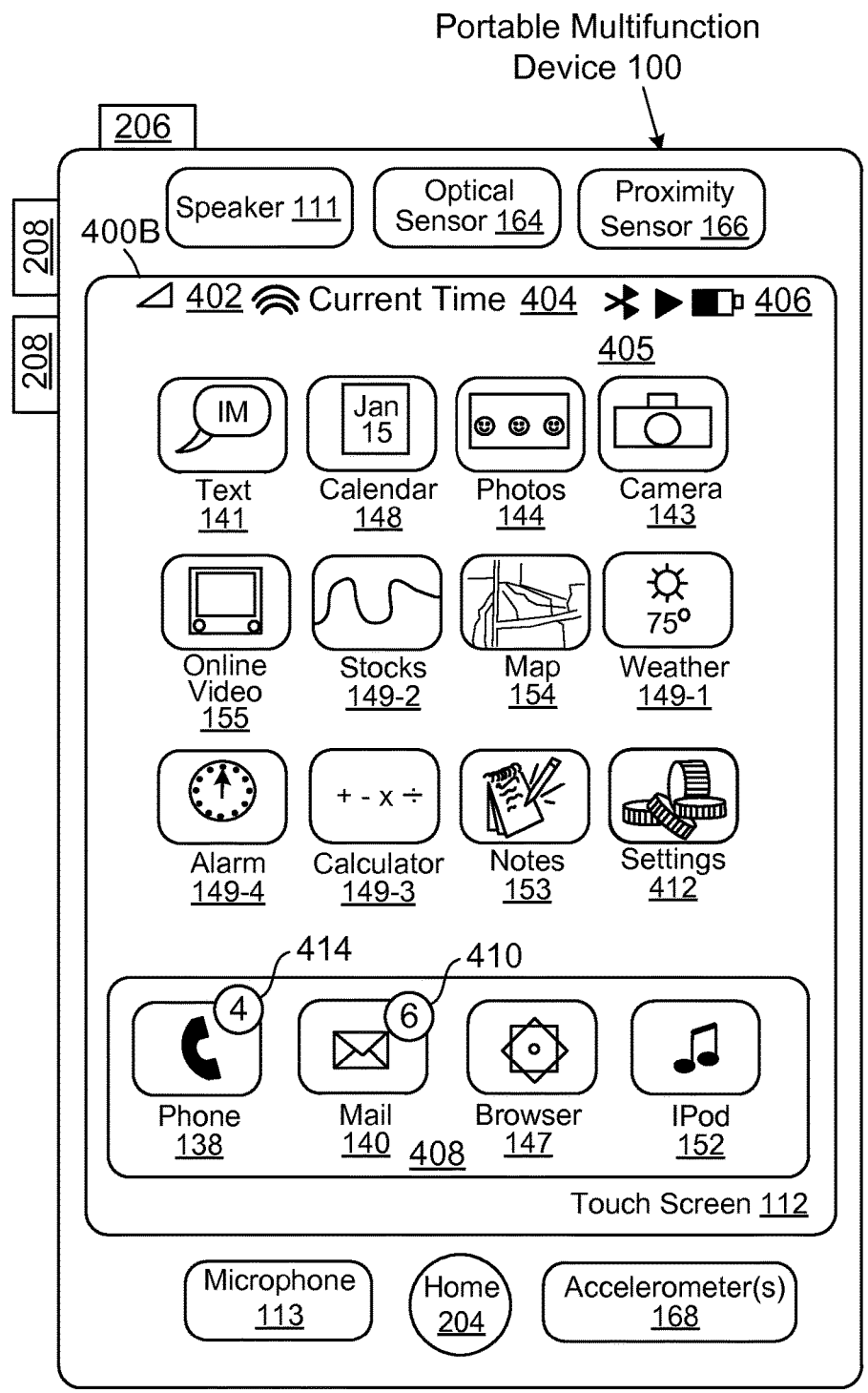

FIGS. 10A and 10B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof: 402, 404, 405, 406, 141, 148, 144, 143, 149-3, 149-2, 149-1, 149-4, 410, 414, 138, 140, and 147, as described above; Map 154; Notes 153; Settings 412, which provides access to settings for the device 100 and its various applications 136, as described further below; Video and music player module 152, also referred to as iPod (trademark of Apple, Inc.) module 152; and Online video module 155, also referred to as YouTube (trademark of Google, Inc.) module 155.

Figure 10C:
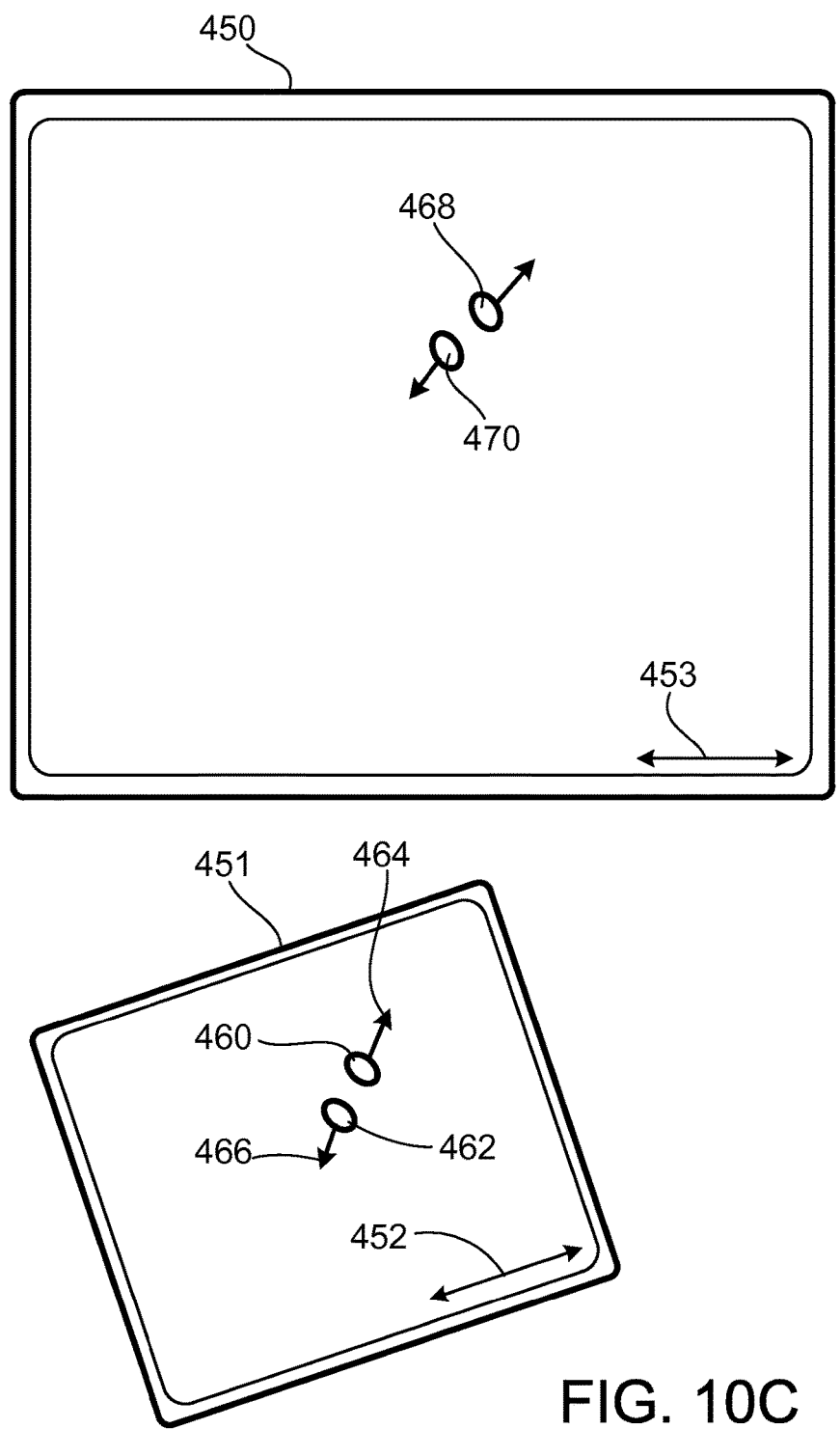

FIG. 10C illustrates an exemplary user interface on a multifunction device with a separate display (e.g., 450) and touch-sensitive surface (e.g., 451). Although many of the examples which follow will be given with reference to a touch screen display (e.g., where the touch sensitive surface and the display are combined, as shown in device 100 in FIGS. 10A-10B), in some embodiments the display and the touch-sensitive surface are separate, as shown in FIG. 10C. In some embodiments the touch sensitive surface (e.g., 451 in FIG. 10C) has a primary axis (e.g., 452 in FIG. 10C) that corresponds to a primary axis (e.g., 453 in FIG. 10C) on the display (e.g., 450). In accordance with these embodiments, the device detects contacts (e.g., 460 and 462 in FIG. 10C) with the touch-sensitive surface 451 at locations that correspond to respective locations on the display (e.g., in FIG. 10C 460 corresponds to 468 and 462 corresponds to 470). In this way, user inputs (e.g., contacts 460 and 462) detected by the device on the touch-sensitive surface (e.g., 451 in FIG. 10C) are used by the device to manipulate the user interface on the display (e.g., 450 in FIG. 10C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Figure 11:
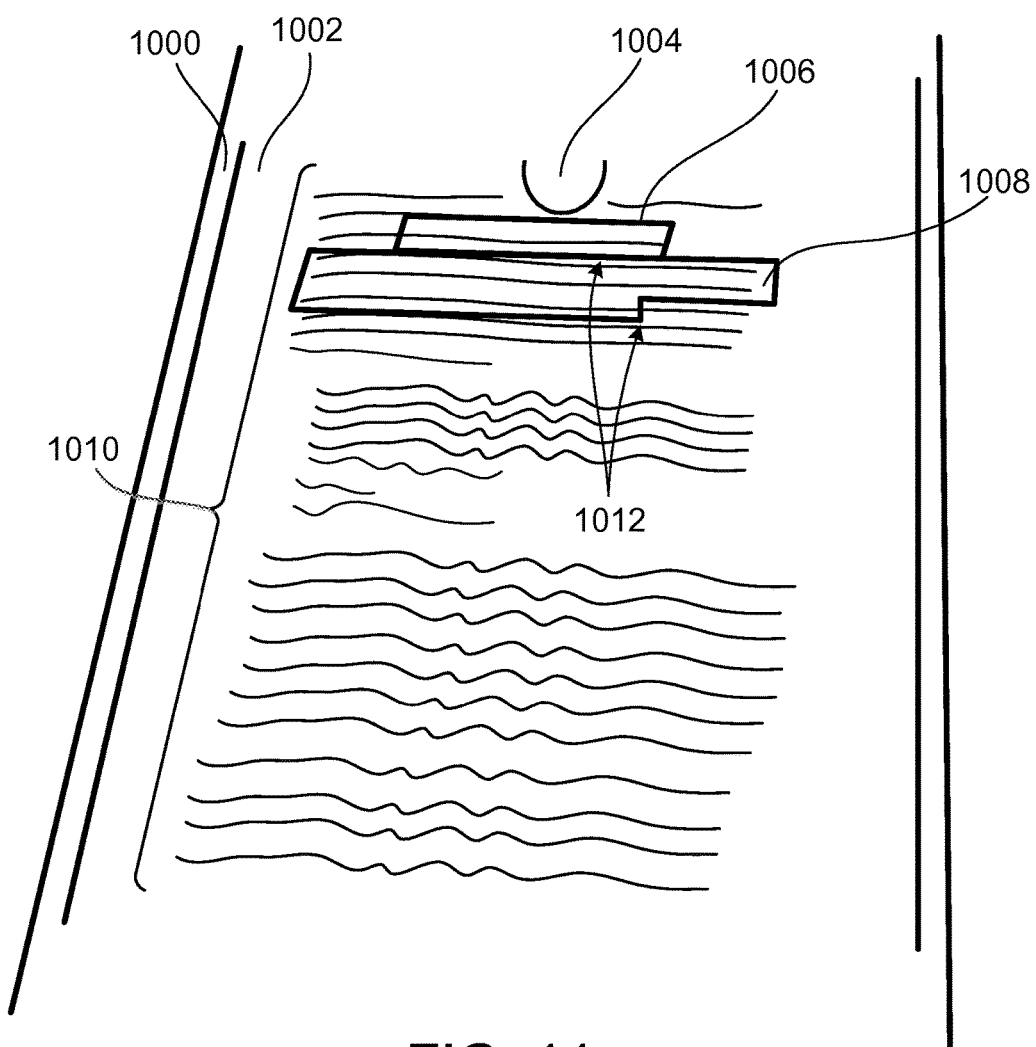
FIG. 11 illustrates an example of a highlighting and book-marking feature that optionally may be included as a feature of an eBook reader application.

FIG. 11 illustrates an example of a highlighting and book-marking feature that optionally may be included as a feature of an eBook reader application. As shown, a user can use his or her finger 1004 on a touch sensitive screen 1002 of a device 1000 displaying a page of text 1010 to designate a section 1008 of text to be highlighted (e.g., overlaid with an translucent yellow color) and/or bookmarked (e.g., flagged and remembered as a user designated passage). The section 1008 optionally may also be identified using graphical start and/or stop markers 1012. In addition, a pop-up user interface region 1006 (itself potentially separated into multiple regions, each having a different associated functionality such as "Highlight" or "Bookmark") may be displayed that enables the user to select how the selected text section 1008 is to be treated (e.g., highlighted, bookmarked and/or something else). Optionally, highlighted and/or bookmarked sections may appear as such in a table of contents of the eBook, which is updated and maintained as the user add, changes or deletes highlighted and/or bookmarked sections.

Figure 12:
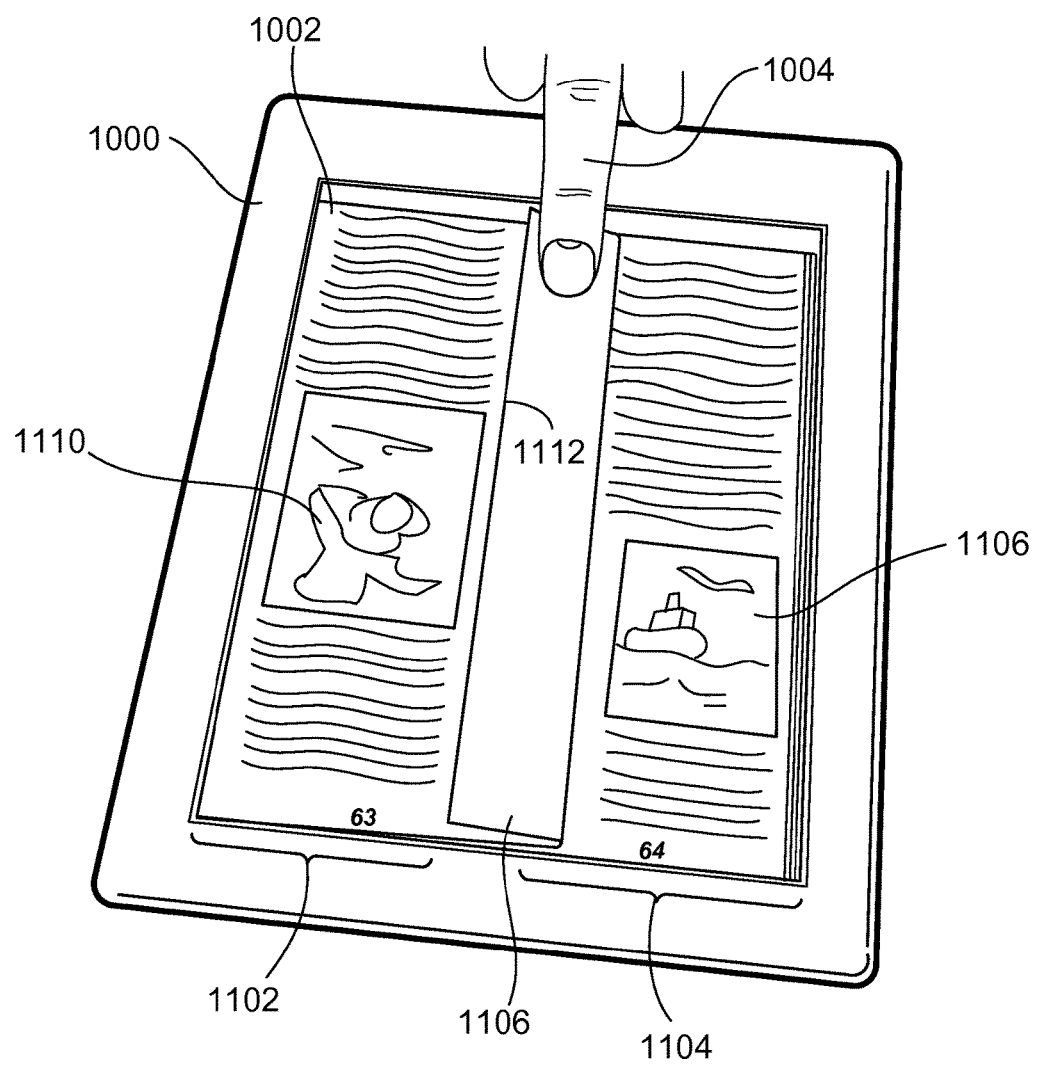
FIG. 12 shows an example of an eBook reader application displaying an open eBook as the user is flipping from one page to the next.

FIG. 12 shows an example of an eBook reader application displaying an open eBook as the user is flipping from one page to the next. More specifically, a user can use his or her finger 1004 on a touch sensitive screen 1002 of a device 1000 displaying a current page of text 1102 (e.g., page 63 of the eBook in question) to cause the current page 1102 to flip in the direction of movement (from right to left as shown in the example of FIG. 12) of the user's finger 1004 to concurrently expose a portion of the eBook's next page 1104 (e.g., page 64 of the eBook in question) while partially obscuring the text on the current page 1102 with a portion of the current's page back 1106. A leading edge of the current page 1102 moves dynamically and in real time concurrently with the user's finger 1004. Consequently, the relative portions of current page text 1102, current page back 1106, and next page 1104 that are displayed vary in real time with movement of the user's finger 1004, and are displayed in the manner that simulates the turning of a paper page in a physical paper & ink book.

The eBook reader application can use a layout engine, such as Webkit, which is the layout engine associated with the SAFARI web browser from Apple, Inc., to assist in rendering the various views of both static and moving (e.g., flipping) pages. In general, to display a page of text of an eBook, the eBook reader application can use the multiple column support of Webkit to render one or more pages of text, for example, the text 1010 shown in FIG. 11, such that each page corresponds to one associated column.

When a user initiates a page flip, the eBook reader application can re-use already rendered views (and thus avoid having to re-render them), by taking a snapshot (e.g., a bitmap) of a currently displayed page and using it in combination with a newly rendered page to facilitate the animated display of a page flip as it is occurring. For example, as shown in FIG. 12, as soon as the user's finger 1004 starts to initiate a page flip from the current page 1102 (page 63 of the eBook) to the next page 1104 (page 64 of the eBook), the eBook reader application captures the display of the current page and stores it as a bitmap in device memory. So in the state of the example of FIG. 12 (i.e., during a page flip sequence), the eBook reader application creates the current in real time by combining an appropriate portion of the captured bitmap of the current page 1102 along with Webkit-rendered (in real time) views both of the next page 1104 and the current page back 1106. Optionally, the current page back can be rendered to appear as if the current page 1102 was made of a translucent substance, and thus display faint inverted text, as if the page was being read from the back. Depending on implementation and design choices, the eBook reader alternatively could be implemented such that the next page 1104 is treated and displayed as a captured bitmap and the current page 1102 continues to be actively rendered in real time as the user's finger 1004 moves and changes the display of the relative portions of current page text 1102, current page back 1106, and next page text 1104 (any or all of which potentially can include one or more images 1108, 1110).

Similar implementation alternatives may be used for handling the display of page flips while the device is in landscape mode and multiple eBook pages are being displayed concurrently. For example, when in landscape mode (such as shown in FIG. 2B), the eBook reader application could capture a snapshot of both pages 360 and 361 and then use the resulting bitmap in rendering page flip sequences along with real time rendering of the visible portions of the next page to be displayed. Alternatively, currently displayed pages 360 and 361 could be handled independently by taking a bitmap snapshot of each to be used when the display requires that one or the other (or both) is to be obscured by the rending of the page being flipped to (and/or the backs of the currently displayed pages)

Depending on implementation and design choices, the eBook reader application may need to re-paginate (e.g., both change the currently displayed view as well as keep track of total number of pages in the eBook and the currently displayed page) in response to events such as change of font size, rotation of the device from portrait to landscape view and the like.

For example, if while viewing an open eBook, the user changes the font size, the eBook reader in response may automatically repaginate not to change the current view (e.g., if the user increases the current font size, the current display will change to displayed larger characters but fewer words since the amount of screen real estate is fixed) and, by a background process, re-calculate the new page total of the eBook (which necessarily changes in response to a change in font size) as well as to re-calculate the page number of the currently displayed page, but in absolute terms and relative to the total page length.

Similarly, when the user rotates the eBook from portrait to landscape view (typically meaning that the displayed will change from displaying a single page of the eBook to two adjacent pages of the eBook), re-pagination occurs in a similar manner to re-calculate current and total page numbers as well as to change the display of the viewable text. One potential implementation may be, in response to rotation from portrait to landscape, that the eBook reader application displays the exact same text that appeared in the portrait view as one of the two pages (either left hand side or right hand side) that are displayed in the landscape view (with the other displayed page being either the next or previous page in the eBook). This implementation typically involves changing the font size, e.g., such that the same number of words on the page displayed in portrait view fits within the smaller display area available in the landscape orientation.

An alternative implementation when switching from portrait to landscape orientation is to keep the font size constant before and after the switch but scale the view so that fewer words appear on the each page displayed in landscape orientation than in portrait orientation. Under this implementation alternative, the eBook reader application may identify a portion of text (e.g., the first sentence of the first full paragraph) that is visible in the portrait orientation and cause the landscape orientation display to be certain that that same text portion remains visible in the landscape orientation (e.g., at a predetermined position on either the right hand or left hand page).

In addition, as noted above, rotation of the device causes a re-calculation of the currently displayed page numbers as well as the new total page number. The newly re-calculated page numbers may be used to update other previously save pointers and markers. For example, text sections that are highlighted and/or bookmarked typically are stored with an associated page number. When rotation, font size change, or other re-paginating event occurs, the newly re-calculated page numbers are used to update those associated page numbers. Other uses of the re-calculated page numbers and totals may be used for other page number related aspects such as page numbers displayed in the scrubbing bar, table of contents, index, chapter start indicators and the like.

Figure 13:
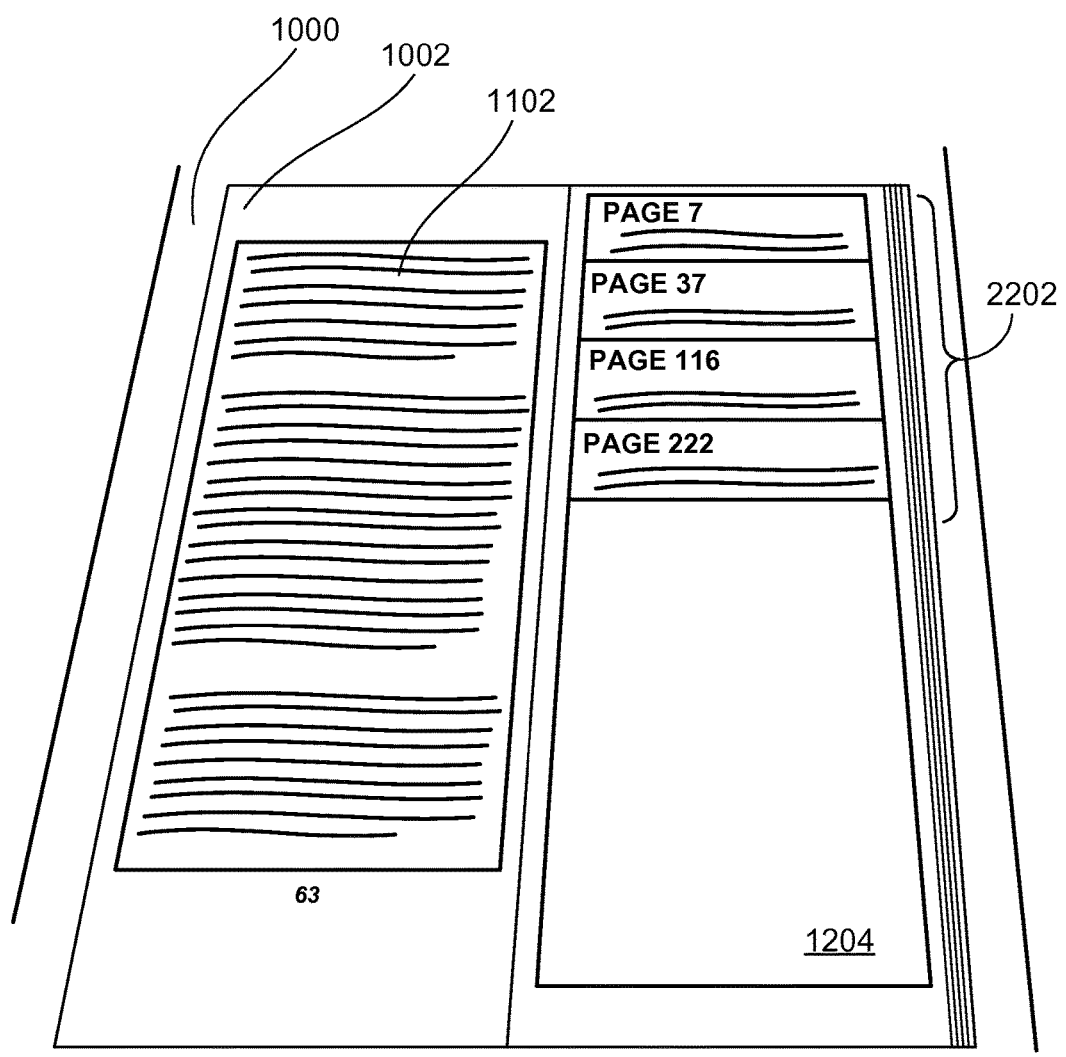
FIG. 13 shows an example of a search feature that may be implemented by an eBook reader application.

FIG. 13 shows an example of a search feature that may be implemented by an eBook reader application. As shown, a left portion of a screen 1002 of a device 1000 displays a current page of text 1102 (e.g., page 63 of the eBook in question) while a right portion of the screen 1002 displays a search results pane 1204, which displays the results of a search for a particular word in the eBook under consideration. In this example, the search resulted in four search hits 1202 (at page 7, 34, 116 and 222) each of which displays the search term in its original context, potentially highlighted and as part of a complete or partial sentence in which it appears. The search hits 1202 potentially can be bookmarked and/or serve as interactive links that can be selected by the user to jump to the eBook page on which the particular search hit occurs. As shown, each search hit 1202 includes an associated page number which may be updated in response to re-paginating events as described above.

Figure 14:
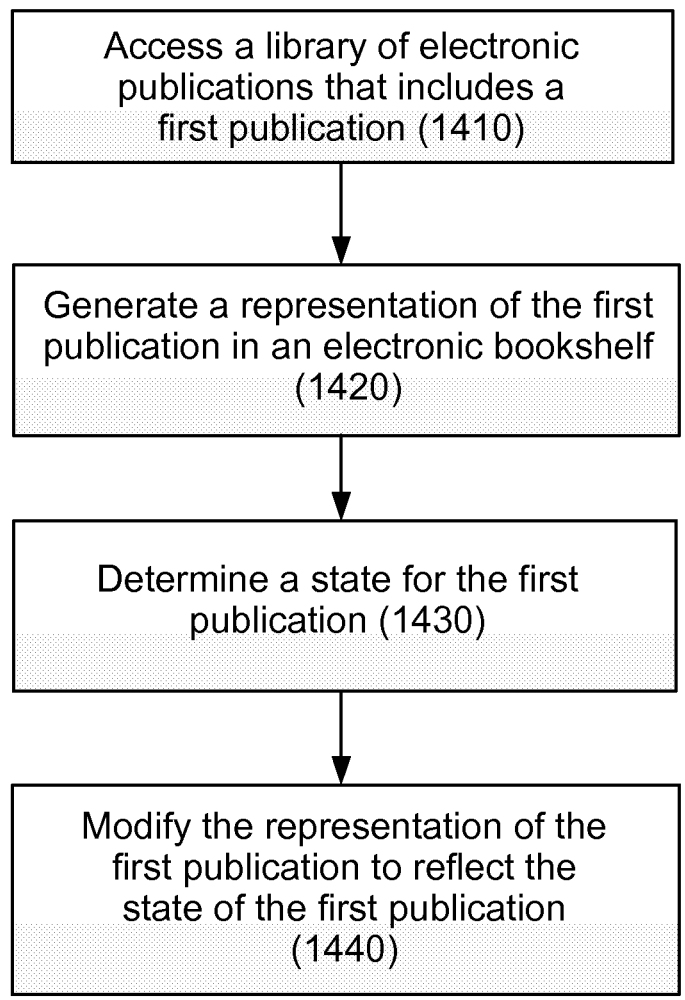

FIG. 14 is a flow chart 1400 of a process by which information is presented to a user. Typically, the operations are performed using the systems described above. For example, the operations may be performed using the electronic client device described in FIGS. 6A and 6B. Initially, an eBook application accesses a library of electronic publications that includes a first publication (1410). For example, a user may load a library of electronic books. The eBook application generates a representation of the first publication in an electronic bookshelf (1420). The representation may include a display of a cover of a magazine or a book. The eBook application determines a state for the first publication (1430). Determining the state for the first publication may include determining that a book was recently purchased and/or read. The eBook application modifies the representation of the first publication to reflect the state of the first publication (1440). Thus, a book that has not been recently read may be rendered using a binding view instead of a cover view and/or to reflect a presence of dust on a book.

Figure 15:
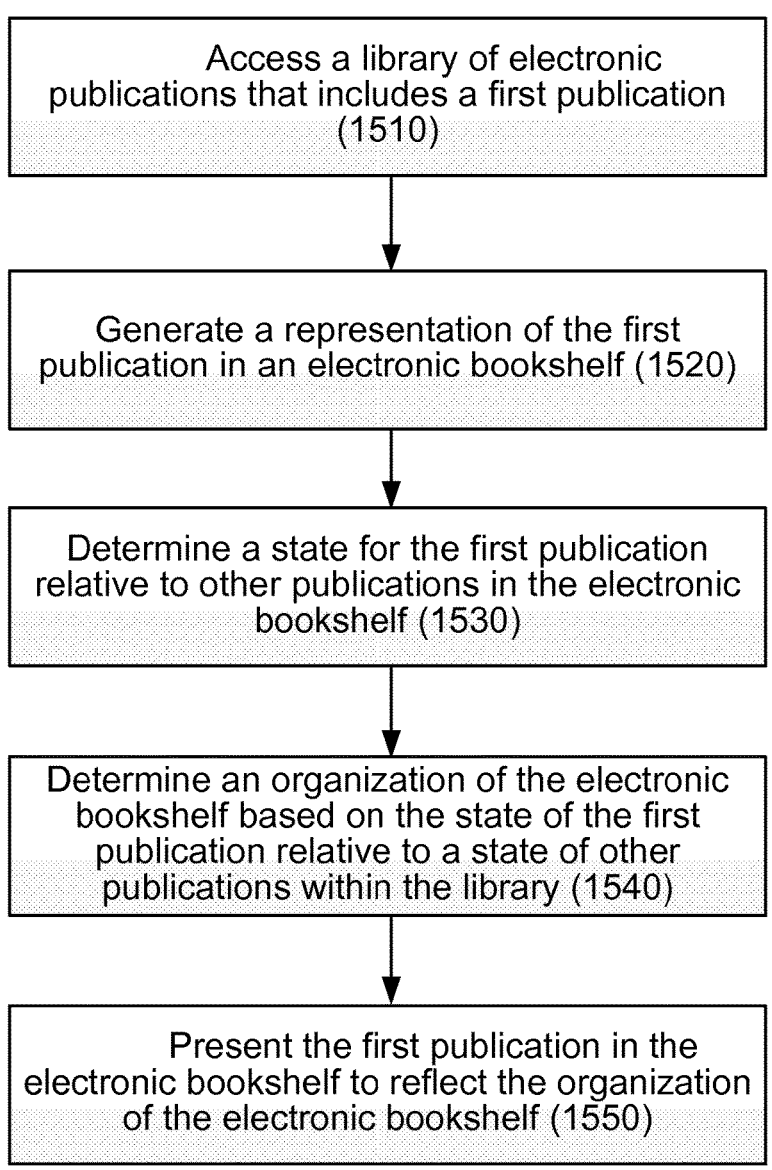

FIG. 15 is a flow chart 1500 of a method of presenting information to a user. Typically, the operations described in flow chart 1500 may be performed, for example, using the eBook application described previously. An eBook application accesses a library of electronic publications that includes a first publication (1510). Accessing the library may include accessing electronic books that have been locally stored and/or networked content for which the user has rights. The eBook application generates a representation of the first publication in an electronic bookshelf (1520). The representation may include presenting a cover and/or binding view of a publication in an electronic shelf. The eBook application determines a state for the first publication relative to other publications in the electronic bookshelf (1530). Determining the state may include determining a date of purchase, a release date, or a date of access. The eBook application determines an organization of the electronic bookshelf based on the state of the first publication relative to a state of other publications within the library (1540). The organization may include criteria under which content is sorted and/or presented to a user in a bookshelf. Thus, periodicals may be sorted by date in a first category, while fiction may be sorted by popularity in a second category, and nonfiction is sorted by recency of access in a third category.

The eBook application presents the first publication in the electronic bookshelf to reflect the organization of the electronic bookshelf (1550). Thus, a first shelf may be used to present content from a first category (e.g., periodicals) while a second shelf is used to present fiction based on popularity, and a third shelf is used to present content according to recency of access. The shelf may be organized so that a first number of publications are displayed using a cover view while the remaining publications are presented using a binding view.

Figure 16:
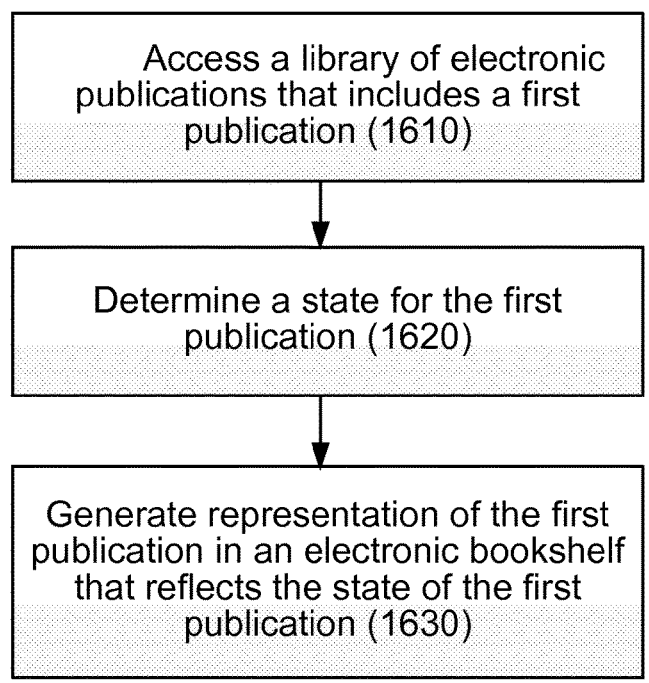

FIG. 16 is a flow chart 1600 of a process by which information is presented to a user. Like flow charts 1500 and 1600, the operations may be performed using the systems described above. Initially, an eBook application accesses a library of electronic publications that includes a first publication (1610) and determines a state for the first publication (1620). For example, the eBook application may determine that a first publication represents promotional content while a second publication is newly-purchased. The eBook application generates a representation of the first publication in an electronic bookshelf that reflects the state of the first publication (1630). The first publication may be bound or wrapped in a ribbon that indicates that the first publication is new or promotional content.

Figure 17:
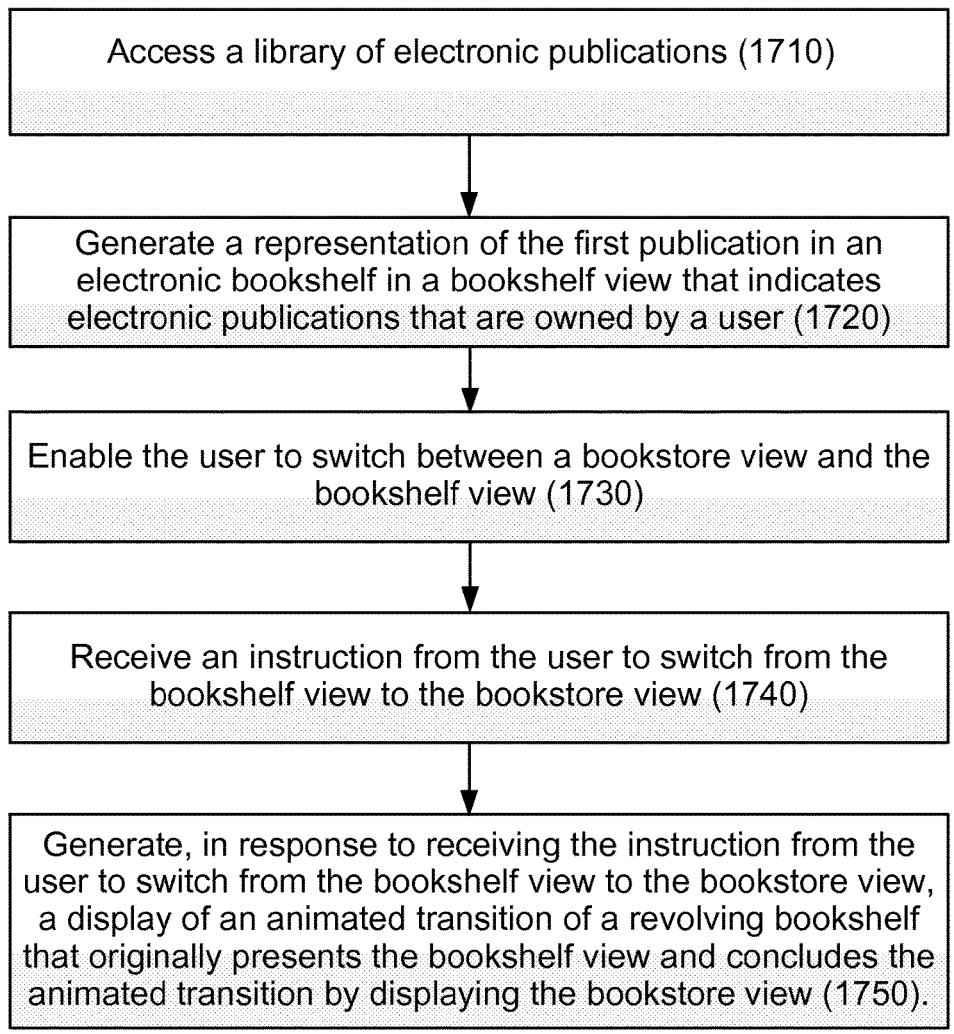

FIG. 17 is a flow chart 1700 of a process by which information is presented to a user. Initially, an eBook application accesses a library of electronic publications (1710). A representation of the first publication is generated in an electronic bookshelf in a bookshelf view that indicates electronic publications that are owned by a user (1720). The eBook application enables the user to switch between a bookstore view and the bookshelf view (1730). The bookstore view may include a representation of a bookshelf that enables a user to browse electronic books on the bookstore shelf and purchase those electronic books if the user is interested. The electronic book application receives an instruction from the user to switch from the bookshelf view to the bookstore view (1740). For example, the user may press a software-based button within the eBook application that inspires a transition.

In response to receiving the instruction from the user to switch from the bookshelf view to the bookstore view, the eBook application generates a display of an animated transition of a revolving bookshelf that originally presents the bookshelf view and concludes the animated transition by displaying the bookstore view (1750). A bookshelf may turn or rotate or slide or float into place in order to render a bookstore view. If the user elects to purchase an electronic book, the electronic book may float forward as the representation of the bookshelf is rotated from the bookstore view into the bookshelf view and the newly-purchased book is placed on a shelf.

Figure 18:
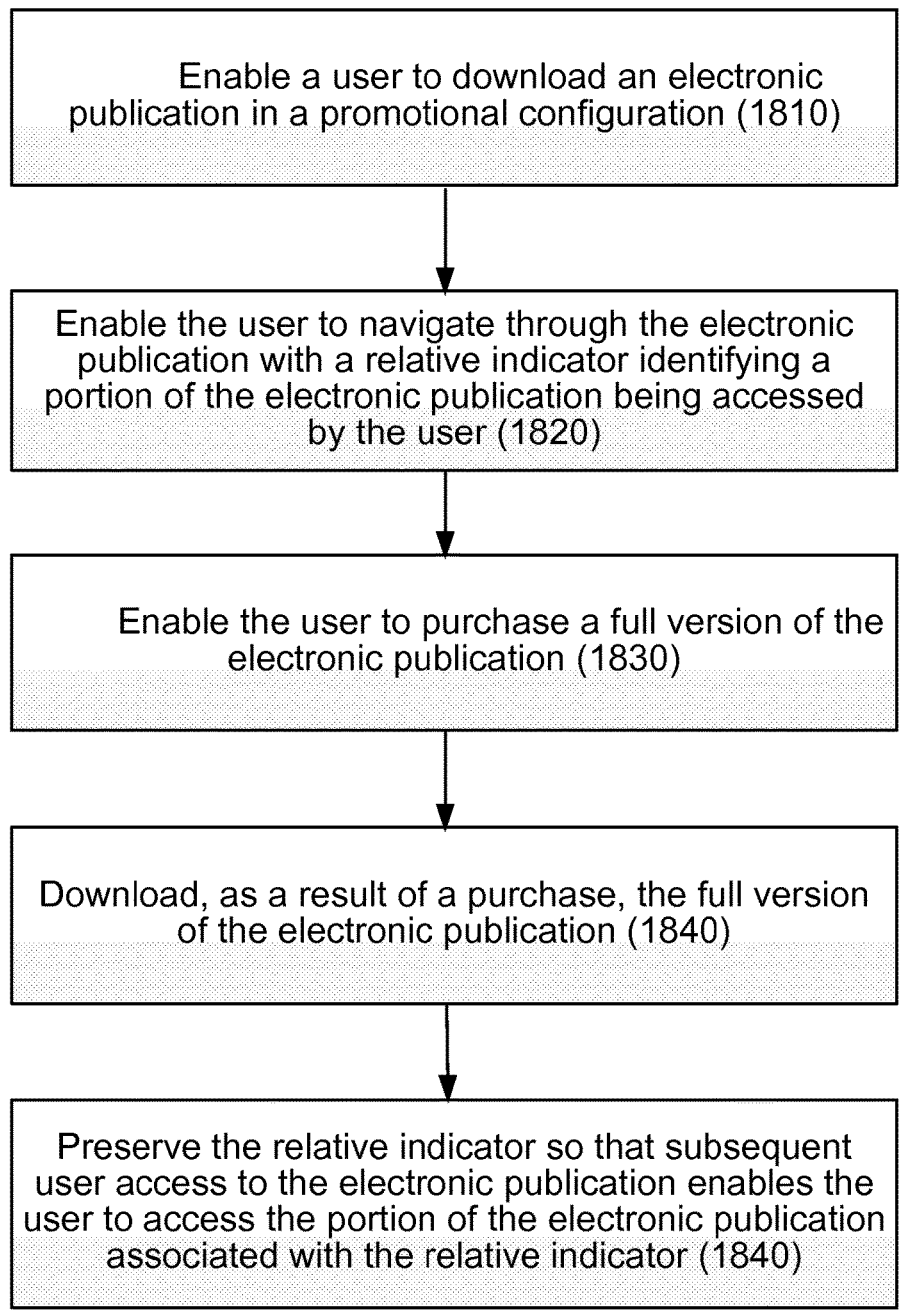

FIG. 18 is a flow chart 1800 of a process by which information is presented to a user so that a user may preserve their settings in content that was originally promotional content. Initially, an eBook application enables a user to download an electronic publication in a promotional configuration (1810). A publisher may permit a user to browse the first 30 pages of an electronic book or access the electronic book for a specified duration. The eBook application then enables the user to navigate through the electronic publication with a relative indicator identifying a portion of the electronic publication being accessed by the user (1820). The relative indicate may indicate which portions of the electronic book have been read and where the user spent time in the electronic book. The eBook application enables the user to purchase a full version of the electronic publication (1830). A user may select a purchase tab or button that appears on a last page of the promotional content. As a result of a purchase, the eBook application downloads the full version of the electronic publication (1840). The eBook application then preserves the relative indicator so that subsequent user access to the electronic publication enables the user to access the portion of the electronic publication associated with the relative indicator (1850). In that manner, a user is able to perceive their bookmarks and an indication of which content has already been read.

Figure 19:
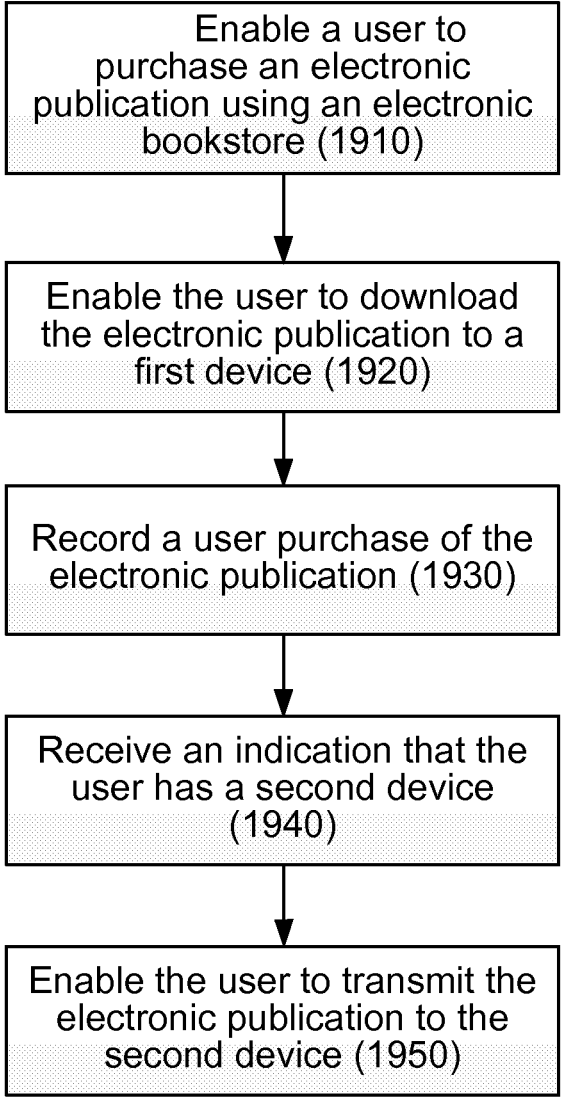

FIG. 19 is a flow chart 1900 of a method of presenting information to a user that enables a user to share content among multiple devices. The eBook application enables a user to purchase an electronic publication using an electronic bookstore (1910) and the user is enabled to download the electronic publication to a first device (1920). A user purchase of the electronic publication is recorded (1930). A registration server may be used to record which users have access to which content. The eBook application receives an indication that the user has a second device (1940). For example, a user may own both an eBook device and also a wireless phone. The eBook application may generate an icon of a wireless phone in a portion of the display so that the user may interact with the icon to exchange content between different devices. The eBook application then enables the user to transmit the electronic publication to the second device (1950). The registration server may verify rights to content and transmit the content to the second device (e.g., loading the electronic publication to a library on the wireless phone).

FIG. 20 is a flow chart 2000 of a process by which information is presented to a user so that a user may perceive relative progress in navigating through a book by viewing relative heights of the paper on the left and right side of a binding. Initially, an eBook application presents, within an electronic book reader application on an electronic device, a representation of an electronic book with an indication of left side pages and an indication of right side pages (2010). A user starting out reading an electronic book may have a large volume of pages on the right hand side and a small volume of pages on a right hand side. As the user turns pages, the relative heights may be altered to reflect a user's passage through an electronic book. The eBook application enables the user to navigate through the electronic publication with a relative indicator identifying a portion of the electronic publication being accessed by the user (2020). The relative indicator may indicate that a user is on a specified page relative to an overall page count. The eBook application modifies, using the relative indicator, the indication of the left side pages and the indication of right side pages to reflect a relative height of left side pages and right side pages (2030).

In one configuration, the relative height is mathematically determined so that a height is precisely calculated on a page by page basis. In another configuration, a series of discrete values is used so that a series of different display height settings is used where each display setting represents a range of pages.

Figure 21:
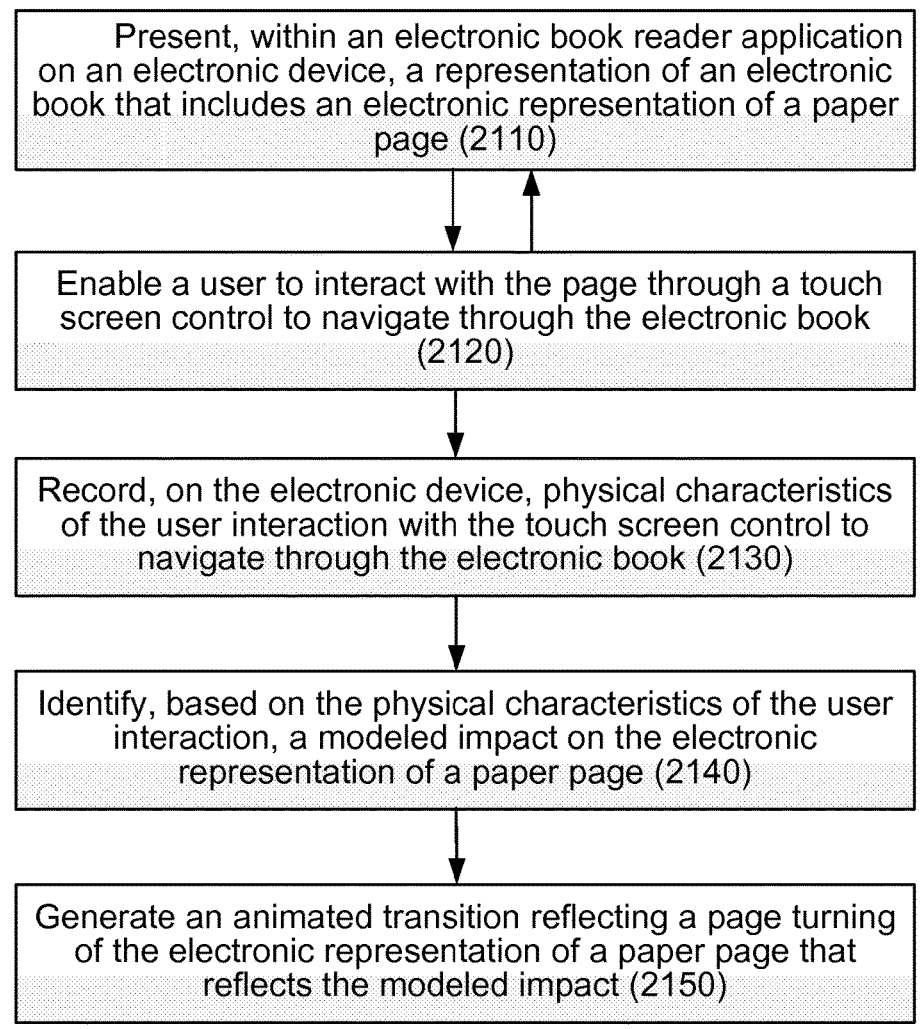

FIG. 21 is a flow chart 2100 of a process by which information is presented to a user so that an animated transition is presented to a user that reflects a manner in which a user turned a page. Initially, within an electronic book reader application on an electronic device, a representation of an electronic book is presented that includes an electronic representation of a paper page (2110). The electronic book may be presented in a portrait setting, a landscape setting, or in a setting that features two pages with a virtual binding in between.

The eBook application enables a user to interact with the page through a touch screen control to navigate through the electronic book (2120). For example, a user may swipe a finger across the touch screen to turn the page. The eBook application records, on the electronic device, physical characteristics of the user interaction with the touch screen control to navigate through the electronic book (2130). Thus, if a swipe is performed rapidly or with a certain degree of acceleration, the physical characteristics of the swipe are recorded. The location at which the electronic representation was touched also may be recorded in addition to length of the swipe. The eBook application identifies, based on the physical characteristics of the user interaction, a modeled impact on the electronic representation of a paper page (2140). The modeled impact reflects a translation that describes the impact on the user performing the same gesture or action on an actual piece of paper. The eBook application generates an animated transition reflecting a page turning of the electronic representation of a paper page that reflects the modeled impact (2150). Thus, if a page is rapidly turned, the page is shown as being rapidly turned over. If a swipe begins at a specified location, the page may be rendered as if the page were beginning to be bent at the specified location.

Figure 22:
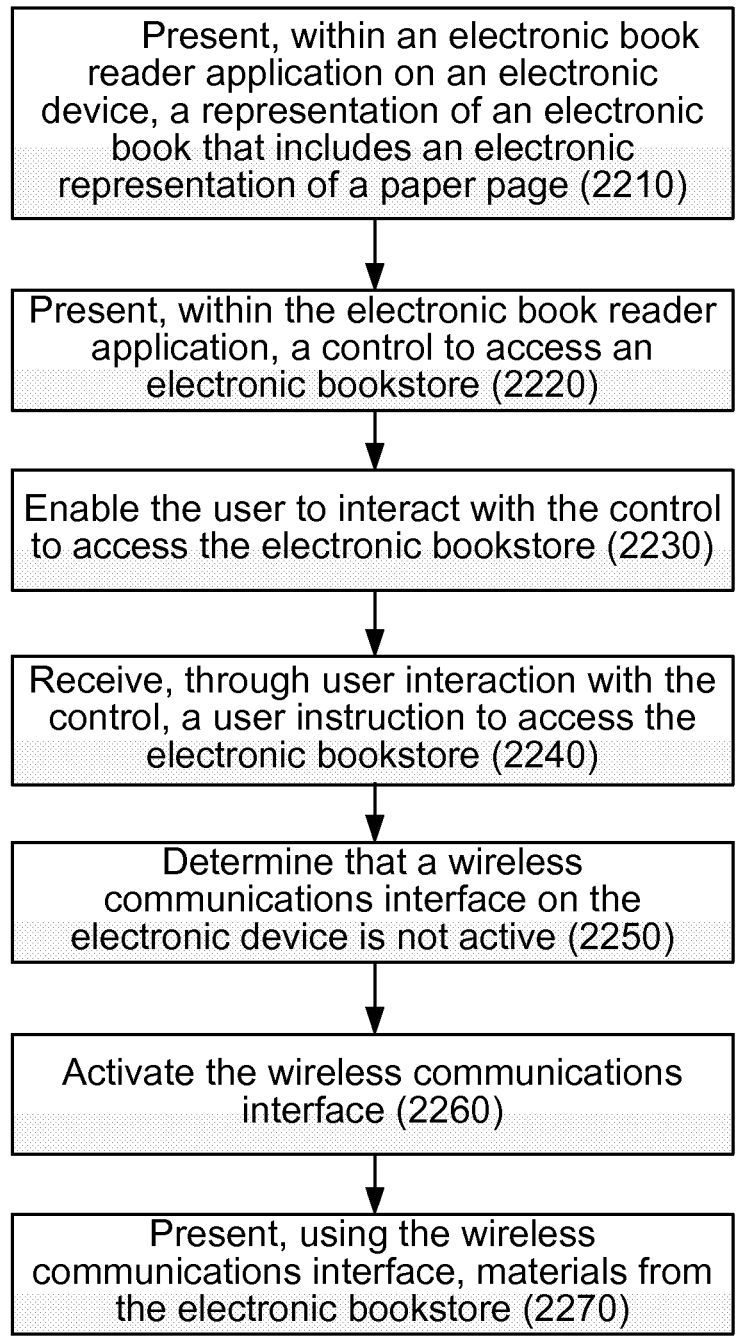

FIG. 22 is a flow chart 2200 of a process that enables a user to access an electronic bookstore. Initially, the eBook application presents, within an electronic book reader application on an electronic device, a representation of an electronic book that includes an electronic representation of a paper page (2210). The eBook application presents, within the electronic book reader application, a control to access an electronic bookstore (2220). The control may include a software-based button appearing in the screen to inspire a transition to the electronic bookstore. The eBook application enables the user to interact with the control to access the electronic bookstore (2230). Through user interaction with the control, a user instruction to access the electronic bookstore is received (2240). For example, a user may press the software-based button. The eBook application determines that a wireless communications interface on the electronic device is not active (2250) and activates the wireless communications interface (2260). Using the wireless communications interface, materials from the electronic bookstore are accessed (2270). Thus, a user is shielded from a burden of having to selectively activate a communications interface in order to access the electronic bookstore.

Figure 23:
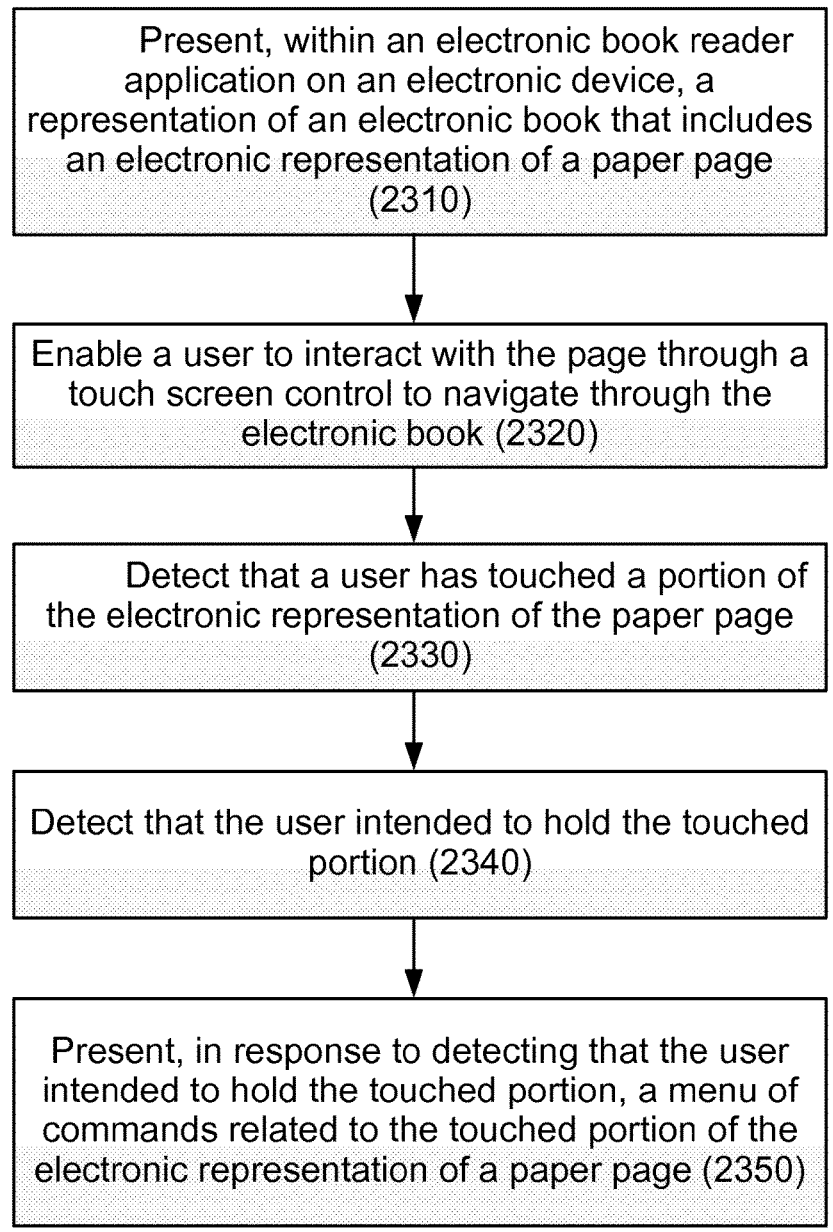

FIG. 23 is a flow chart 2300 of a process by which a menu of commands is presented to a user. Initially, an eBook application presents, within an electronic book reader application on an electronic device, a representation of an electronic book that includes an electronic representation of a paper page (2310). The eBook application enables a user to interact with the page through a touch screen control to navigate through the electronic book (2320) and detects that a user has touched a portion of the electronic representation of the paper page (2330). For example, a user may maintain a touch for a threshold period of time on a display to inspire invocation of a menu. The eBook application detects that the user intended to hold the touched portion (2340). The eBook application then presents, in response to detecting that the user intended to hold the touched portion, a menu of commands related to the touched portion of the electronic representation of a paper page (2350). The menu of commands may enable a user to highlight a portion of text or inspire invocation of a map related to a current book. In one configuration, the menu of commands reflects the underlying content that is selected with the selection command (e.g., the portion of a text that was selected). Thus, if the underlying content related to baseball, then the menu commands may include links to baseball-related resources or applications (e.g., a baseball game).

Figure 24:
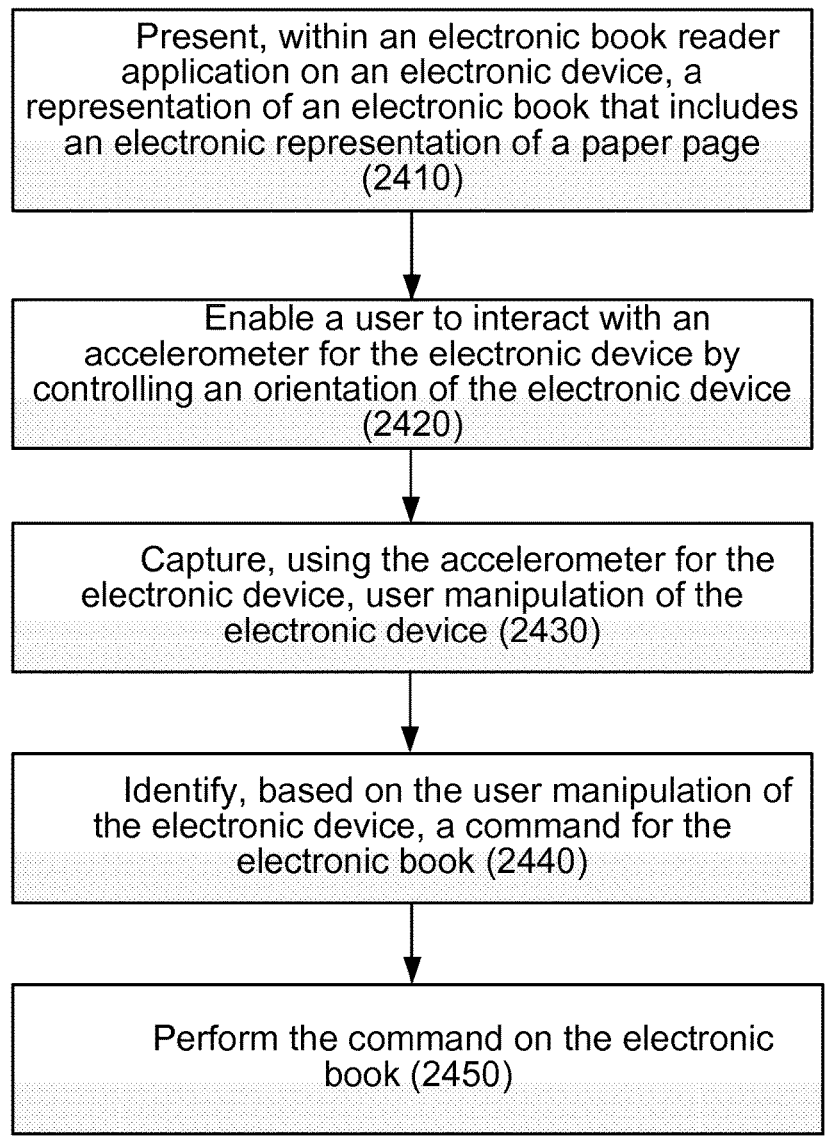

FIG. 24 is a flow chart 2400 of a process by which a user is enabled to manipulate an accelerometer within an electronic device to perform a command on an electronic book. Initially, a user is presented, within an electronic book reader application on an electronic device, a representation of an electronic book that includes an electronic representation of a paper page (2410). The user is enabled to interact with an accelerometer for the electronic device by controlling an orientation of the electronic device (2420). For example, a user may move, manipulate, shake, or accelerate the electronic device. Using the accelerometer for the electronic device, user manipulation of the electronic device is capture (2430). The accelerometer may determine that a book was rotated in a specific direction.

Based on the user manipulation of the electronic device, a command for the electronic book is identified (2440). An electronic device may be shaken to close a cover of an electronic book, tilted more than a threshold degree to change pages, and tilted less than a threshold degree to provide a preview of a next page. The command is then performed on the electronic book (2450).

Figure 25:
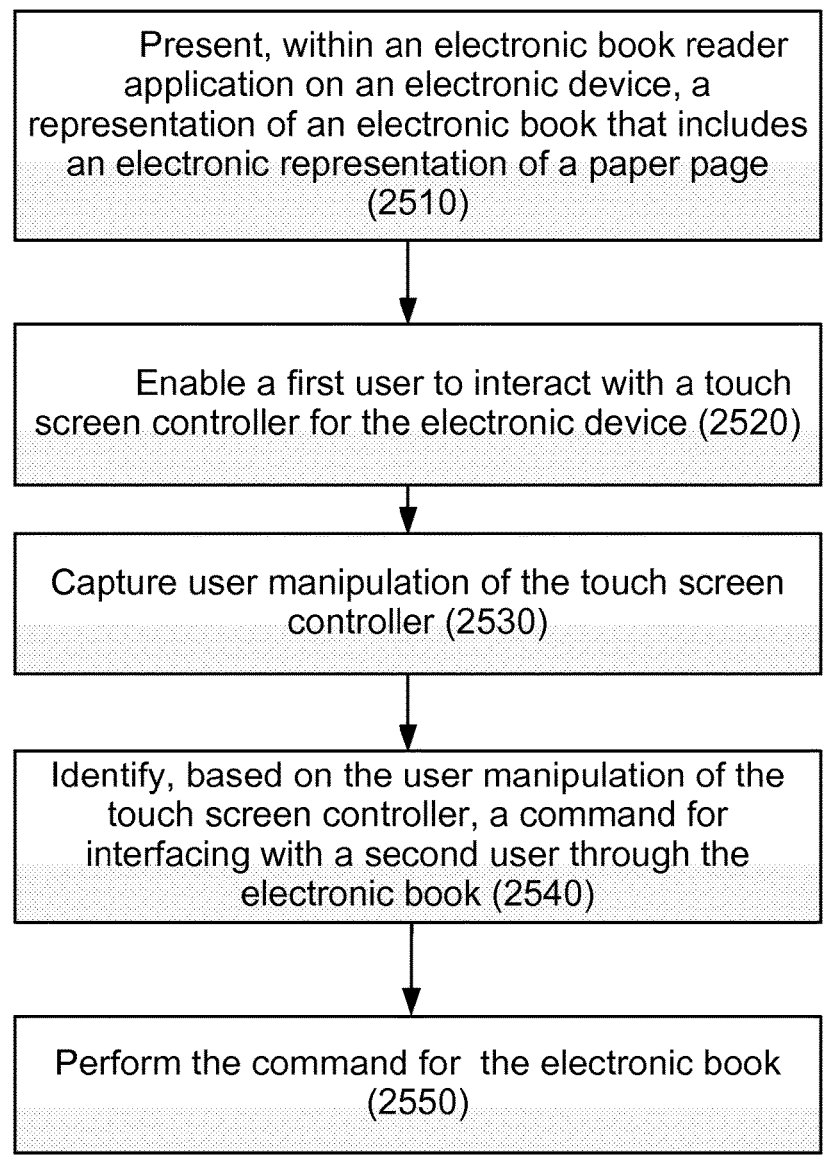

FIG. 25 is a flow chart 2500 of a process that enables a user to interface with an electronic publication. Initially, within an electronic book reader application on an electronic device, a representation of an electronic book that includes an electronic representation of a paper page is presented (2510). The first user is enabled to interact with a touch screen controller for the electronic device (2520). For example, an eBook application may render an icon for other users in the social network that are proximate to the user. The electronic device captures user manipulation of the touch screen controller (2530). An example of user manipulation includes a gesture that throws a book icon towards a user icon or even in the actual direction of the user. The eBook application may transmit an indication of the gesture to a server that records an indication of other users proximate to the user and their location. Based on the user manipulation of the touch screen controller, a command for interfacing with a second user is performed through the electronic book (2540). Thus, a first user may flick a book off an electronic bookshelf towards another user to transmit the book to the other user. The eBook application then performs the command for the electronic book (2550).

Figure 26:
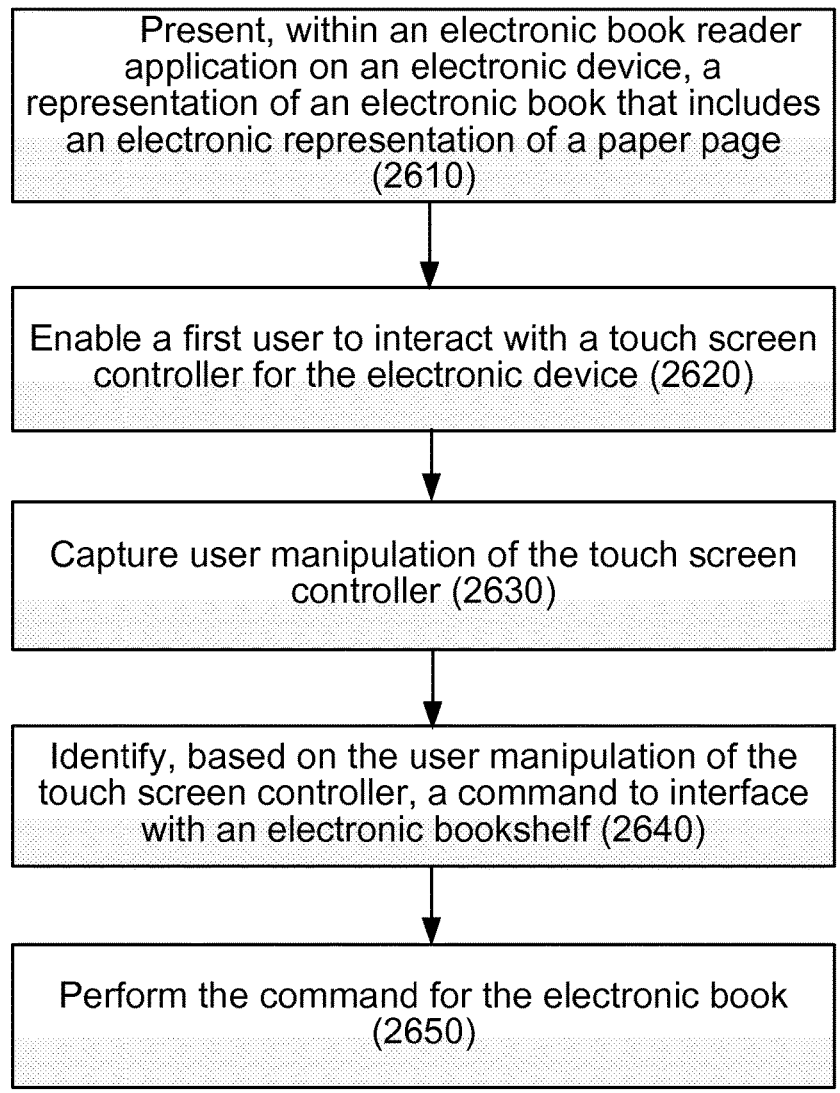

FIG. 26 is a flow chart 2600 of a process that enables a user to interface with an electronic publication. The eBook application presents, within an electronic book reader application on an electronic device, a representation of an electronic book that includes an electronic representation of a paper page (2610). The electronic representation of a paper page is modeled to resemble actual paper so that the representation would behave and respond to stimuli in the same manner as actual paper would respond to the stimuli. A first user is enabled to interact with a touch screen controller for the electronic device (2620). User manipulation of the touch screen controller is captured (2630). Thus, a first gesture on a touch screen may be recorded to indicate starting location(s) for a gesture, an ending location, a velocity of a gesture, and acceleration for a gesture. Based on the user manipulation of the touch screen controller, a command to interface with an electronic bookshelf is identified (2640). For example, a three finger swipe may be used to advance to a next selection on an electronic bookshelf. The command is performed for the electronic book (2650).

Figure 27:
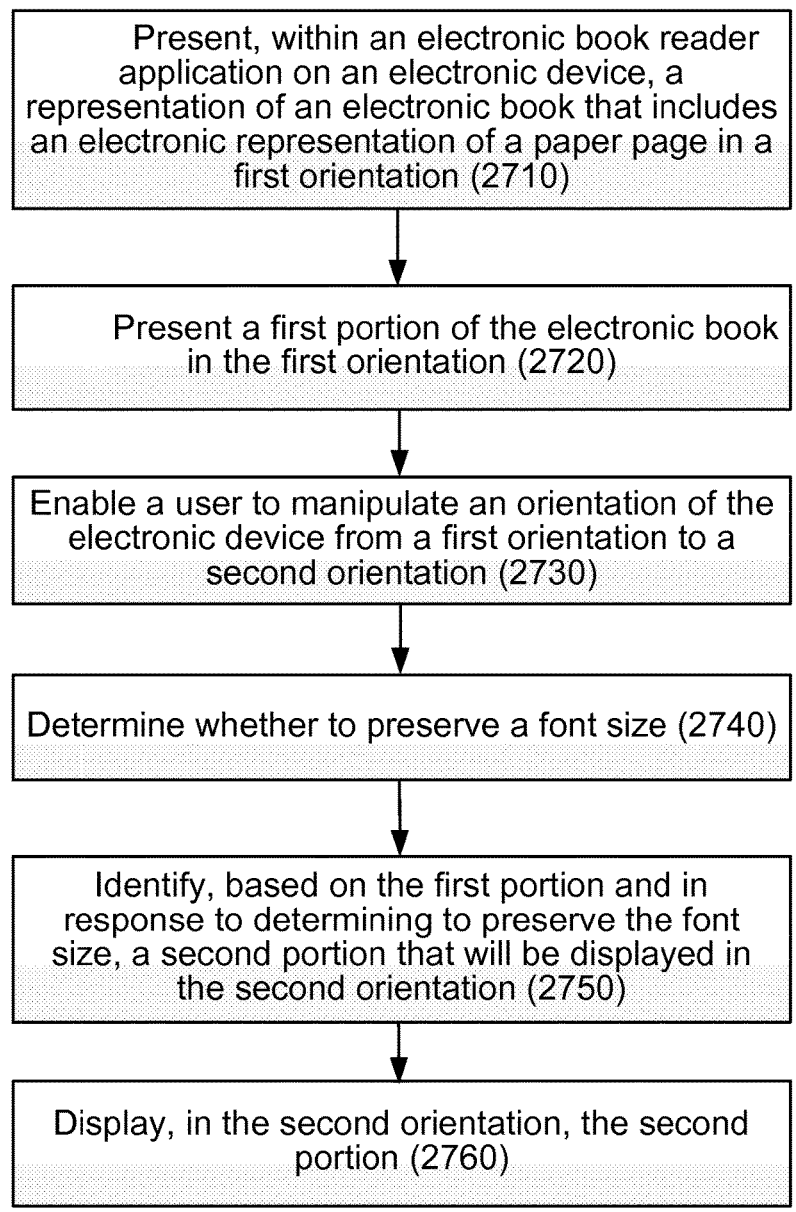

FIG. 27 is a flow chart 2700 of a process of presenting information to a user. The operations shown in flow chart 2700 may be used to preserve a viewing experience as a user transitions from a first orientation (e.g., landscape) to a second orientation (portrait). Within an electronic book reader application on an electronic device, a representation of an electronic book is presented that includes an electronic representation of a paper page in a first orientation (2710). A first portion of the electronic book is presented in the first orientation (2720). For example, a particular portion may be displayed in landscape mode. The user is enabled to manipulate an orientation of the electronic device from a first orientation to a second orientation (2730). It is determined whether to preserve a font size (2740). For example, a user may prefer to preserve a font size in order to enjoy a better viewing experience. Based on the first portion and in response to determining to preserve the font size, a second portion that will be displayed in the second orientation is identified (2750). Switching from a two page landscape view to a single page portrait view may require that additional content be presented within the display. The second portion is displayed in the second orientation (2760).

Figure 28:
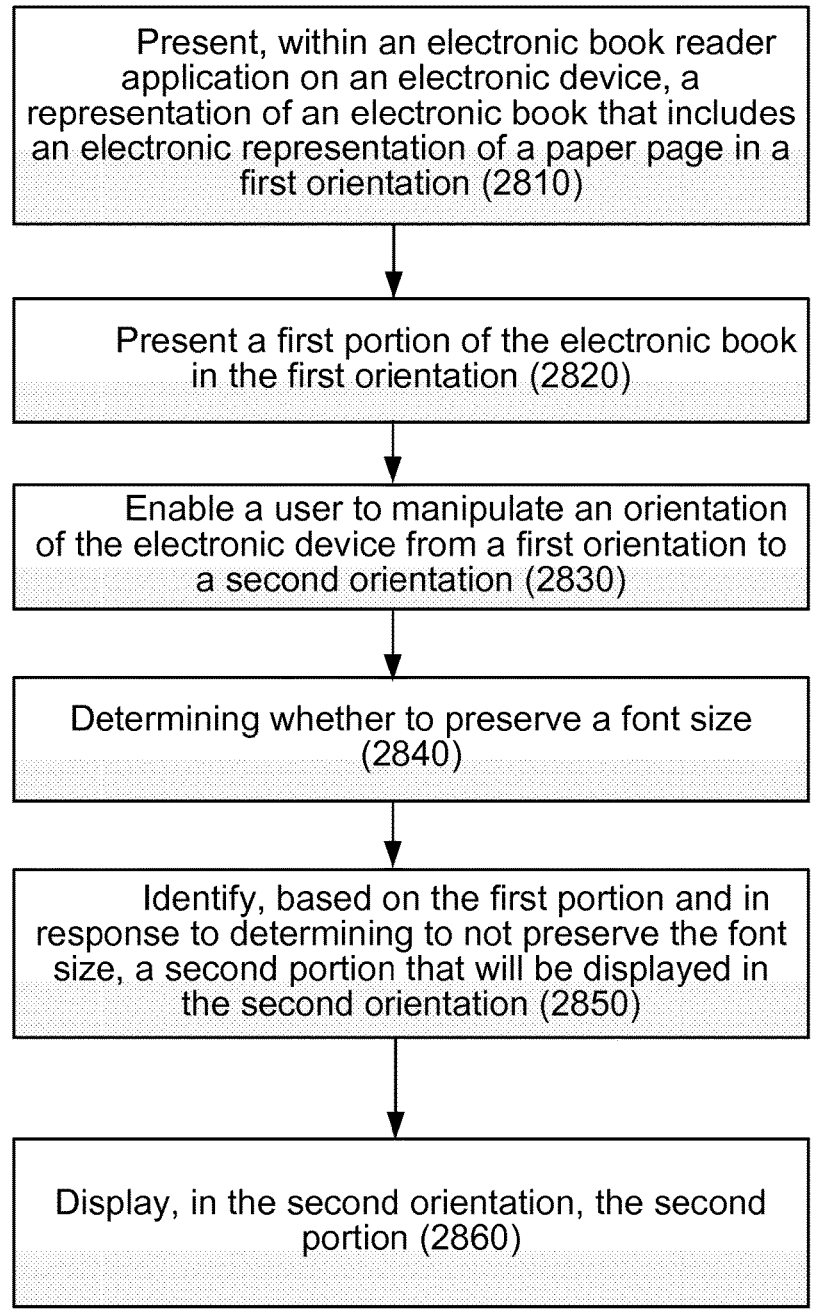

FIG. 28 is a flow chart 2800 of a process by which information is presented to a user. The operations shown in flow chart 2800 may be used to modify a viewing experience so that content is removed as a font size changes in a transition from a first orientation (e.g., portrait) to a second orientation (landscape). Initially, within an electronic book reader application on an electronic device, a representation of an electronic book is presented that includes an electronic representation of a paper page in a first orientation (2810). A first portion of the electronic book is presented in the first orientation (2820). A user is enabled to manipulate an orientation of the electronic device from a first orientation to a second orientation (2830), for example, to switch from a portrait orientation to a landscape orientation. It is determined whether to preserve a font size (2840). A user may have a setting that indicates that the user is able to accommodate font size changes within a certain range while also specifying that font size changes beyond a threshold should be preserved. Based on the first portion and in response to determining to not preserve the font size, a second portion is identified that will be displayed in the second orientation (2850). This may include additional content that should be rendered as a result of an increased area being available for display. The second portion is displayed in the second orientation (2860). Thus, a new display in landscape mode may feature newly added content.

Optionally, an eBook reader application could have features, aspects and/or functionality that, potentially based on output from the device's motion, attitude, touch and/or other sensors, could The eBook reader application may be configured to enable the user to peek at the next page by tilting the device (e.g., to one side) by a threshold amount that causes at least a portion of the next page to be displayed. In addition, the eBook reader application may be configured to cause a currently open eBook to close, go to the first page, go to the last or other predetermined page (e.g., index or table of contents), and/or go back to the adjacent previous page.

In one configuration, the eBook reader application may be configured to cause a currently open eBook to close to its cover and/or return to the book shelf in response to detecting a multi-touch pinch performed by the user on the device's touch sensitive surface. In another configuration, the eBook reader application may be configured to cause a currently open eBook to close to its cover and/or return to the book shelf in response to detecting a multi-touch pinch performed by the user on the device's touch sensitive surface.

In yet another configuration, the eBook reader application may be configured to cause a currently open eBook to close to its cover and/or return to the book shelf in response to detecting a multi-touch pinch performed by the user on the device's touch sensitive surface. In still yet another configuration, the eBook reader application may be configured to cause a currently open eBook to close to its cover and/or return to the book shelf in response to detecting a multi-touch pinch performed by the user on the device's touch sensitive surface.

In one configuration, the eBook reader application may be configured to cause a currently open eBook to switch to a next eBook in a queue (e.g., selected automatically based on factors such as newness, frequency of use, related subject matter, related author, and/or predetermined by user) in response to detecting a predetermined user gesture (e.g., a swipe on the touch sensitive surface or shake of the device), potentially without requiring the user to go through the process of having to go back to the library or bookstore and manually select a new eBook to open. In another configuration, the eBook reader application may be configured to cause information about the current state of the device, the eBook reader application, and/or the user to be automatically broadcast or otherwise transmitted to one or more other humans (alternatively also referred to as "throwing" information) in response to detecting that the user has performed a predetermined gesture. The "thrown" information could include one or more of the user's location, user's identity, title of the eBook currently open on the user's device, current page number of the eBook currently open on the user's device, a bookmark, a segment of text, an image or movie, or essentially any other item of information about current state known to the device, user and/or eBook reader application.

In another configuration, the eBook reader application may be configured to cause a currently open eBook to close to its cover in response to detecting that the user has rotated the device away from the away (e.g., a 180 degree pivot about a vertical axis), and/or re-open upon detecting that the user has once again rotated the device back to face the user (and/or in response to another criterion, such as time lapse). An advantage of this behavior may be to allow the user to show another person what the user is currently reading by momentarily displaying the cover of the eBook rather than the current page (which likely would have smaller font text and/or less readily discernible information about the identity of the eBook).

In yet another configuration, the eBook reader application may be configured to enable a user to share eBooks (portions or entire contents) with one or more other users in response to detecting that the user has performed a predetermined gesture or, in response to the passage of time, cause the display of unopened or seldom opened eBooks to change appearance, e.g., by displaying only the spine of such books rather than complete covers, and/or cause the eBooks to appear dusty, yellowed, translucent or other visual indications of disuse. Similarly, an eBook reader application could change the display of available newspapers or magazines so that they appear in a pile after a few issues have accumulated so that they do not unduly clutter the bookshelf display. Archiving of such eBooks (either locally on the device via compression or the like or remotely on a server or other data store) could accompany such a change in display based on age or disuse.

In one configuration, the eBook reader application may be configured to enable eBooks to have links to web pages, inline videos, images, music or other audio clips or the like, which reside remotely from the device but which can be accessed through wireless (and/or wired) communications. In another configuration, the eBook reader application may be configured to enable an eBook's content to be updated, potentially automatically, for example, if the author or the publisher changes or supplements the ePub, e.g., through the use of embedded dynamic content in an eBook that receives the changed or supplemental content via the internet or other network. In still yet another configuration, the eBook reader application may be configured to enable a user to electronically chat (e.g., via email or a chat plugin utility) with others about a particular eBook, e.g., similar to a forum, salon or book club or display opportunities (e.g., links, banners, advertisements or the like) for a user to purchase or otherwise obtain digital content (e.g., movie, soundtrack, audio-book or the like) that is complementary to a particular eBook.

In yet another configuration, the eBook reader application may be configured to enable a user to listen along and/or read along to an eBook by concurrently presenting, potentially in synchronization, a corresponding audio (or audio-visual) version of that eBook. In one configuration, the eBook reader application may be configured to provide a user with intelligent suggestions (e.g., by using a mechanism similar to the "GENIUS" feature of iTunes from Apple, Inc.) for other books or other content that are complementary to a particular eBook.

In another configuration, the eBook reader application may be configured to provide animated page flipping functionality that responds visually and selectively to swiping a user's finger horizontally across the page, can display a page corner curl (e.g., toward the center of the page) for example in response to a corresponding movement of the user's finger, cause page flipping to occur on other gestures such as finger taps (single or multiple), movement or rotation of the device or the like; implement a "point of no return" threshold in which a flipping page, upon removal of the user's finger, either continues to complete the flip to the next page—e.g., if the user's finger movement on the touch screen has reached a predetermined location on the screen (e.g., the half way point)—or falls back to the previous page display if the user's finger is removed before reaching that point; can simulate ripping pages out of an eBook based on a predetermined gesture; and/or respond to a user's thumb gesture in the direction substantially equal to 45 degrees from the eBook text direction by causing the page to flip. In any or all of these implementations, the eBooks pages can be displayed to the extent desired to comport with the applicable laws of physics associated with physical paper & ink books (e.g., gravity, friction and the like).

In one configuration, the representation of an electronic bookshelf is configured to distinguish between magazines and books, and also based on the state of books within the electronic bookshelf. For example, the electronic bookshelf may be configured to exchange books between different users. A book that is lent to another user may be "ghosted" to indicate that the book is temporarily unavailable because it is being used by another user while a book that is being borrow from another user may appear with a frosted binding or halo above the book to indicate that the book is available on a temporary basis or has been made available with limited rights. A user then may interact with the ghosted book to retrieve the book, or with the borrowed book to return the book and/or to purchase the book itself from an electronic bookstore.

The representation of the electronic bookshelf may be customized with a user. For example, an electronic bookshelf may be automatically organized according to a default scheme that presents the library organized according to a particular taxonomy. The user then may rearrange a bookshelf according to personal preferences. Thus, a user may elect to place certain publications in certain locations (e.g., placing a favorite periodical in a specified location on a bookshelf). The user customization may be stored so that a user may invoke one of several locations may be used. A user may use an academic configuration used when engaged in academic pursuits, while using an entertainment configuration used when using the bookshelf to navigate among leisurely content.

The user may configure an electronic bookshelf to configure individual shelves within the electronic bookshelf. For example, a first bookshelf may include periodicals sorted by frequency of access, while a second shelf includes nonfiction materials sorted by publication date, and a third shelf includes a fiction sorted by popularity as specified by a best seller list.

A bookshelf may be modified to reflect a theme or motif. For example, a type of used may be used to indicate the theme so that an oak bookshelf is used to present nonfiction content while a walnut bookshelf is used to present classic literature. A newsstand-type shelf may be used to present periodical literature. The bookshelf may be an add in package so that certain content is automatically placed in certain locations of the bookshelf. Thus, the periodical receiving the greatest circulation or page views over the preceding time period may be placed in the top shelf and books within the user's library directed to current trends may be placed alongside the periodical in the top shelf. As trends and Internet viewership changes over time, the selection of particular publications in the specified locations of the shelf also may change with the changing trends. The books may be labeled to indicate which books are newly-purchased and which books represent samples and/or promotional content. The bookshelf also may be modified to surface information relevant to a user's context. Thus, if a bookshelf application receives information that a user is in a particular location, the particular location may be used to showcase those publications relevant to a user's current location. If the user receives information that a user is travelling abroad, a travel publication for the current country may be placed on the user's top shelf. Similarly, if the user is travelling in a city (e.g., Savannah, Ga.), the electronic bookshelf may surface fictional literature associated with that city (e.g., a novel by John Berendt). In yet another example, if the electronic bookshelf receives information that the user is dining or about to dine in a particular establishment, for example, through a mapping application, the bookshelf may place a restaurant guide on the top shelf with a bookmark for the particular restaurant appearing in the book. In addition to placing a publication on a particular shelf, a publication also may be coded with a particular label or ribbon. The electronic bookshelf may indicate that there is a new periodical available and automatically place the updated periodical a location set aside for more current content.

The bookshelf may include notebooks or lab notebooks with user notes taken during class. The bookshelf also may display electronic books and feature a content view to display additional forms of content (e.g., audio).

A bookmark may be explicit or implicit. An example of an implicit bookmark may include a reference indicating a portion in a publication as determined by an electronic book reader application to likely represent a portion being viewed by a user. An explicit bookmark may include a location specified by a user as representing an area that the user wishes to return to upon selecting a bookmark. The bookmarks may be presented in a list so that the user may perceive their reading history and interact with the list to navigate to the recently read content. The list also may include a "time spent" viewing so that a user may perceive how much time was spent in each portion. If the publication includes audio that accompanies text, the bookmarks also may include a bookmark that links to the specified audio portion. A publication may include a progress bar separately and/or in association with bookmarks. The progress bark may indicate progress within a chapter or within a publication.

In one configuration, a user may zoom into an electronic book and still use the same interactive controls to navigate through an electronic book. For example, a user may be zoomed in and enjoying an illustration in a picture book (e.g., an illustrated children's book). In the course of reviewing the picture book, the user may use a gesture that advances to a next page. Using the gesture may inspire an animation which first zooms out and then causes the page to advance. And, even though the user is zoomed into a page, the physical characteristics of the user's gesture in turning the page may be used to foster an animated transition responsive to the physical characteristics. In one setting, the physical characteristics are modeled so that the actual screen size represents the size of the paper that inspires the transition (e.g., a swipe across two inches the screen is represented as a swipe across two inches of paper even though the screen is zoomed). In another setting the physical characteristics are modeled so that the actual screen size is scaled to the size of the paper that inspires the transition (e.g., a swipe across two inches the screen is represented as a swipe across one inch of paper as the screen is zoomed 100%.). The animated transition may inspire a change in the orientation of the electronic book application. A page turn may cause a change in a display from a zoomed in display of a single page to a landscape display of two pages.

The menus that are presented may be based upon the content that a user is accessing and/or reflect a configuration for the publication. For example, if a user is reading a piece of science fiction, a menu and/or instruction may be configured to present a map that reflects a location of interest where the portion of the story being read is set. The map may be configured to "fly" onto or off of the screen in response to invocation of the menu option and/or type of gesture that is invoked. An electronic book reader application may be configured to present a supplemental control to enable a user to perceive the portion of the display that is being read. For example, a user may run their finger below the portion of the screen that is being read. As the user continues to navigate through an electronic publication, a portion of the screen that is determined to no longer be of interest may be dimmed. A user wishing to resume reading a book may perceive which portion of the screen has been dimmed and begin using the finger tracking to drag their finger below the portion of text where they wish to resume. The electronic book reader application may be configured to maintain a rate of progress through a book so that even if a user has moved their tracking finger to slightly above or below a specified range, so long as the user maintains a specified rate of movement with an index across the surface, the dimmed portion will continue to progress. In addition to a dimming function, the electronic book reader application also may include a highlight function that spotlights an area of interest, for example by using a highlighter or animated halo effect to identify a portion of text of interest.

What is claimed is:

1. A method of presenting information, the method comprising:
   accessing, by an electronic device, a library of electronic publications;
   presenting, on a graphical user interface (GUI) shown on a display coupled to the electronic device, a bookshelf view that shows a visual representation of an electronic bookshelf that includes visual representations of the electronic publications included in the library;
   providing, on the GUI in the bookshelf view in conjunction with showing the electronic bookshelf, a control option to switch between the bookshelf view and a bookstore view;
   receiving an instruction to switch from the bookshelf view to the bookstore view;
   in response to receiving the instruction to switch from the bookshelf view to the bookstore view:
      establishing a network connection between the electronic device and a remote computer system associated with an online bookstore, and
      transitioning the GUI from the bookshelf view to the bookstore view, wherein the bookstore view provides a representation of the online bookstore;
   presenting, on the GUI in the bookstore view, representations of electronic publications that are available for preview or purchase in the online bookstore;
   receiving an instruction to purchase an electronic publication from the online bookstore; and
   in response to receiving the instruction to purchase the electronic publication:
      downloading, from the remote computer system to the electronic device over the network connection, a copy of the purchased electronic publication,
      transitioning the GUI from the bookstore view to the bookshelf view in conjunction with downloading the copy of the purchased electronic publication, wherein transitioning the GUI from the bookstore view to the bookshelf view comprises presenting a first animation displaying the copy of the purchased electronic publication being transferred from the online bookstore to the electronic bookshelf concurrently with a second animation displaying transition of the GUI from the bookstore view to the bookshelf view, and
      displaying the representation of the purchased electronic publication in the electronic bookshelf.

2. The method of claim 1 wherein the library of electronic publications includes a first publication, the method further comprising:
   determining that the first publication is a new addition to the library or has been accessed within a specified time period; and
   based on the determining, presenting the first publication in the electronic bookshelf using a front cover view.

3. The method of claim 1, wherein the library of electronic publications includes a first publication, the method further comprising:
   determining that the first publication has not been accessed within a first time period; and
   based on determining that the first publication has not been accessed within the first time period, presenting a binding view of the first publication in the electronic bookshelf.

4. The method of claim 3, further comprising:
   modifying the representation of the first publication to present a layer of dust over the first publication.

5. The method of claim 3, further comprising:
   receiving an instruction to access the first publication; and
   in response to receiving the instruction to access the first publication, providing an animation of a dust cloud.

6. The method of claim 1, wherein the library of electronic publications includes a first publication, the method further comprising:
   presenting the first publication in the electronic bookshelf with a magazine icon when the first publication is determined to be a magazine, or presenting the first publication in the electronic bookshelf with a newspaper icon when the first publication is determined to be a newspaper.

7. The method of claim 1, wherein the library of electronic publications includes a first publication, the method further comprising:
   determining a state for the first publication; and
   generating a representation of the first publication to reflect the state of the first publication, wherein the representation of the first publication includes a label indicating the state of the first publication.

8. The method of claim 7, wherein the label indicates one of: the first publication has not yet been accessed, the first publication is a new purchase, or the first publication is being downloaded.

9. The method of claim 7, wherein showing the electronic bookshelf including the representations of the electronic publications comprises:
   determining a geographic location of the electronic device;
   determining that a first electronic publication that is present in the electronic bookshelf includes content corresponding to the geographic location; and
   displaying the first electronic publication in the electronic bookshelf with an indication that the first electronic publication is relevant to the geographic location of the electronic device.

10. The method of claim 9, wherein presenting the first electronic publication in the electronic bookshelf with an indication that the first electronic publication is relevant to the geographic location includes one of presenting a ribbon associated with the representation of the first electronic publication to indicate a relevance of the first electronic publication to the geographic location, or positioning the representation of the first electronic publication in a specified portion of the electronic bookshelf that is associated with the geographic location.

11. The method of claim 1, further comprising:
   presenting, on the GUI in the bookstore view, representations of electronic publications that are available for preview or purchase in the online bookstore;
   receiving an instruction to preview a first electronic publication available in the online bookstore; and in response to receiving the instruction to preview the first electronic publication, downloading, from the remote computer system to the electronic device over the network connection, a portion of the first electronic publication, wherein the electronic device is configured to enable a user to browse the downloaded portion of the first electronic publication when the electronic device is not connected to the remote computer system associated with the online bookstore.

12. The method of claim 1, wherein showing the representations of the electronic publications in the electronic bookshelf in the bookshelf view comprises:

automatically updating, by the electronic device, display of the electronic bookshelf to reflect one or more of availability of new content or alteration in status information associated with an electronic publication included in the library of electronic publications, wherein the availability of new content includes one of a new electronic publication that is purchased or updated versions of electronic publications previously purchased, and wherein alteration in status information associated with an electronic publication includes alteration in appearance of the electronic publication from a first appearance indicating that electronic publication is partially downloaded in the electronic device to a second appearance indicating that the electronic publication is fully downloaded in the electronic device.

13. The method of claim 1, wherein showing the representations of the electronic publications in the electronic bookshelf in the bookshelf view comprises:

displaying, in the electronic bookshelf, representations of the electronic publications arranged based on one or more of publication types, newness, purchase date, time of access, or frequency of access.

14. The method of claim 1, wherein showing the representations of the electronic publications in the electronic bookshelf in the bookshelf view comprises:

displaying, in the electronic bookshelf, representations of the electronic publications arranged based on one or more of title, author, genre, date obtained, copyright date, or language of publication.

15. The method of claim 1, further comprising:

providing, on the GUI in the bookstore view, a graphical icon representing a control option to enable access a history of previously purchased items in the online bookstore;

receiving an input selecting the control option to access the history of previously purchased items in the online bookstore; and in response to receiving the input selecting the control option to access the history of previously purchased items in the online bookstore:

connecting the electronic device to a network location that provides access to the history of previously purchased items, and providing options to re-download previously purchased items to a selected reading platform.

16. The method of claim 1 wherein the library of electronic publications includes a first publication, the method further comprising:

determining that the first publication has been lent to another device; and based on the determining, modifying a visual representation of the first publication displayed on the electronic device to indicate that the first publication is unavailable to a user of the electronic device while being used at the other device.

17. The method of claim 1 wherein the library of electronic publications includes a first publication, the method further comprising:

determining that the first publication has been borrowed from a second device; and based on the determining, modifying a visual representation of the first publication to indicate that the first publication is available to the electronic device with limited rights.

18. The method of claim 1, further comprising:

accessing, while connected over the network connection, visual representations of electronic publications displayed in the bookstore view and that are available for preview or purchase in the online bookstore.

19. A system, comprising:

a processor; and instructions that, when executed by the processor, cause the processor to perform operations that include:

accessing, by an electronic device, a library of electronic publications;

presenting, on a graphical user interface (GUI) shown on a display coupled to the electronic device, a bookshelf view that shows a visual representation of an electronic bookshelf that includes visual representations of the electronic publications included in the library;

providing, on the GUI in the bookshelf view in conjunction with showing the electronic bookshelf, a control option to switch between the bookshelf view and a bookstore view;

receiving an instruction to switch from the bookshelf view to the bookstore view;

in response to receiving the instruction to switch from the bookshelf view to the bookstore view:

establishing a network connection between the electronic device and a remote computer system associated with an online bookstore, and transitioning the GUI from the bookshelf view to the bookstore view, wherein the bookstore view provides a representation of the online bookstore;

presenting, on the GUI in the bookstore view, representations of electronic publications that are available for preview or purchase in the online bookstore;

receiving an instruction to purchase an electronic publication from the online bookstore; and in response to receiving the instruction to purchase the electronic publication:

downloading, from the remote computer system to the electronic device over the network connection, a copy of the purchased electronic publication, transitioning the GUI from the bookstore view to the bookshelf view in conjunction with downloading the copy of the purchased electronic publication, wherein transitioning the GUI from the bookstore view to the bookshelf view comprises presenting a first animation displaying the copy of the purchased electronic publication being transferred from the online bookstore to the electronic bookshelf concurrently with a second animation displaying transition of the GUI from the bookstore view to the bookshelf view, and displaying the representation of the purchased electronic publication in the electronic bookshelf.

20. A non-transitory computer readable medium comprising instructions that, when executed by a processor, cause the processor to perform operations that include:
- accessing, by an electronic device, a library of electronic publications;
- presenting, on a graphical user interface (GUI) shown on a display coupled to the electronic device, a bookshelf view that shows a visual representation of an electronic bookshelf that includes visual representations of the electronic publications included in the library;
- providing, on the GUI in the bookshelf view in conjunction with showing the electronic bookshelf, a control option to switch between the bookshelf view and a bookstore view;
- receiving an instruction to switch from the bookshelf view to the bookstore view;
- in response to receiving the instruction to switch from the bookshelf view to the bookstore view:
  - establishing a network connection between the electronic device and a remote computer system associated with an online bookstore, and
  - transitioning the GUI from the bookshelf view to the bookstore view, wherein the bookstore view provides a representation of the online bookstore;
- presenting, on the GUI in the bookstore view, representations of electronic publications that are available for preview or purchase in the online bookstore;
- receiving an instruction to purchase an electronic publication from the online bookstore; and
- in response to receiving the instruction to purchase the electronic publication:
  - downloading, from the remote computer system to the electronic device over the network connection, a copy of the purchased electronic publication,
  - transitioning the GUI from the bookstore view to the bookshelf view in conjunction with downloading the copy of the purchased electronic publication, wherein transitioning the GUI from the bookstore view to the bookshelf view comprises presenting a first animation displaying the copy of the purchased electronic publication being transferred from the online bookstore to the electronic bookshelf concurrently with a second animation displaying transition of the GUI from the bookstore view to the bookshelf view, and
  - displaying the representation of the purchased electronic publication in the electronic bookshelf.

* * * * *

UNITED STATES PATENT AND TRADEMARK OFFICE
CERTIFICATE OF CORRECTION

PATENT NO.        : 9,811,507 B2
APPLICATION NO.   : 13/521414
DATED             : November 7, 2017
INVENTOR(S)       : Elizabeth Caroline Furches Cranfill et al.

It is certified that error appears in the above-identified patent and that said Letters Patent is hereby corrected as shown below:

In the Claims

Column 49, Line 47, Claim 15, after "access" add -- to --.

Signed and Sealed this
Third Day of July, 2018

Andrei Iancu
*Director of the United States Patent and Trademark Office*